(12) United States Patent
Lee et al.

(10) Patent No.: US 12,467,657 B2
(45) Date of Patent: Nov. 11, 2025

(54) AIR CONDITIONER

(71) Applicant: Samsung Electronics Co., Ltd., Suwon-si (KR)

(72) Inventors: Dong Yoon Lee, Suwon-si (KR); Do-Hoon Kim, Suwon-si (KR); Joon-Ho Yoon, Suwon-si (KR); Chul Ju Lee, Seoul (KR); Jun Woo Kim, Ansan-si (KR); Bu Youn Lee, Hwaseong-si (KR); Jung Dae Lee, Seoul (KR); Sung-June Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/746,597

(22) Filed: Jun. 18, 2024

(65) Prior Publication Data
US 2024/0337412 A1  Oct. 10, 2024

Related U.S. Application Data

(63) Continuation of application No. 18/096,579, filed on Jan. 13, 2023, now Pat. No. 12,055,314, which is a (Continued)

(30) Foreign Application Priority Data

Oct. 23, 2015 (KR) .................. 10-2015-0148070
Mar. 25, 2016 (KR) .................. 10-2016-0036288

(51) Int. Cl.
*F24F 13/22* (2006.01)
*F24F 1/0011* (2019.01)
(Continued)

(52) U.S. Cl.
CPC .......... *F24F 13/222* (2013.01); *F24F 1/0011* (2013.01); *F24F 1/0014* (2013.01);
(Continued)

(58) Field of Classification Search
CPC ........ F24F 13/30; F24F 1/0047; F24F 1/0059; F24F 13/222; F24F 13/22; F24F 13/20; F24F 13/10
See application file for complete search history.

(56) References Cited

U.S. PATENT DOCUMENTS 2,019,583 A   11/1935  Redfield
2,134,802 A   11/1938  Rentz
(Continued)

FOREIGN PATENT DOCUMENTS

CN   2420552 Y    2/2001
CN   1688849     10/2005
(Continued)

OTHER PUBLICATIONS

U.S. Appl. No. 18/746,597, filed Jan. 25, 2025_JP_2005257142_A_M.pdf (Year: 2005).*
(Continued)

*Primary Examiner* — Frantz F Jules
*Assistant Examiner* — Martha Tadesse
(74) *Attorney, Agent, or Firm* — STAAS & HALSEY LLP

(57) ABSTRACT

In an air conditioner, a drain extraction unit and a refrigerant pipe connecting unit may be disposed in a blocking region in which a discharge port is not provided so that a size of the discharge port may be secured and the discharge port may be uniformly disposed, thereby generating uniform airflow in a room. In a lower housing formed in a circular shape, some of components inside an indoor unit of the air conditioner may be disposed in a protrusion portion that protrudes from
(Continued)

the circular housing, thereby facilitating the installation of the air conditioner. A condensate water collecting space disposed outside the housing may be provided in a drain tray, thereby efficiently preventing a leakage due to condensate water generated outside the housing. The housing, the drain tray, and the cover member of the air conditioner may be coupled by a coupling member coupled outside.

10 Claims, 37 Drawing Sheets

Related U.S. Application Data continuation of application No. 16/695,715, filed on Nov. 26, 2019, now Pat. No. 11,629,881, which is a continuation of application No. 15/145,322, filed on May 3, 2016, now Pat. No. 10,788,240.

(51) Int. Cl.
| | |
|---|---|
| F24F 1/0014 | (2019.01) |
| F24F 1/0022 | (2019.01) |
| F24F 1/0033 | (2019.01) |
| F24F 1/0047 | (2019.01) |
| F24F 1/0059 | (2019.01) |
| F24F 1/32 | (2011.01) |
| F24F 1/34 | (2011.01) |
| F24F 11/77 | (2018.01) |
| F24F 11/79 | (2018.01) |
| F24F 13/10 | (2006.01) |
| F24F 13/20 | (2006.01) |
| F24F 13/24 | (2006.01) |
| F24F 13/28 | (2006.01) |
| F24F 13/30 | (2006.01) |

(52) U.S. Cl.
CPC .......... *F24F 1/0022* (2013.01); *F24F 1/0033* (2013.01); *F24F 1/0047* (2019.02); *F24F 1/0059* (2013.01); *F24F 1/32* (2013.01); *F24F 1/34* (2013.01); *F24F 11/77* (2018.01); *F24F 11/79* (2018.01); *F24F 13/10* (2013.01); *F24F 13/20* (2013.01); *F24F 13/22* (2013.01); *F24F 13/24* (2013.01); *F24F 13/28* (2013.01); *F24F 13/30* (2013.01); *F24F 2013/227* (2013.01); *F24F 2221/28* (2013.01)

(56) References Cited

U.S. PATENT DOCUMENTS

| | | | |
|---|---|---|---|
| 2,159,913 | A | 5/1939 | Tenney |
| 2,638,757 | A | 5/1953 | Borgerd |
| 5,379,832 | A | 1/1995 | Dempsey |
| 5,842,353 | A | 12/1998 | Kuo-Liang |
| 6,023,936 | A | 2/2000 | Choi |
| 6,121,585 | A | 9/2000 | Dam |
| 10,663,184 | B2 | 5/2020 | Park |
| 2001/0054493 | A1 | 12/2001 | Hatanaka |
| 2002/0152760 | A1 | 10/2002 | Okuda et al. |
| 2008/0011001 | A1 | 1/2008 | Katsuyama |
| 2009/0007580 | A1 | 1/2009 | Sakashita et al. |
| 2009/0025414 | A1* | 1/2009 | Koga .......... F24F 1/0047 62/263 |
| 2011/0240255 | A1 | 10/2011 | Sakashita |
| 2013/0213614 | A1 | 8/2013 | Ikeda et al. |
| 2013/0219942 | A1 | 8/2013 | Thomas |

FOREIGN PATENT DOCUMENTS

| | | |
|---|---|---|
| CN | 101206060 A | 6/2008 |
| CN | 101270898 A | 9/2008 |
| CN | 101375107 A | 2/2009 |
| CN | 101387425 A | 3/2009 |
| CN | 201348314 Y | 11/2009 |
| CN | 101592367 A | 12/2009 |
| CN | 201674730 U | 12/2010 |
| CN | 203349381 U | 12/2013 |
| CN | 203404912 U | 1/2014 |
| CN | 203718932 U | 7/2014 |
| CN | 203857711 | 10/2014 |
| CN | 102829508 | 11/2015 |
| EP | 1052457 | 5/2004 |
| EP | 1548372 | 6/2005 |
| EP | 1 983 269 A1 | 10/2008 |
| EP | 1 548 372 A1 | 4/2013 |
| EP | 1 548 372 B1 | 4/2013 |
| EP | 2894415 | 7/2015 |
| EP | 2933573 A4 | 10/2015 |
| EP | 3059509 A1 | 8/2016 |
| EP | 3076100 B1 | 10/2016 |
| GB | 2 451 712 A | 2/2009 |
| JP | 62-194128 U | 8/1987 |
| JP | 1-285722 | 11/1989 |
| JP | H04113829 A | 10/1992 |
| JP | 6-117662 | 4/1994 |
| JP | 7-335294 | 12/1995 |
| JP | 10-9666 | 1/1998 |
| JP | 10-110964 | 4/1998 |
| JP | 11-83060 | 3/1999 |
| JP | 11-173596 | 6/1999 |
| JP | 11-201489 | 7/1999 |
| JP | 11-201494 | 7/1999 |
| JP | 11201494 A | 7/1999 |
| JP | 11-264567 | 9/1999 |
| JP | 3043125 | 5/2000 |
| JP | 2001-124359 | 5/2001 |
| JP | 2001-124365 | 5/2001 |
| JP | 2002-39591 | 2/2002 |
| JP | 2003021354 A | 1/2003 |
| JP | 2003074910 A | 3/2003 |
| JP | 2003-232534 | 8/2003 |
| JP | 2003294271 A | 10/2003 |
| JP | 2003336893 A | 11/2003 |
| JP | 2004-85003 | 3/2004 |
| JP | 2004-92997 | 3/2004 |
| JP | 2005-257142 | 9/2005 |
| JP | 2005257142 A * | 9/2005 |
| JP | 2006337018 A | 12/2006 |
| JP | 2007-100980 | 4/2007 |
| JP | 2009-79819 A | 4/2009 |
| JP | 2011075264 A | 4/2011 |
| JP | 4684085 | 5/2011 |
| JP | 4711790 B2 | 6/2011 |
| JP | 2012097911 A | 5/2012 |
| JP | 2012-163330 | 8/2012 |
| JP | 2012154565 A | 8/2012 |
| JP | 2013217600 A | 10/2013 |
| JP | 2014-115007 | 6/2014 |
| JP | 6573068 | 8/2019 |
| KR | 10-2000-0055145 | 9/2000 |
| KR | 20010095686 A | 3/2001 |
| KR | 20-0291025 | 10/2002 |
| KR | 10-2005-0083661 | 8/2005 |
| KR | 10-0702323 | 3/2007 |
| KR | 10-0749061 | 8/2007 |
| KR | 10-0776260 | 11/2007 |
| KR | 10-0814024 | 3/2008 |
| KR | 10-2008-0095404 A | 10/2008 |
| KR | 20-0446120 | 9/2009 |
| KR | 20090094657 A | 9/2009 |
| KR | 20090011379 U * | 11/2009 ........... G06F 1/1626 |
| KR | 101240536 B1 | 5/2010 |
| KR | 10-2013-0041678 | 4/2013 |
| WO | WO 2004/020914 A1 | 3/2004 |
| WO | 2013/047240 | 4/2013 |
| WO | WO 2013/047240 A1 | 4/2013 |

(56) References Cited

OTHER PUBLICATIONS

U.S. Appl. No. 18/746,597, filed Jan. 25, 2025_KR_20090011379_A_M.pdf (Year: 2009).*
Office Action dated Jun. 11, 2024 issued in India Application No. 202118040331.
Office Action dated Jul. 25, 2024 issued in European Application No. EP 23216480.
Office Action dated Aug. 1, 2024 issued in Chinese Application No. 202210238845.9.
International Search Report dated Aug. 16, 2016 in corresponding International Patent Application No. PCT/KR2016/004724.
Extended European Search Report dated Mar. 22, 2017 in European Patent Application No. 16168420.4.
Korean Office Action dated Mar. 8, 2017 in Korean Patent Application No. 10-2016-0036288.
Korean Office Action dated Jan. 19, 2018 in Korean Patent Application No. 10-2016-0036288.
Korean Office Action dated Jul. 21, 2017 in Korean Patent Application No. 10-2016-0036288.
Korean Office Action dated Sep. 18, 2017 in Korean Patent Application No. 10-2016-0036288.
Korean Notice of Allowance dated Aug. 17, 2018 in Korean Patent Application No. 10-2016-0036288.
Australian Office Action dated Dec. 11, 2018 in Australian Patent Application No. 2016340533.
Russian Office Action dated Nov. 13, 2018 in Russian Patent Application No. 2018114687/12.
Australian Office Action dated Mar. 26, 2019 in Australian Patent Application No. 2016340533.
Russian Office Action dated Apr. 10, 2019 in Russian Patent Application No. 2018114687/12.
US Office Action dated Aug. 26, 2016 in U.S. Appl. No. 15/145,322.
US Office Action dated Mar. 3, 2017 in U.S. Appl. No. 15/145,322.
US Advisory Action dated May 19, 2017 in U.S. Appl. No. 15/145,322.
US Office Action dated Oct. 12, 2017 in U.S. Appl. No. 15/145,322.
US Office Action dated May 17, 2018 in U.S. Appl. No. 15/145,322.
US Advisory Action dated Jul. 27, 2018 in U.S. Appl. No. 15/145,322.
US Office Action dated Mar. 20, 2019 in U.S. Appl. No. 15/145,322.
US Office Action dated Sep. 30, 2019 in U.S. Appl. No. 15/145,322.
Indian Office Action dated Nov. 19, 2019 in Indian Patent Application No. 201817011689.
US Notice of Allowance dated Feb. 24, 2020 in U.S. Appl. No. 15/145,322.
Chinese Office Action dated Jan. 6, 2020 in Chinese Patent Application No. 201610302722.1.
US Notice of Allowance dated Jun. 18, 2020 in U.S. Appl. No. 15/145,322.
Brazilian Office Action issued Jul. 2, 2020 in Brazilian Patent Application No. BR112018005558-1.
Indonesian Office Action dated Oct. 20, 2020 in Indonesian Patent Application No. P00201802877.
Chinese Office Action dated Sep. 21, 2020 in Chinese Patent Application No. 201610302722.1.
Extended European Search Report dated Dec. 3, 2020 in European Patent Application No. 20182944.7.
Indonesian Office Action dated Feb. 16, 2021 in Indonesian Patent Application No. P00201802877.
Chinese Office Action dated Dec. 18, 2020 in Chinese Patent Application No. 202010141991.0.
Korean Office Action dated Apr. 20, 2021 in Korean Patent Application No. 10-2018-0070400 No. 201610302722.1.
Chinese Office Action dated Mar. 10, 2021 in Chinese Patent Application.
Korean Office Action for Korean Patent Application No. 10-2019-0177421 dated Jun. 21, 2021.
Chinese Office Action for Chinese Patent Application No. 201610302722.1 dated Jun. 23, 2021.
Chinese Office Action for Chinese Patent Application No. 202010141991.0 dated Jul. 9, 2021.
European Search Report for European Patent Application No. 21170803.7 dated Sep. 1, 2021.
Korean Notice of Allowance dated Sep. 16, 2021 from Korean Application No. 10-2018-0070400.
Korean Notice of Allowance dated Nov. 8, 2021 from Korean Application No. 10-2019-0177421.
Korean Office Action dated May 12, 2022 from Korean Application No. 10-2022-0016405.
Indian Office Action dated Jun. 20, 2022 from Indian Application No. 201717011689.
European Office Action dated Jul. 21, 2022 from European Application No. 21170803.7.
Korean Office Action dated Sep. 18, 2022 from Korean Application No. 10-2022-0016405.
Indian Office Action dated Oct. 18, 2022 from Indian Application No. 202118040330.
European Office Action dated Nov. 29, 2022 in European Patent Application No. 20 182 944.7 (6 pages).
Indian Office Action dated Nov. 29, 2022 in Indian Patent Application No. 202118040368 (6 pages).
Indian Office Action dated Nov. 2, 2022 in Indian Patent Application No. 202118040331 (6 pages).
U.S. Office Action dated Nov. 18, 2022 in U.S. Appl. No. 16/695,715.
U.S. Office Action dated Jun. 22, 2022 in U.S. Appl. No. 16/695,715.
U.S. Office Action dated Oct. 6, 2022 in U.S. Appl. No. 16/695,715.
EZ Chinese Office Action dated Feb. 3, 2023 in Chinese Patent Application No. 202210238845.9 (7 pages).
Office Action dated Dec. 10, 2022 in Brazilian Patent Application No. BR112018005558-1 (3 pages; 3 pages English translation).
Office Action dated Jan. 17, 2023 in European Patent Application No. 21 170 803.7 (6 pages).
Office Action dated May 12, 2023 in European Patent Application No. 20 182 994.7.
Office Action dated May 30, 2023 in Chinese Patent Application No. 201610302722.1.
Office Action dated Jun. 15, 2023 in Brazilian Patent Application No. BR112018005558-1.
Office Action dated Aug. 8, 2023 in Chinese Patent Application No. 202210238845.9.
Office Action dated Aug. 31, 2023 in Chinese Patent Application No. 201610302722.1.
Office Action dated Aug. 24, 2023 in European Patent Application No. 20 171 803.7.
Office Action dated Nov. 29, 2023 in Chinese Patent Application No. 202210238845.9.
Office Action dated Mar. 26, 2024 for corresponding European application No. 23 216 480.6.
Office Action dated Feb. 24, 2024 for corresponding Chinese application No. 202210237425.9.
U.S. Office Action dated Sep. 7, 2023 for corresponding U.S. Appl. No. 18/096,579.
U.S. Notice of Allowance dated Mar. 19, 2024 for corresponding U.S. Appl. No. 18/096,579.
U.S. Notice of Allowability dated May 30, 2024 for corresponding U.S. Appl. No. 18/096,579.
U.S. Appl. No. 18/096,579, filed Jan. 13, 2023, Dong Yoon Lee et al., Samsung Electronics Co., Ltd.
U.S. Appl. No. 16/695,715, filed Nov. 26, 2019, Dong Yoon Lee et al., Samsung Electronics Co., Ltd.
U.S. Appl. No. 15/145,322, filed May 3, 2016, Dong Yoon Lee et al., Samsung Electronics Co., Ltd.
Office Action issued by the Chinese National Intellectual Property Administration on Sep. 12, 2024 for Chinese Patent Application No. 202210238845.9.
Notice of Preliminary Rejection issued Dec. 12, 2024 for Korean Application No. 10-2024-0064003.

* cited by examiner

AIR CONDITIONER

CROSS-REFERENCE TO RELATED APPLICATION

This application is a Continuation Application of U.S. patent application Ser. No. 18/096,579 filed on Jan. 13, 2023, which is a Continuation Application of U.S. patent application Ser. No. 16/695,715 filed on Nov. 26, 2019, which is a Continuation Application of U.S. patent application Ser. No. 15/145,322 filed on May 3, 2016, which claims the benefit of Korean Patent Application Nos. 10-2015-0148070 and 10-2016-0036288, filed on Oct. 23, 2015 and Mar. 25, 2016, respectively in the Korean Intellectual Property Office, the disclosures of which are incorporated herein by reference.

BACKGROUND

1. Field

Embodiments of the present disclosure relate to arrangement of components inside of a housing of an air conditioner.

2. Description of the Related Art

An air conditioner is an apparatus that includes a compressor, a condenser, an expansion valve, an evaporator, a blowing fan, and the like and adjusts indoor temperature, humidity, airflow, and the like using a refrigerating cycle. The air conditioner may be classified into a split type air conditioner including an indoor unit disposed inside of a building and an outdoor unit disposed outside of a building and a window type air conditioner including an indoor unit and an outdoor unit both disposed inside a single housing.

The indoor unit of the air conditioner includes a heat exchanger for exchanging heat between refrigerant and air, a blower fan for causing air to flow, and a motor for driving the blower fan, thereby cooling or heating the interior of a room.

When the heat exchanger is provided in an annular shape, an annular discharge port may be provided to correspond to the heat exchanger, and in this case, the formation of the discharge port may be limited by components in the housing such as a drain pump disposed inside the housing or a refrigerant pipe connected to the heat exchanger.

Accordingly, when the discharge port is formed into an irregular shape, a problem may arise that air discharged from the air conditioner is irregularly delivered to the interior of the room.

SUMMARY

Therefore, it is an aspect of the present disclosure to provide an air conditioner that may secure a discharge port regularly disposed by an appropriate arrangement of components in the housing.

It is another aspect of the present invention to provide an air conditioner in which some of the internal components of an indoor unit of the air conditioner formed in a circular shape may be arranged on a protrusion cover protruding from a circular housing, thereby maximizing a discharge port.

It is still another aspect of the present invention to provide an air conditioner in which a condensate water collecting space disposed outside of the housing may be provided in a drain tray of the air conditioner.

It is yet another aspect of the present invention to provide an air conditioner in which components of an indoor unit of the air conditioner may be coupled to one another by a coupling member disposed outside.

It is yet another aspect of the present invention to provide an air conditioner in which a discharge port of the air conditioner which does not includes a blade may be easily opened and closed.

Additional aspects of the disclosure will be set forth in part in the description which follows and, in part, will be obvious from the description, or may be learned by practice of the disclosure.

In accordance with one aspect of the present disclosure, an air conditioner includes: a housing that includes a cylindrical portion; a heat exchanger that is provided inside the housing; and a refrigerant pipe connecting unit that connects the heat exchanger to an external refrigerant pipe, wherein the housing includes a first protrusion portion that protrudes from the cylindrical portion to cover the refrigerant pipe connecting unit.

Here, the first protrusion portion may include a first surface that extends in a tangential direction of an outer circumferential surface of the cylindrical portion.

Also, the first protrusion portion may further include a second surface that connects an end of the first surface and the outer circumferential surface of the cylindrical portion, and the refrigerant pipe connecting unit is connected to the external refrigerant pipe through the second surface.

Also, the air conditioner may further include a drain extraction unit that includes a drain pump for collecting condensate water generated from the heat exchanger and a drain pipe connecting portion for connecting the drain pump to an external drain pipe, wherein the housing further includes a second protrusion portion that protrudes from the cylindrical portion to cover the drain extraction unit.

Also, each of the first and second protrusion portions may include a first surface that extends in a tangential direction of an outer circumferential surface of the cylindrical portion and a second surface that connects an end of the first surface and the outer circumferential surface of the cylindrical portion, the refrigerant pipe connecting unit may pass through the second surface of the first protrusion portion, and the drain pipe connecting portion may pass through the second surface of the second protrusion portion.

Also, the first surface of the first protrusion portion and the first surface of the second protrusion portion may extend in the same direction.

Also, the air conditioner may further include a plurality of discharge ports including an arc shape; and at least one blocking region that is provided between the plurality of discharge ports, wherein the refrigerant pipe connecting unit is disposed to correspond to one of the at least one blocking region.

Also, the air conditioner may further include a drain extraction unit that includes a drain pump for collecting condensate water generated from the heat exchanger, wherein the drain extraction unit is disposed to correspond to the other one of the at least one blocking region.

Also, the air conditioner may further include an airflow control fan that is provided inside the housing so that a part of the air discharged from the plurality of discharge ports is drawn into the housing, wherein the airflow control fan is disposed to correspond to the at least one blocking region.

Also, the first protrusion portion may protrude in an axial direction of the cylindrical portion.

Also, the air conditioner may further include a drain tray that is provided to collect condensate water generated from the heat exchanger, and includes an annular shape having a radius larger than a radius of the cylindrical portion, wherein the drain tray includes an outer rib that protrudes upward along an outer perimeter side of the drain tray.

Also, the air conditioner may further include a heat insulating material that is disposed to abut an inner circumferential surface of the housing, wherein the drain tray further includes an inner rib that protrudes upward along an inner circumferential surface of the heat insulating material to abut the inner circumferential surface of the heat insulating material.

Also, at one side of the inner circumferential surface of the housing, a wire accommodation portion that protrudes in a radial direction may be provided along the inner circumferential surface of the housing, so that a wire for electrically connecting electronic components of the air conditioner is accommodated in the wire accommodation portion.

In accordance with another aspect of the present disclosure, an air conditioner includes: a first housing; a heat exchanger that is provided inside the first housing; a drain tray that is disposed to collect condensate water generated from the heat exchanger; and a coupling member that couples the first housing to the drain tray, wherein the coupling member includes a first portion that is inserted into the first housing, and a second portion that extends from the first portion and protrudes to the outside of the first housing to be coupled to the drain tray.

Here, the air conditioner may further include a second housing that is disposed at one side of the drain tray, wherein the second housing is coupled to the second portion.

Also, the air conditioner may further include a cover member that covers a boundary side of the second housing, wherein the cover member is coupled to the second portion.

Also, the second housing and the drain tray may respectively include a first assembling unit and a second assembling unit which respectively protrude to the outside from boundaries of the second housing and the drain tray, and the first assembling unit, the second assembling unit, and the cover member may be stacked on the second portion and coupled to the second portion.

Also, the coupling member may include a bolt coupling portion that extends from the first portion to the outside of the first housing and is coupled to a bolt.

Also, the first housing may further include a cylindrical outer circumferential surface, the drain tray may include an outer circumferential surface having a radius lager than a radius of the first housing, the coupling member may further include a third portion that connects the first portion and the second portion, and the third portion may extend to the outside of the first housing by a difference between the radius of the drain tray and the radius of the first housing.

Also, the second housing may be hook-coupled to the drain tray.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
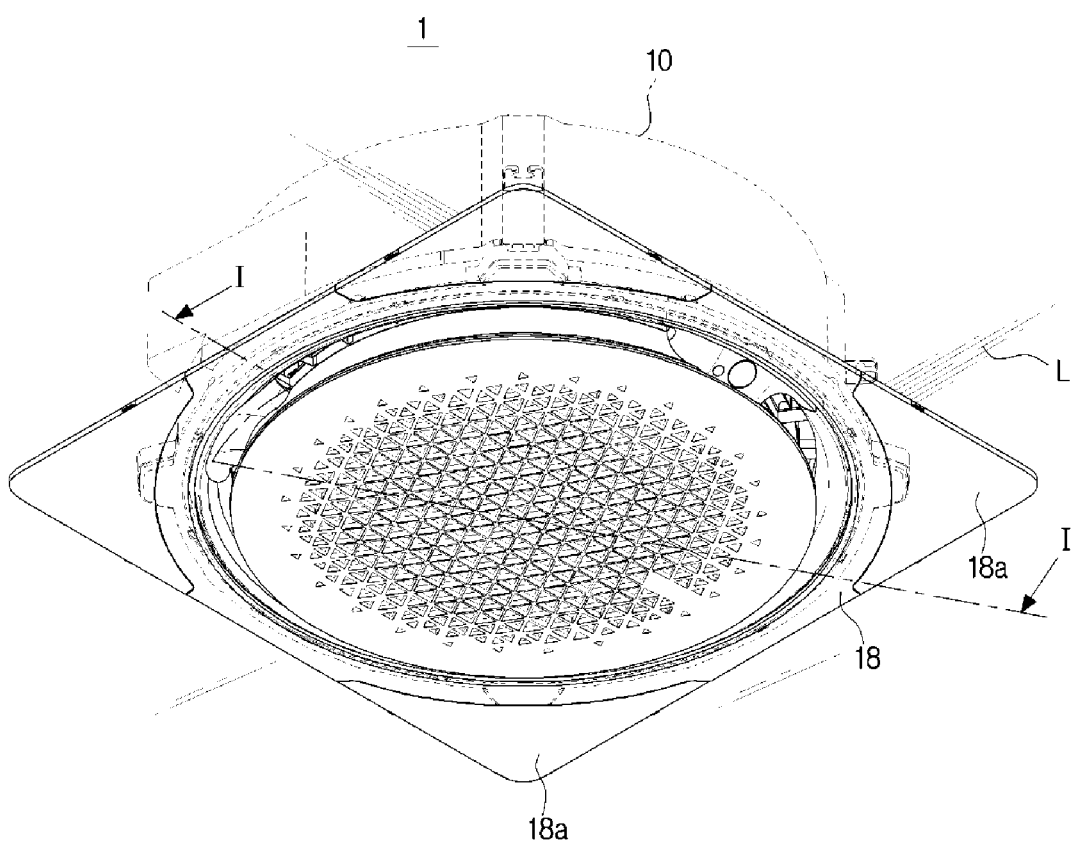
FIG. 1 is a perspective view showing an air conditioner according to an embodiment of the present invention.
Figure 2:
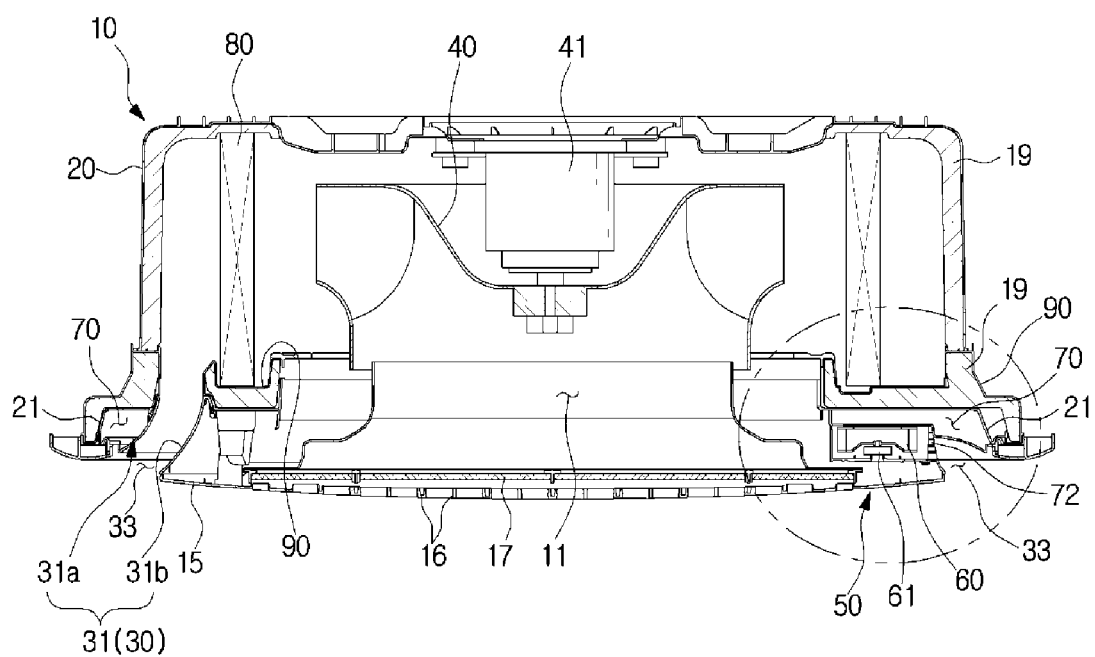
FIG. 2 is a side cross-sectional view taken along a line I-I shown in FIG. 1.

Embodiments disclosed in the present specification and the configurations shown in the drawings are just preferred embodiments of the present invention and do not cover all the technical idea of the present invention. Thus, it should be appreciated that such embodiments may be replaced by various equivalents and modifications at a point of time when the present application is filed.

Reference will now be made in detail to the embodiments of the present disclosure, examples of which are illustrated in the accompanying drawings, wherein like reference numerals refer to like elements throughout.

In addition, terminologies used in the present specification are to describe the exemplary embodiments and not to limit the present invention. In the present specification, unless particularly described in the description, a singular form includes a plural form. "Comprises/includes" and/or "comprising/including" used in the specification does not exclude the presence or addition of at least one another constituent element, step, operation, and/or device with respect to the described constituent element, step, operation/ or device.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

In addition, as to terms such as "upper side", "upper", "lower side", and "lower" used in the present specification, the side at which the a suction port is provided in the air conditioner in FIG. 1 will be described as the lower side, and the side above the lower side will be described as the upper side in the vertical direction of an air conditioner according to an embodiment of the present invention shown in FIG. 1.

An air conditioner according to an embodiment of the present invention is an air conditioner that does not include a blade for conditioning discharged air. However, without being limited to an embodiment of the present invention, the present invention may be applied to an air conditioner including a blade.

In addition, the air conditioner according to an embodiment of the present invention is an air conditioner including a heat exchanger provided in an annular shape. However, without being limited to an embodiment of the present invention, the present invention may be applied to an air conditioner including a heat exchanger provided in a rectangular shape or in various shapes.

Hereinafter, embodiments of the present invention will be described in detail with reference to the accompanying drawings.

With reference to FIGS. 1 to 7, a schematic configuration of an air conditioner according to an embodiment of the present invention will be described.

An indoor unit 1 of the air conditioner may be installed in the ceiling L. At least a part of the indoor unit 1 of the air conditioner may be embedded in the ceiling L.

The indoor unit 1 of the air conditioner includes a housing 10 having a suction port 11 and a discharge port 33, a heat exchanger 80 provided inside the housing 10, and a blower fan 40 for causing air to flow.

The housing may have a substantially circular shape when viewed in the vertical direction. The housing 10 may be constituted of an upper housing 20 disposed inside the ceiling L, an intermediate housing 21 disposed below the upper housing 20, and a lower housing 30 coupled to the bottom of the intermediate housing 21.

However, although the intermediate housing 21 and the lower housing 30 have been differentiated using terms such as intermediate, and lower for convenience of the description, the intermediate housing 21 and the lower housing 30 may be formed as a separable single component.

That is, the intermediate housing 21 may be seen as a single configuration of the lower housing 30. Thus, the intermediate housing according to an embodiment of the present invention, a first lower housing, and a second lower housing which will be described later may be respectively named as a first lower housing, a second lower housing, and a third lower housing, but without being limited thereto, they may also be named in various ways.

The lower housing 30 may include a first lower housing 31 that is coupled to a lower portion of the intermediate housing 21 and has an annular shape formed along a perimeter of the intermediate housing 21 and a second lower housing 32 that is coupled to a lower portion of the first lower housing 31 and covers the lower portion of the first lower housing 31.

The first lower housing 31 may be constituted with an outer first lower housing 31a that is disposed along a perimeter at a lower side of the intermediate housing 21 and formed in an annular shape and an inner first lower housing 31b that is disposed radially inside of the outer first lower housing 31a and provided in an annular shape. The outer first lower housing 31a and the inner first lower housing 31b may be provided to be detachable as shown in the embodiment of the present invention but also may be integrally formed (see FIG. 5).

A suction port 11 which communicates with the outside to the blower fan 40 and suctions external air may be provided at the center portion of the lower housing 30. That is, the center portion of the second lower housing 32 is open, and an opening of the second lower housing 32 communicates with the blower fan 40 via a space such that external air may be introduced into the housing 10.

A suction panel 15 that covers the suction port 11 and includes a suction grill 16 provided with a plurality of holes so that air is suctioned into the suction port 11 may be provided at the lower side of the suction port 11, and a discharge port 33 through which air is discharged may be formed radially outside of the suction panel 15. The discharge port 33 may have a substantially circular shape when viewed in the vertical direction.

The discharge port 33 may be formed in the first lower housing 31. That is, the discharge port 33 may be formed in a separation space formed between the radial directions of the outer first lower housing 31a and the inner first lower housing 31b. Specifically, the discharge port 33 may be defined as a space formed between an inner circumferential surface of the outer first lower housing 31a and an outer circumferential surface of the inner first lower housing 31b from an opening of the intermediate housing 21 (see FIGS. 2 and 5).

However, the discharge port 33 may be an opening formed in the lower housing 30 without being limited to the definition described as being the space that communicates with the outside so that air heat-exchanged in the heat exchanger 80 is discharged to the outside of the lower housing 30 and may be formed in a different configuration.

The upper housing 20 may be provided to cover the heat exchanger 80. The heat exchanger 80 may include the annular shape so that the upper housing 20 may include a cylindrical portion 20d having a cylindrical shape to cover the heat exchanger 80.

By such a structure, the indoor unit 1 of the air conditioner may suction air from the lower side thereof, cool and heat the suctioned air, and then discharge the cooled and heated air to the lower side again.

A coanda curved surface portion 34 that guides the air discharged through the discharge port 33 may be formed on the inner circumferential surface of the outer first lower housing 31a. The coanda curved surface portion 34 may make airflow discharged through the discharge port 33 flow in a close contact with the coanda curved surface portion 34.

A filter 17 for filtering dust from the air suctioned into the suction grill 16 may be coupled to an upper surface of the suction panel 15.

A suction guide 35 for guiding air passing through the suction panel 15 to flow up to the blower fan 40 may be provided at the center portion of the second lower housing 32. The heat exchanger 80 may have a substantially circular shape when viewed in the vertical direction.

The heat exchanger 80 may be placed on a drain tray 90 so that condensate water generated from the heat exchanger 80 may be collected in the drain tray 90.

The blower fan 40 may be provided radially inside of the heat exchanger 80. The blower fan 40 may be a centrifugal fan for suctioning air in an axial direction and discharging the suctioned air in a radial direction. A blower motor 41 for driving the blower fan 40 may be provided in the indoor unit 1 of the air conditioner. By such a structure, the indoor unit 1 of the air conditioner may suction air in a room, cool or heat the suctioned air, and then discharge the cooled or heated air into the room.

The indoor unit 1 of the air conditioner may further include an airflow controller 50 for controlling a discharged airflow.

The airflow controller 50 may suction air in the vicinity of the discharge port 33 and change the pressure, thereby controlling the direction of the discharged airflow. In addition, the airflow controller 50 may control the amount of the air suctioned in the vicinity of the discharge port 33. That is, the airflow controller 50 may control the direction of the discharged airflow by controlling the amount of the air drawn in the vicinity of the discharge port 33.

Here, controlling the direction of the discharged airflow means controlling the angle of the discharged airflow.

The airflow controller 50 may suction air at one lateral side in the advancing direction of the discharged airflow when suctioning the air in the vicinity of the discharge port 33.

Figure 3:
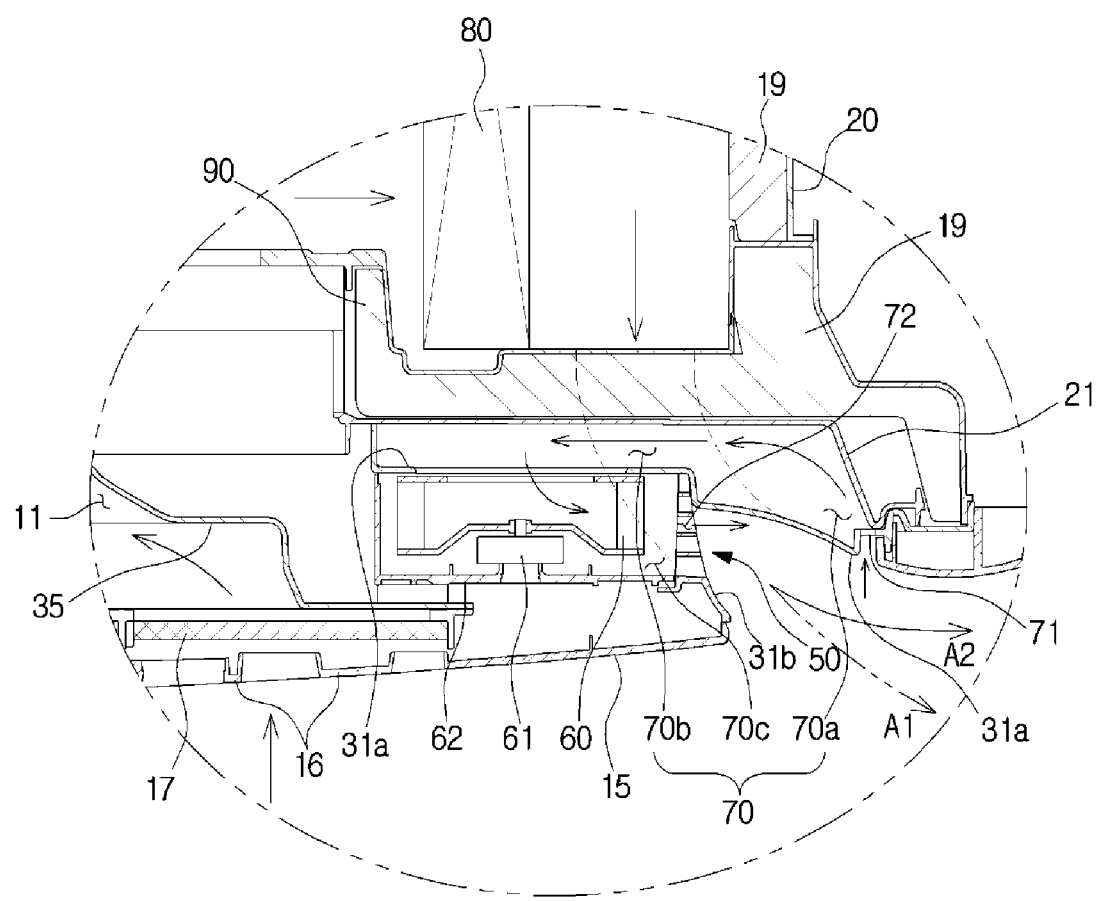
FIG. 3 is an enlarged view showing a part of FIG. 2.
Figure 4:
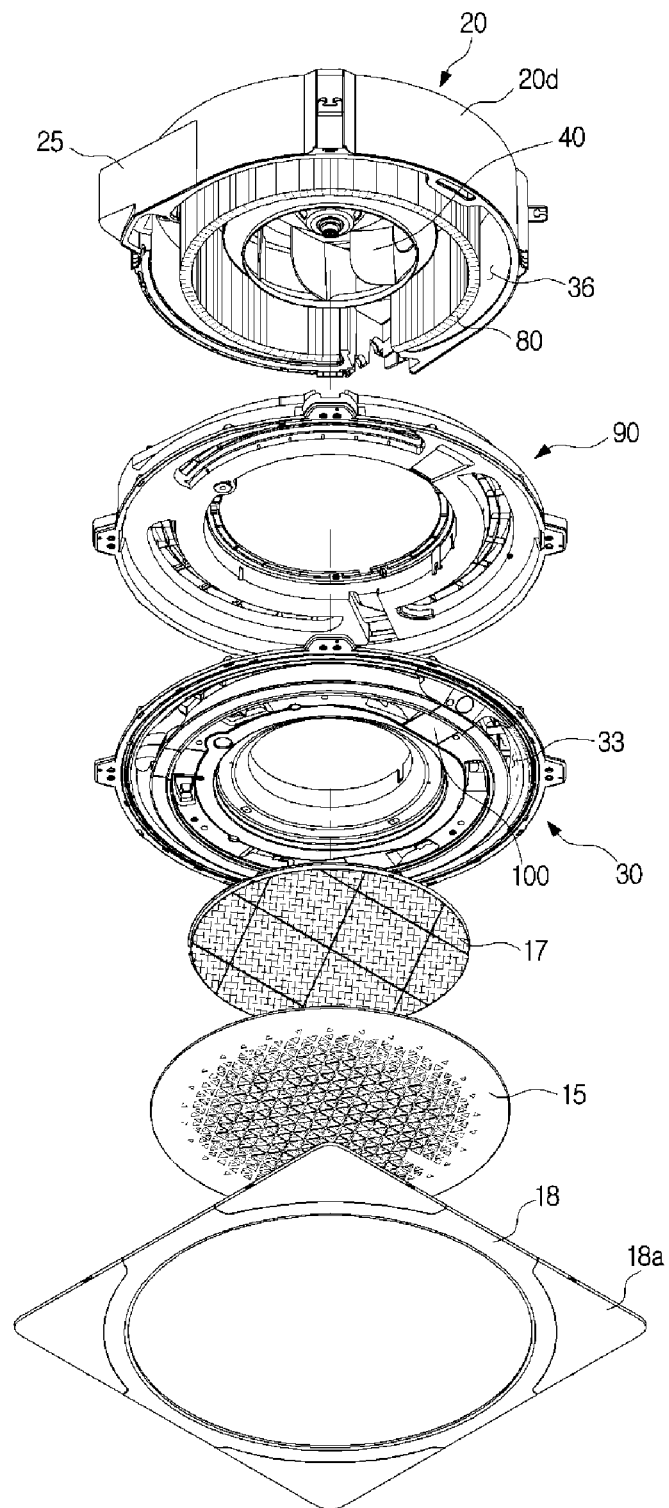
FIG. 4 is an exploded perspective view showing an air conditioner according to an embodiment of the present invention.

That is, as shown in FIG. 3, assuming the advancing direction of the discharged airflow when the airflow controller 50 is not operated is a direction A1, the airflow controller 50 may be operated to suction air at one lateral side in the direction A1 so that the advancing direction of the discharged airflow may be switched to a direction A2.

In this case, the angle to which the advancing direction of the discharged airflow is switched may be controlled by the amount of the air suctioned. That is, when the suction is reduced, the advancing direction may be changed by a small angle, and when the suction is increased, the advancing direction may be changed by a large angle.

The airflow controller 50 may discharge the suctioned air to the opposite lateral side in the advancing direction A1 of the discharged airflow. Accordingly, an angle of the discharged airflow may be increased, and airflow control may become smoother.

The airflow controller 50 may suction air radially outside of the discharge port 33. In this manner, the airflow controller 50 suctions air radially outside of the discharge port 33, and therefore the discharged airflow may be widely spread radially outside the discharge port 33 from a radial center portion of the discharge port 33.

The airflow controller 50 includes an airflow control fan 60 that generates a suction force for suctioning air in the vicinity of the discharge port 33, an airflow control motor 61 that drives the airflow control fan 60, an airflow control fan case 62 that covers the airflow control fan 60 and the airflow control motor 61, and a guide flow passage 70 that guides air drawn by the airflow control fan 60.

The airflow control fan 60 may be accommodated inside the lower housing 30. Specifically, the airflow control fan case 62 may be provided in a space formed at a lower side of the first lower housing 31. However, without being limited thereto, the airflow control fan 60 may be disposed inside the lower housing 30 and may be disposed in a space provided by the second lower housing 32 as well as a space provided by the lower side of the first lower housing 31 (see FIGS. 5 and 6).

In the present embodiment, three airflow control fans 60 are provided at an angle of 120°, but without being limited thereto, the number and arrangement of the airflow control fans 60 may be variously designed.

In addition, in the present embodiment, a centrifugal fan is used as the airflow control fan 60, but the airflow control fan 60 is not limited thereto, and a variety of fans such as an axial-flow fan, a cross-flow fan, a mixed-flow fan, and the like may be used according to design specifications.

The guide flow passage 70 connects an inlet 71 for suctioning air in the vicinity of the discharge port 33 and an outlet 72 for discharging the suctioned air.

The inlet 71 may be formed at a side of the coanda curved surface portion 34 of the first lower housing 31. Specifically, the inlet 71 may be provided on an inner surface of the outer first lower housing 31a.

The outlet 72 may be positioned in the vicinity of the discharge port 33 at the opposite side of the inlet 71. Specifically, the outlet 72 may be provided in the inner first lower housing 31b.

By such a structure, as described above, the airflow controller 50 may discharge the suctioned air to the opposite lateral side of the advancing direction A1 of the discharged airflow, and an angle of the discharged airflow may be increased, and airflow control may become smoother.

The guide flow passage 70 may include a first flow passage 70a that is formed in the circumferential direction of the lower housing 30 and communicates with the inlet 71, a second flow passage 70b that extends radially inward from the first flow passage 70a, and a third flow passage 70c that is formed in a region in which the airflow control fan 60 is seated.

Accordingly, air suctioned via the inlet 71 may pass through the first flow passage 70a, the second flow passage 70b, and the third flow passage 70c, and then may be discharged via the outlet 72.

The guide flow passage 70 may be formed by the intermediate housing 21, the first lower housing 31, and the second lower housing 32.

Figure 5:
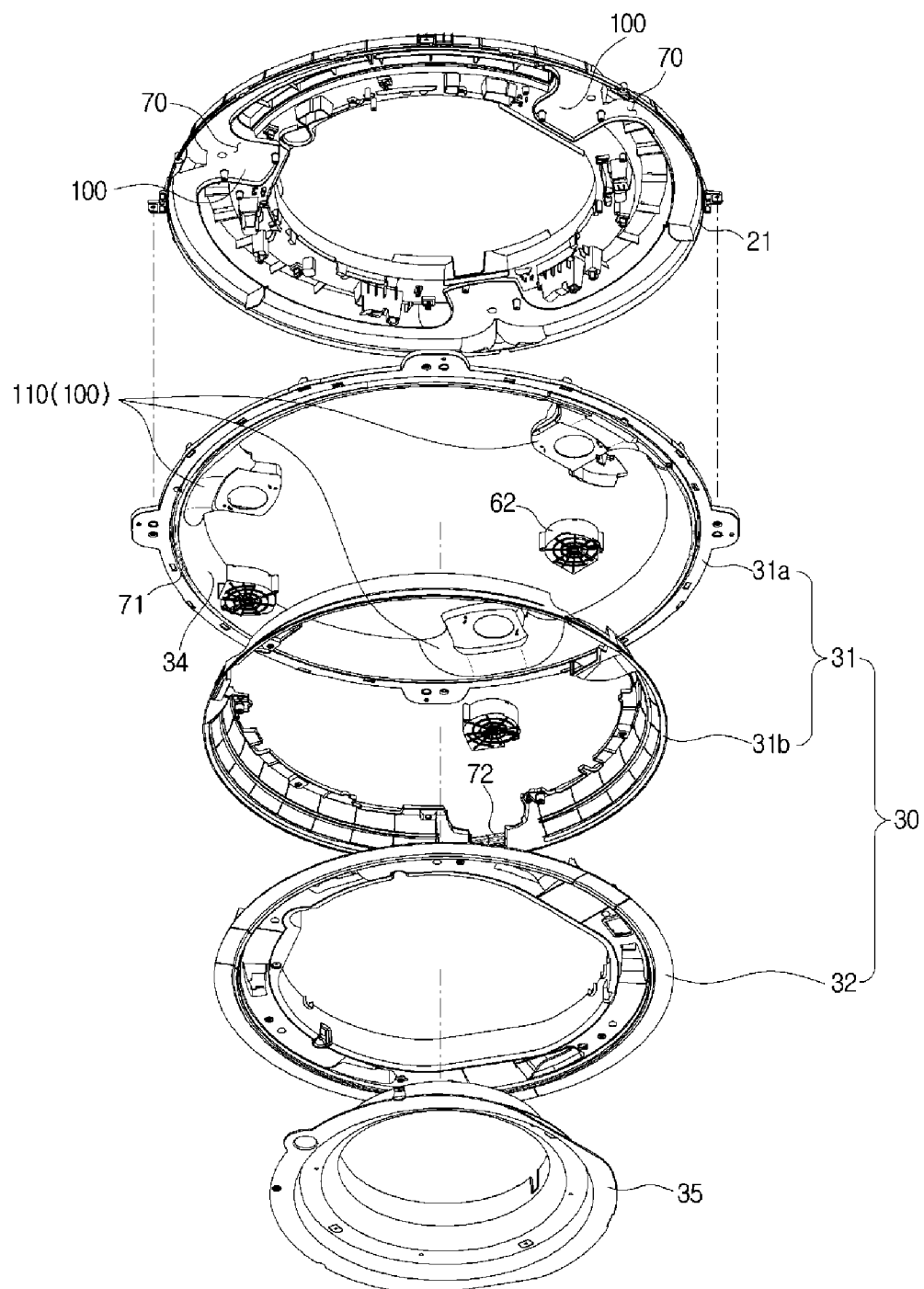
FIG. 5 is an exploded perspective view showing an intermediate housing and a lower housing of an air conditioner according to an embodiment of the present invention.
Figure 6:
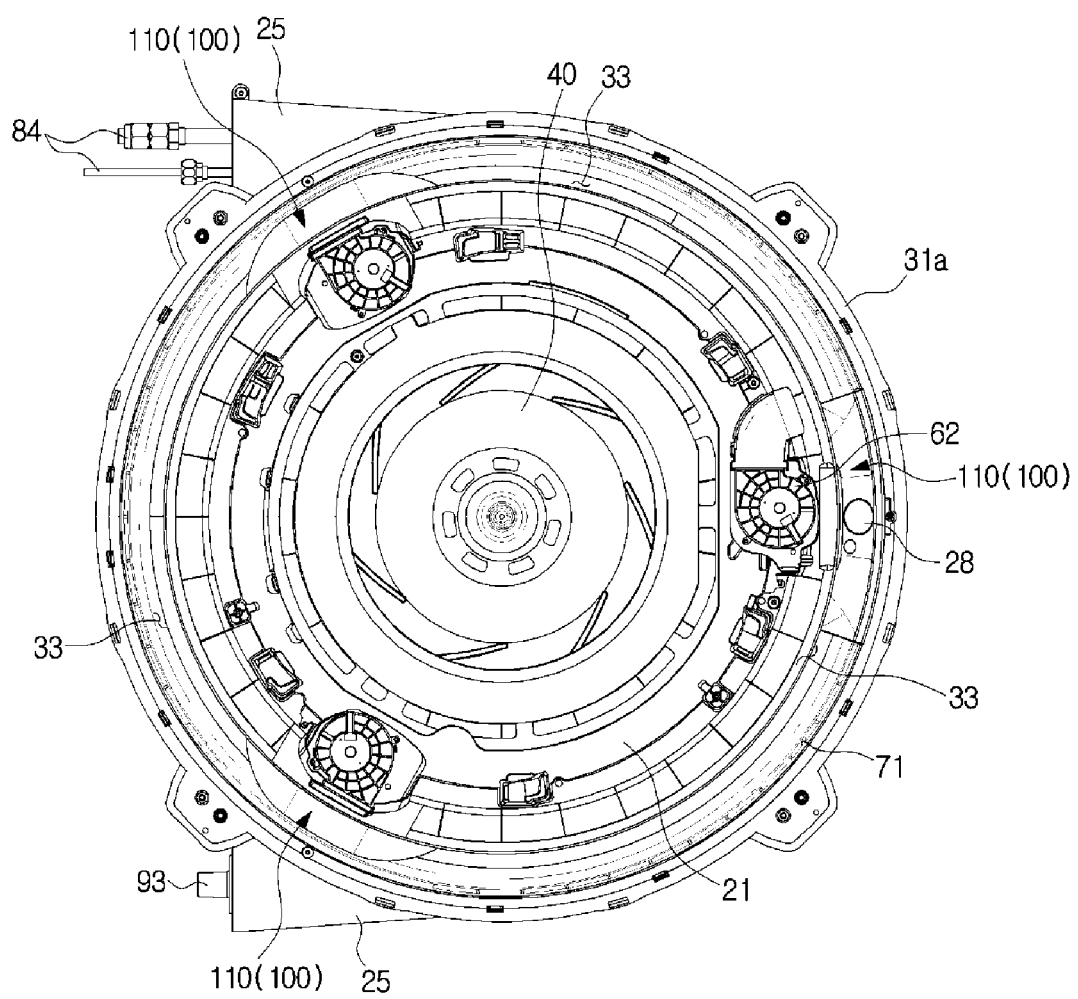
FIG. 6 is a rear view showing a state in which an inner first lower housing and a second lower housing of an air conditioner according to an embodiment of the present invention are removed.
Figure 7:
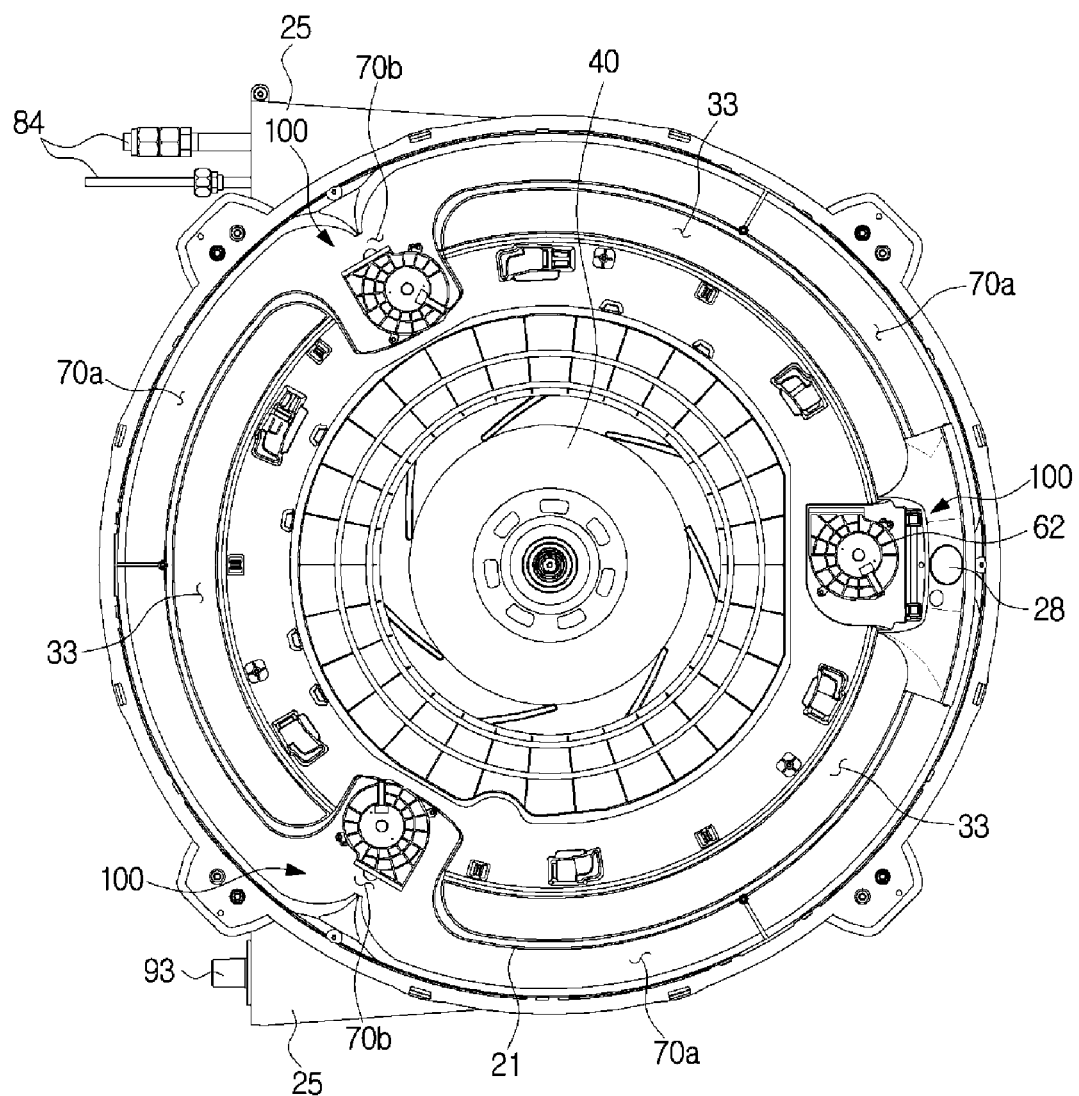
FIG. 7 is a rear view showing a state in which an inner first lower housing of an air conditioner is additionally removed from FIG. 6.

Specifically, the first flow passage 70a and the second flow passage 70b may be formed by an inner space formed by the intermediate housing 21 and the outer first lower housing 31a, and the third flow passage 70c may be formed by an inner space formed by the inner first lower housing 31b and the airflow control fan case 62 (see FIGS. 5 to 7).

However, such a structure of the guide flow passage 70 may be merely an example, and there is no limitation in the structure, shape, and arrangement of the guide flow passage 70 as long as the guide flow passage 70 connects the inlet 71 and the outlet 72.

By such a structure, the indoor unit of the air conditioner according to an embodiment of the present invention may control the discharged airflow even without the blade structure, compared to a conventional structure in which a blade is provided at the discharge port and the discharged airflow is controlled by rotation of the blade. Accordingly, since there is no interference with the blade, a discharge rate may be increased, and flow noise may be reduced.

In addition, a discharge port of an indoor unit of a conventional air conditioner may have only a linear shape in order to rotate the blade, but the discharge port of the indoor unit according to an embodiment of the present invention may be provided in a circular shape so that the housing, the heat exchanger, and the like may be provided in the circular shape, and therefore aesthetics may be improved with a differentiated design, and, considering the blower fan generally has a circular shape, the airflow may become more natural and the pressure loss may be reduced such that an improved cooling or heating performance of the air conditioner may result.

Hereinafter, a blocking region 100 for blocking a part of a discharge flow passage 36 will be described in detail.

Figure 8:
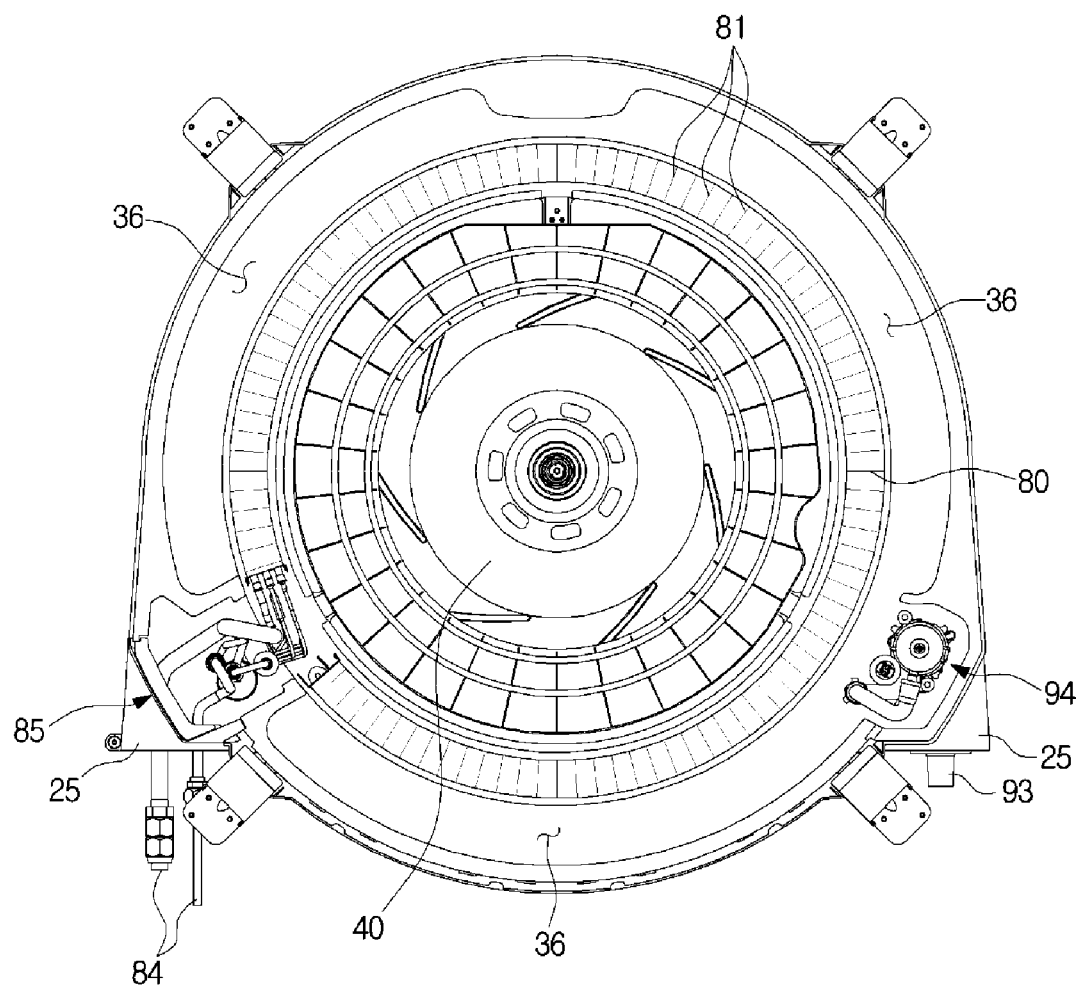
FIG. 8 is a rear view showing a state in which a lower housing, an intermediate housing, and a drain tray of an air conditioner according to an embodiment of the present invention are removed.

As shown in FIG. 8, the annular discharge flow passage 36 in which discharged air flows may be provided in a space between the outside of the heat exchanger 80 and the inner surface of the cylindrical housing 10.

Air in the discharge flow passage 36 may be air that is heat-exchanged with the heat exchanger 80 by the blower fan 40 and then moved in the radially outside direction of the heat exchanger 80 and may be discharged to the outside of the housing 10 along the discharge port 33.

Figure 9:
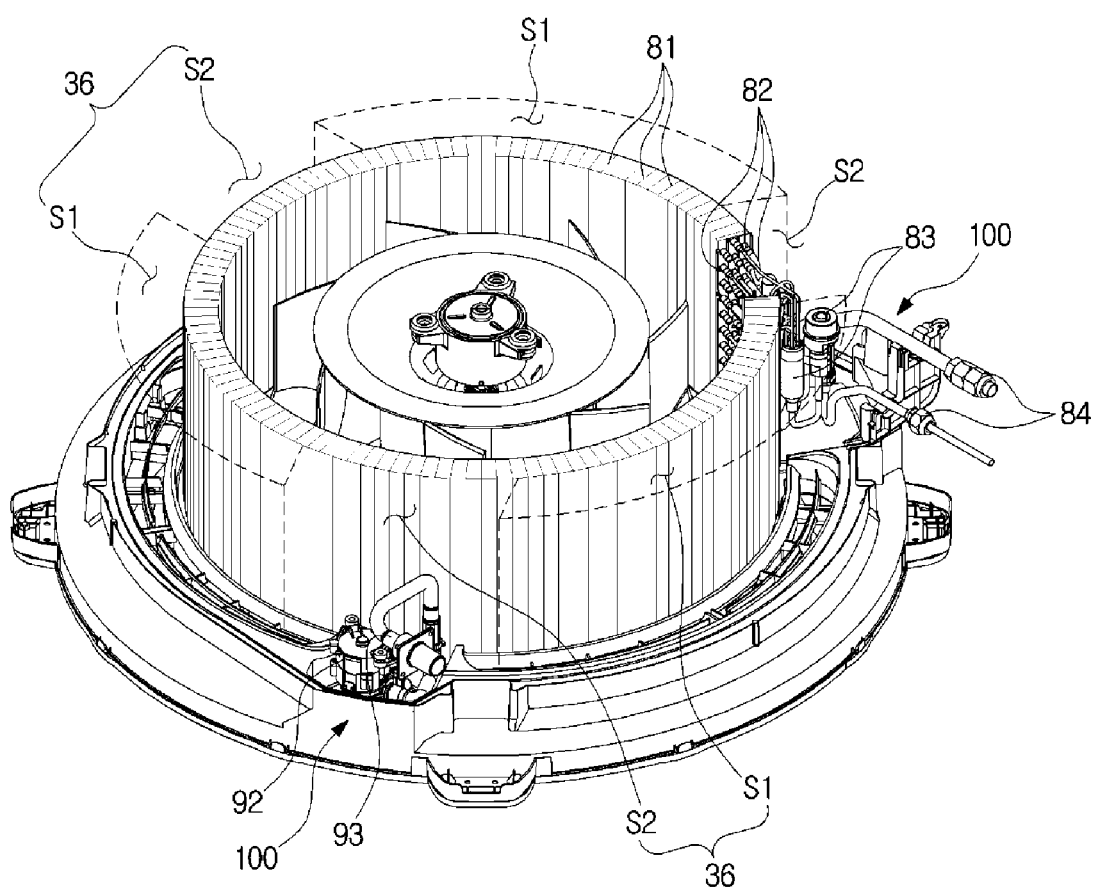
FIG. 9 is a perspective view showing a state in which an upper housing of an air conditioner according to an embodiment of the present invention is removed.
Figure 10:
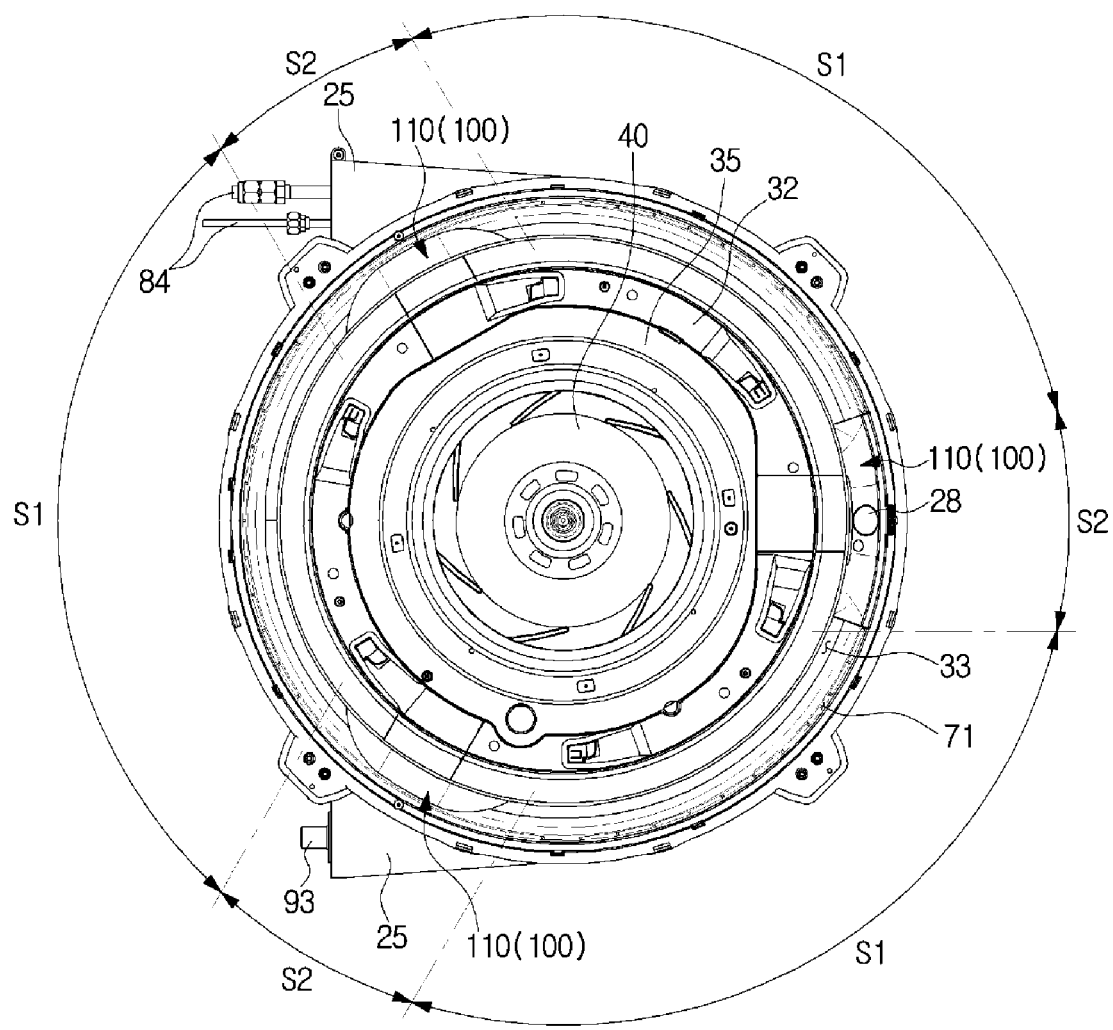
FIG. 10 is a rear view showing a region of a discharge flow passage in a state in which a suction panel of an air conditioner according to an embodiment of the present invention is removed.

As shown in FIGS. 9 and 10, the blocking region 100 that extends by a preset length in the circumferential direction of the discharge port 33 may be provided at one side of the discharge flow passage 36. Three blocking regions 100 may be provided and spaced apart from one another by a preset interval along the circumferential direction.

When the discharge port 33 is provided in a closed-loop annular shape to correspond to the discharge flow passage 36 so that air is discharged in all directions, a relatively high pressure is formed in the vicinity of the discharge port 33, and a relatively low pressure is formed in the vicinity of the suction port 11. In addition, since air is discharged in all directions of the discharge port 33 and an air curtain is formed, air to be suctioned through the suction port 11 may not be supplied to a side of the suction port 11. In this situation, the air discharged from the discharge port 33 is re-suctioned through the suction port 11, the re-suctioned air causes a dew formation phenomenon inside the housing 10, and the discharged air is lost to result in a reduction in the quality of air sensed by body.

Accordingly, the blocking regions 100 according to an embodiment of the present invention may be provided at one side of the discharge flow passage 36 and partition the discharge port 33 by a preset length from a complete annular shape, and the discharge port 33 may be formed in an annular shape of which a part is blocked. In other words, the discharge port 33 may be provided in an arc shape.

The blocking regions 100 may be provided on the intermediate housing 21, the first lower housing 31, and the drain tray 90 (a region provided to partition the discharge port 33 from the first lower housing 31 among the blocking regions 100 is separately defined as a bridge 110).

According to an embodiment of the present invention, a section that partitions three discharge ports 33 is provided in the first lower housing 31, so that three bridges 110 may be provided.

The bridge 110 may be a space that partitions the discharge port 33 in the first lower housing 31 as described above and form a part of the second flow passage 70b.

Accordingly, the discharge flow passage 36 may be divided into a discharge section S1 in which air passes through the discharge port 33 along a region other than the blocking region 100 in which air flows and is discharged and a non-discharge section S2 in which air is blocked by the blocking region 100 and is not discharged.

That is, the blocking region 100 may form the non-discharge section S2 that supplies air suctioned through the suction port 11. In addition, the blocking region 100 may reduce a pressure difference between the low pressure in the vicinity of the suction port 11 and the high pressure in the vicinity of the discharge port 33.

Accordingly, as the area of the blocking region 100 is increased, the non-discharge section S2 increases, and the discharge section S1 correspondingly decreases.

However, the discharge section S1 and the non-discharge section S2 shown in FIGS. 9 and 10 are schematically shown for convenience of description, and they are not divided by boundary lines in a dichotomous manner as shown in FIGS. 9 and 10 and are divided only by a flow of air.

In the indoor unit 1 of the air conditioner, although the three blocking regions 100 are provided with the same interval between one another, that is, at every 120 degrees, the present invention is not limited thereto, and only one blocking region 100 may be provided. Also, two blocking regions 100 may be provided at an angle of 180°, and four blocking regions 100 may be provided at an angle of 90°.

In addition, a plurality of blocking regions 100 may be disposed at mutually different angles. Also, five blocking regions 100 or more may be provided. That is, the number of the blocking regions 100 is not limited. However, the sum of lengths in the circumferential direction of such blocking regions 100 may be provided with 5% or more and 40% or less of the length in the circumferential direction of the discharge port 33 or the circumferential length of the discharge flow passage 36. That is, a ratio of the sum of the discharge section S1 and the non-discharge section S2 to the non-discharge section S2 may be provided to be 5% or more and 40% or less.

By such blocking regions 100, air from the discharge port 33 may be spread and discharged in order to cool or heat a room without being re-suctioned by the suction port 11 as described above.

The airflow controller 50 may be disposed in the blocking region 100. The discharge flow passage 36 is provided in the annular shape outside the heat exchanger 80, and this is for being able to restrict a flow of air introduced into the discharge port 33 when the airflow controller 50 is disposed in a space other than the blocking region 100.

Air in the discharge flow passage 36 may be discharged to the outside of the housing 10 through the discharge port 33 along a region other than the blocking region 100, and when a component such as the airflow controller 50 is disposed in the region other than the blocking region 100, the discharge section S1 in which air is discharged to the discharge port 33 may be reduced so that the flow of the air may be limited and efficiency of the air conditioner may be reduced.

That is, when the airflow controller 50 is disposed at the discharge port 33, the region itself in which the airflow controller 50 is disposed becomes the blocking region 100, so that the non-discharge section S2 is increased. Accordingly, the airflow controller 50 may be provided in the blocking region 100, thereby maximizing the discharge section S1.

Specifically, the airflow control fan 60 may be disposed on the bridge 110, and at least a part of the second flow passage 70b that communicates the airflow control fan 60 and the inlet 71 provided in the first lower housing 31 may be formed by the bridge 110. A part of the intermediate housing 21 that forms the other part of the second flow passage 70b may be provided on the blocking region 100, thereby maximizing the discharge section S1 (see FIG. 7).

In addition, the indoor unit 1 of the air conditioner may include a display unit 28 that displays an operating status of the air conditioner to a user, and the display unit 28 may be also disposed in the blocking region 100 in order to maximize the discharge section S1. An electronic unit (not shown) for driving the display unit 28 may be also disposed at an upper side of the display unit 28 and disposed in the blocking region 100 (see FIG. 7).

As shown in FIG. 9, a drain extraction unit 94 and a refrigerant pipe connecting unit 85 may be provided on the blocking region 100. This is to maximize the discharge section S1 by disposing the drain extraction unit 94 and the refrigerant pipe connecting unit 85 in the blocking region 100, as described above.

The drain extraction unit 94 may be provided in the drain tray 90 to discharge condensate water collected in the drain tray 90 to the outside of the indoor unit 1 of the air conditioner. The drain extraction unit 94 may include a drain pump that discharges condensate water to the outside of the indoor unit 1 of the air conditioner by pumping the condensate water and a drain pipe connecting portion 93 that connects an external drain pipe to the drain pump 92.

The refrigerant pipe connecting unit 85 connects to a refrigerant pipe 84 for supplying refrigerant from the outside to the heat exchanger 80. The refrigerant pipe connecting unit 85 includes a pipe portion that passes through the upper housing 20, so that the refrigerant pipe 84 is connected to the heat exchanger 80.

The refrigerant pipe connecting unit 85 may include a header 83 that is connected to a part of tubes 82 that is provided to make a refrigerant flow in the heat exchanger 80 and to the pipe portion of the refrigerant pipe connecting unit 85 to supply or collect refrigerant to the tubes 82.

In particular, the drain extraction unit 94 and the refrigerant pipe connecting unit 85 are disposed in the blocking region 100, so that the shape of the annular heat exchanger 80 may be maintained.

Specifically, the drain extraction unit 94 and the refrigerant pipe connecting unit 80 may be disposed at a height corresponding to the height at which the heat exchanger 80 is disposed, and because of this, when the drain extraction unit 94 and the refrigerant pipe connecting unit 85 are disposed in the region other than the blocking region 100, partial sections of the heat exchanger 80 may be provided in a shape having a bent portion rather than an annular shape in order to secure discharge section S1 corresponding to each disposed component.

When the bent portion is formed in the heat exchanger 80, heat exchange fins 81 which are disposed in the tubes 82 passing through the entire heat exchanger 80 to enlarge a heat exchange area cannot be disposed at regular intervals in the bent portion, so that the heat exchange efficiency may be reduced.

That is, the heat exchanger 80 according to an embodiment of the present invention may be provided in the circular and annular shape so that each of the heat exchange fins 81 may be disposed at regular intervals, but a bent portion may be formed in a partial section of the heat exchanger 80. In this case, due to the irregular intervals of the heat exchange fins 81, a flow of the suctioned air is not constant, and therefore the heat exchange efficiency may be reduced.

In addition, in the case of the conventional air conditioner, the heat exchanger is disposed in a rectangular shape and the drain extraction unit and the refrigerant pipe connecting unit are disposed at corner sides of a rectangular shape, and the bent portion is included in the heat exchanger in order to secure a space for allowing each component to be disposed at the corner sides.

Accordingly, the problem of the reduction in the efficiency of the heat exchanger due to the bent portion has occurred as described above, and therefore the heat exchanger is formed asymmetrically due to the formation of the bent portion and the corresponding discharge port is also formed asymmetrically, thereby failing to form uniformly discharged airflow into a room.

However, according to an embodiment of the present invention, the heat exchanger 80 is provided in the circular and annular shape, and the drain extraction unit 94 and the refrigerant pipe connecting unit 85 are disposed in the blocking region 100 so that the heat exchanger is provided in a certain symmetric shape so that the heat exchange efficiency may not be reduced and, at the same time, a discharge port having a symmetric shape may be formed, thereby solving the conventional problem.

Hereinafter, a protrusion portion 25 that protrudes radially outside of the housing 10 in order for the cylindrical housing 10 to cover the drain extraction unit 94 and the refrigerant pipe connecting unit 85 will be described.

Figure 11:
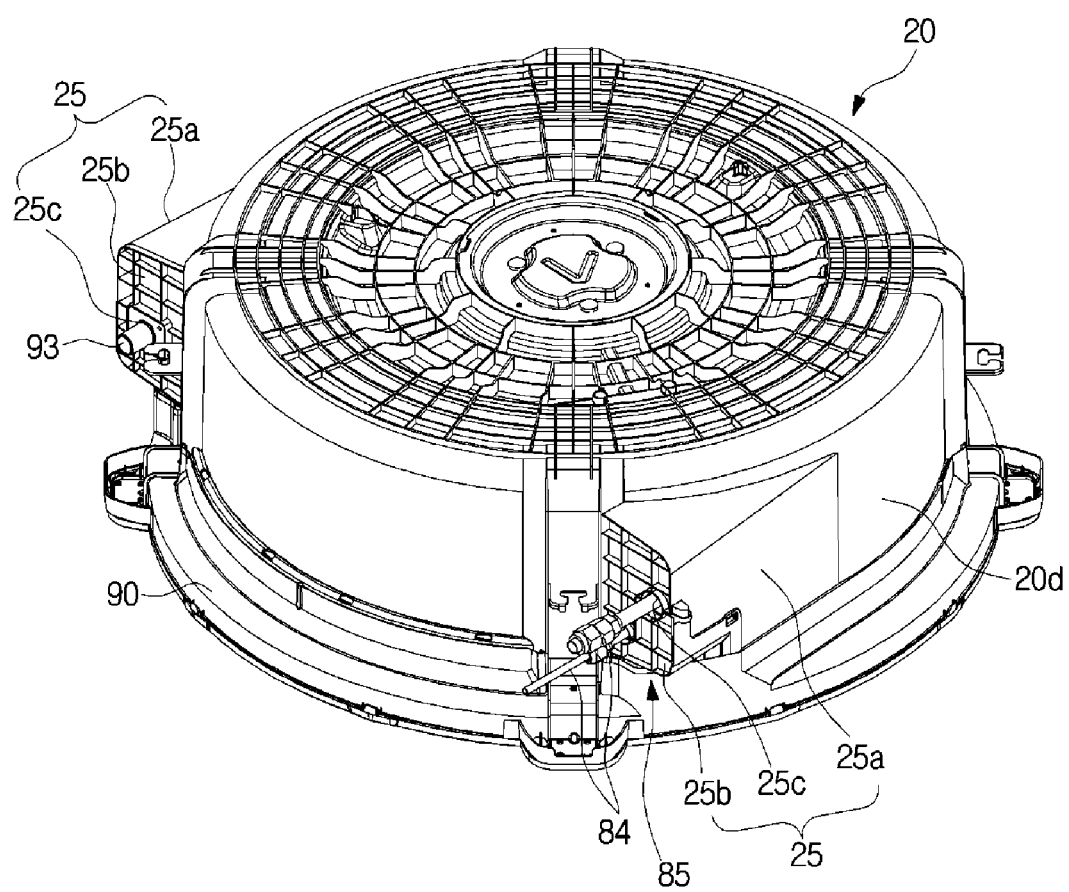
FIG. 11 is a perspective view showing an air conditioner according to an embodiment of the present invention.

As shown in FIG. 11, the upper housing 20 may be provided in the cylindrical shape, and the protrusion portion 25 that protrudes from the cylindrical portion 20*d* of the upper housing 20 may be provided in order to cover the drain extraction unit 94 and the refrigerant pipe connecting unit 85 disposed in the blocking region 100 as described above.

The drain extraction unit 94 and the refrigerant pipe connecting unit 85 should be disposed radially outside of the heat exchanger 80 while being disposed in the blocking region 100, in order to improve the performance of the air conditioner as described above.

Here, when the protrusion portion 25 is not formed, the drain extraction unit 94 and the refrigerant pipe connecting unit 85 may be located inside the cylindrical housing 10, and some components of the drain extraction unit 94 and the refrigerant pipe connecting unit 85 may be disposed radially inside of the heat exchanger 80 such that the drain extraction unit 94 and the refrigerant pipe connecting unit 85 may not be efficiently disposed.

Accordingly, the protrusion portion 25 may be provided in the upper housing 20 and disposed in the blocking region 100, so that it is possible to cover some components of the drain extraction unit 94 and the refrigerant pipe connecting unit 85 which can be disposed radially outside of the upper housing 20.

The protrusion portion 25 may include a first protrusion surface 25*a* that extends in a direction tangential to the outer circumferential surface of the cylindrical portion 20*d* of the upper housing 20 and a second protrusion surface 25*b* that abuts on the first protrusion surface 25*a* and extends in a direction normal to the outer circumferential surface of the upper housing 20 (since the cylindrical portion 20*d* includes the outer circumferential surface side of the cylindrical upper housing 20, the outer circumferential surface of the cylindrical portion 20*d* and the outer circumferential surface of the upper housing 20 have the same meaning).

The first protrusion surface 25*a* may extend in a direction corresponding to the tangential direction of the outer circumferential surface of the upper housing 20, and the second protrusion surface 25*b* may extend in a direction corresponding to the normal direction of the outer circumferential surface of the upper housing 20, and therefore the first protrusion surface 25*a* and the second protrusion surface 25*b* may be formed to extend substantially in the vertical direction.

A part of each of the drain extraction unit 94 and the refrigerant pipe connecting unit 85 may be provided in a space provided between the first protrusion surface 25*a* and the second protrusion surface 25*b*, so that a part of each of the drain extraction unit 94 and the refrigerant pipe connecting unit 85 which are disposed outside of the outer circumferential surface of the upper housing 20 may not be exposed to the outside.

A plurality of protrusion portions 25 may be provided to cover each of the drain extraction unit 94 and the refrigerant pipe connecting unit 85. Specifically, a plurality of first protrusion surfaces 25*a* may be provided to extend in each corresponding direction, and a plurality of second protrusion surfaces 25*b* that extend from the first protrusion surfaces 25*a* may each be provided to face the same one side, so that the plurality of protrusion portions 25 may be provided in a substantially symmetrical shape with respect to the outer circumferential surface of the upper housing 20.

A plurality of connection holes 25*c* through which the drain pipe connecting portion 93 and the refrigerant pipe 84 pass may be provided in the plurality of protrusion portions 25, so that the refrigerant pipe 84 connected to the drain pipe connection portion 93 and the heat exchanger 80 may extend outside of the upper housing 20.

A plurality of connection holes 25*c* may each be provided in the plurality of second protrusion surfaces 25*b*. The plurality of second protrusion surfaces 25*b* may be disposed to face the same one side, so that the plurality of connection holes 25*c* may be also disposed to face the same one side.

Accordingly, the drain pipe connecting portion 93 and the refrigerant pipe 84 which pass through the plurality of connection holes 25*c* may each extend to the outside of the housing 10 toward the same direction.

The drain pipe connecting portion 93 and the refrigerant pipe 84 extend to the same side, so that there may be an effect of facilitating pipe when the indoor unit 1 of the air conditioner is embedded in the ceiling.

In addition, the plurality of connection holes 25*c* may be provided in the same plane as the plurality of second protrusion surfaces 25*b*, so that an operation of forming the connection holes 25*c* may be easily performed. When the protrusion portion 25 is provided in the form of a curved surface without including the first protrusion surface 25*a* and the second protrusion surface 25*b*, the connection holes 25*c* should be formed on the curved surface, and this is because a process of forming holes on the curved surface is more difficult than a process of forming holes on a flat surface.

Accordingly, the plurality of connection holes 25*c* may be easily formed on the plurality of second protrusion surfaces 25*b*. However, without being limited thereto, the plurality of connection holes 25*c* may be also formed on the plurality of the first protrusion surfaces 25*a*, but each formed on the plurality of second protrusion surfaces 25*b* each facing the same side so that directions of the plurality of connection holes 25*c* coincide as described above.

Figure 12:
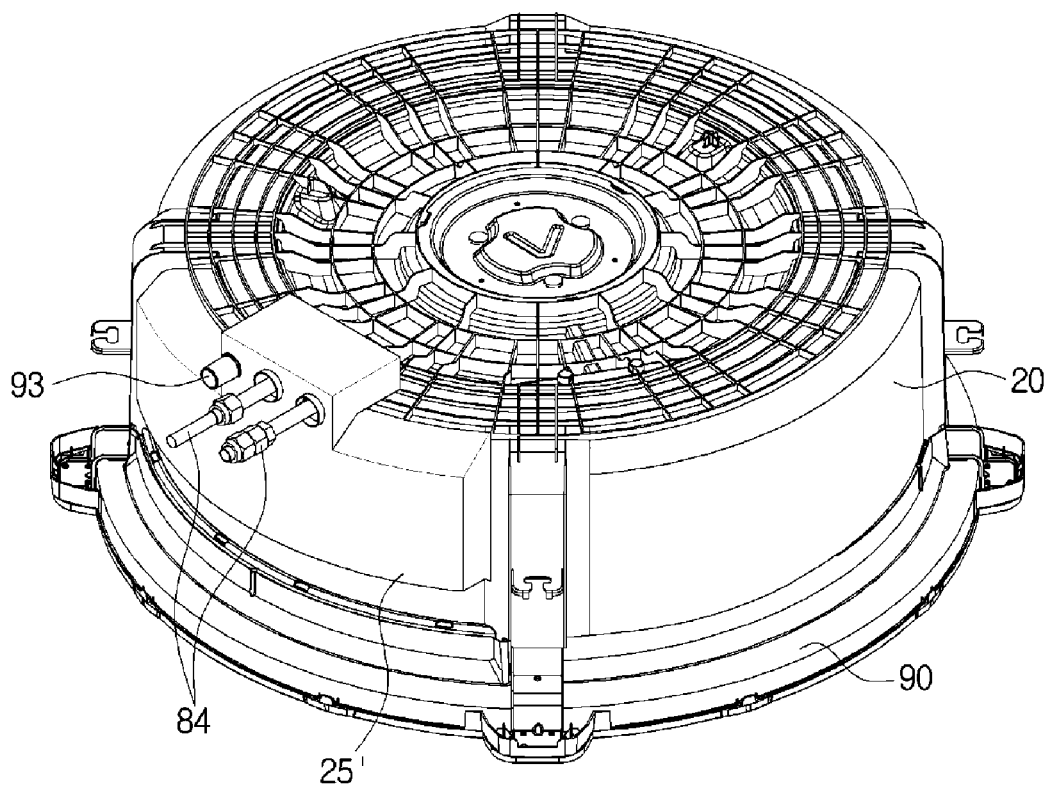
FIG. 12 is a perspective view showing an air conditioner according to another embodiment of the present invention.

FIG. 12 is a perspective view showing an upper housing 20 according to another embodiment of the present invention. As shown in FIG. 12, a single protrusion portion 25' is provided so that the drain pipe connecting portion 93 and the refrigerant pipe 94 may extend from the single protrusion portion 25'.

Although not shown, this may be a shape obtained when a single blocking region 100 is provided as described above.

This is because a circumferential length of the blocking region 100 may be provided long even though a single blocking region 100 is formed so that the drain extraction unit 94 and the refrigerant pipe connecting unit 85 are both disposed in the single blocking region 100.

Hereinafter, the drain tray 90 and the upper housing 20 to which the drain tray 90 is coupled will be described in detail.

The drain tray 90 may be disposed below the heat exchanger 80 so as to collect condensate water generated from the heat exchanger 80. In addition, an opening 95 through which the discharge section S1 may penetrate may be provided in a section of the drain tray 90 other than the blocking region 100, and the opening 95 is not formed in order to block the discharge flow passage 36 in the section of the drain tray 90 disposed in the blocking region 100.

Figure 13:
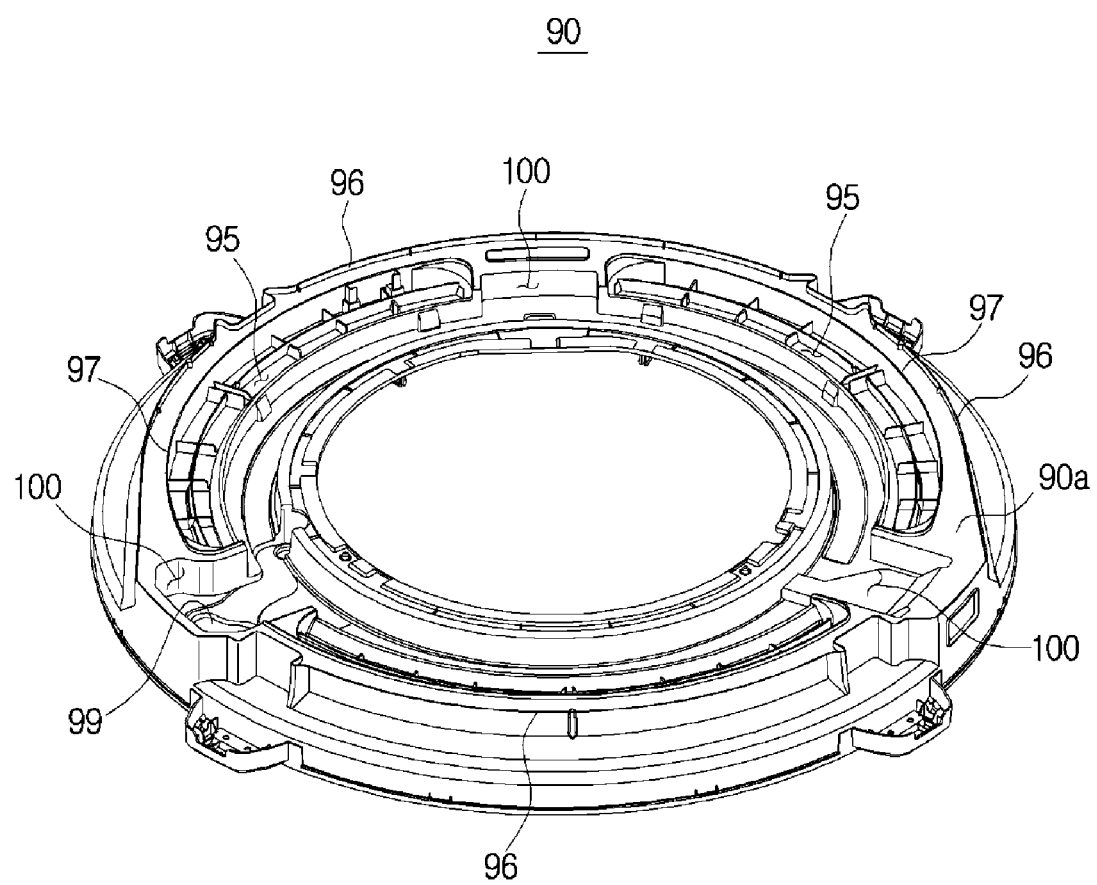
FIG. 13 is a perspective view showing a drain tray of an air conditioner according to an embodiment of the present invention.
Figure 14:
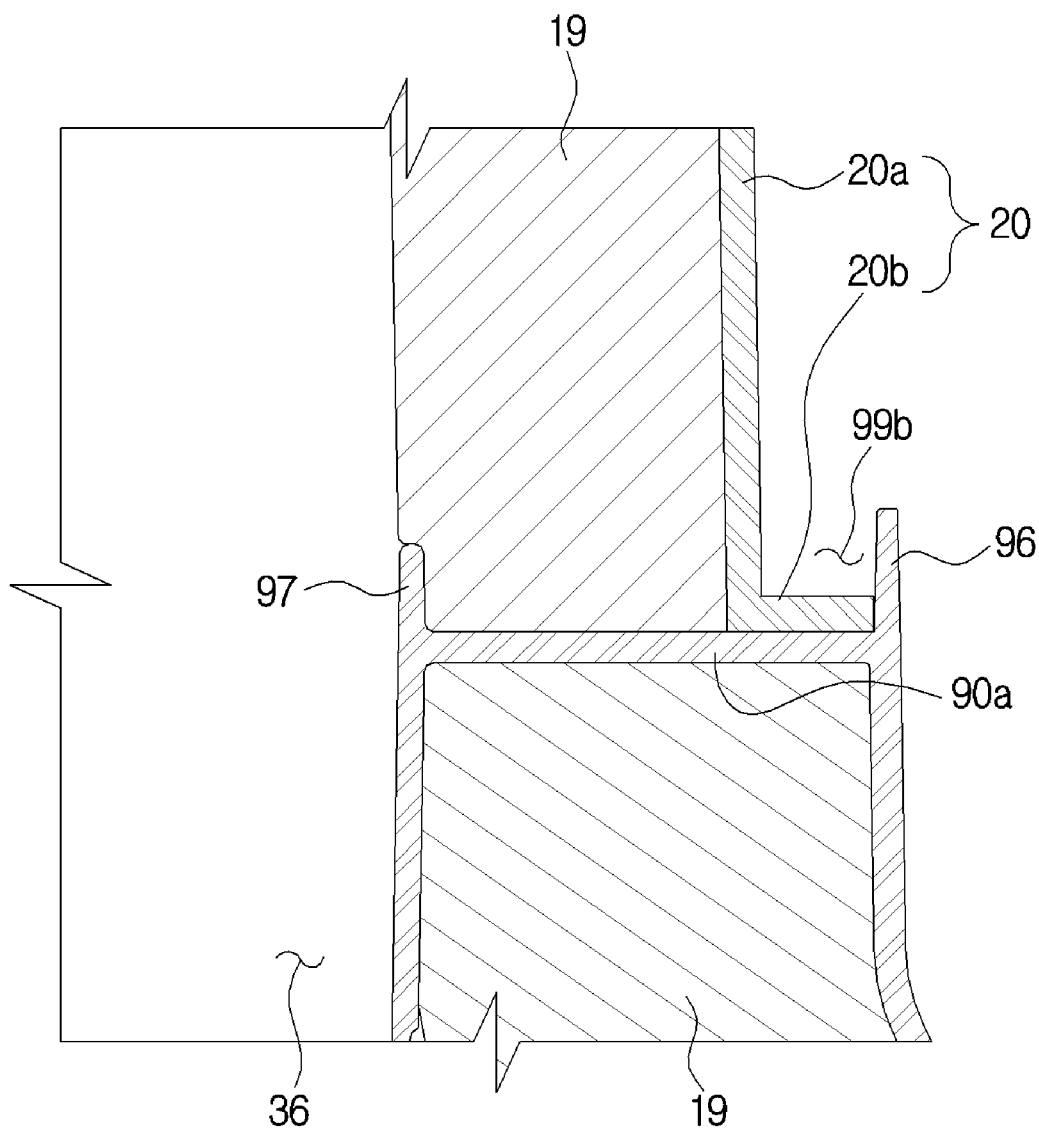
FIG. 14 is a side cross-sectional view showing a part of a drain tray and an upper housing of an air conditioner according to an embodiment of the present invention.

As shown in FIGS. 13 and 14, a top surface 90a of the drain tray 90 may be provided to extend outside of the outer circumferential surface 20a of the upper housing 20. An outer rib 96 that protrudes upward may be provided outside of the top surface 90a that extends outside of the outer circumferential surface 20a of the upper housing 20.

In addition, an extension portion 20b that extends radially outside of the upper housing 20 by the length which the top surface 90a of the drain tray 90 extends outward may be provided at a bottom side of the upper housing 20.

The upper housing 20 and the drain tray 90 may be coupled to each other while abutting on each other in the vertical direction, and when the upper housing 20 and the drain tray 90 are coupled to each other, the extension portion 20b may be coupled to abut an inner circumferential surface of the outer rib 96.

This is to maintain an airtightness between each of the components when the drain tray 90 and the upper housing 20 are coupled to each other so that the discharged airflow may be prevented from being leaked to the outside of the upper housing 20 and to form an external water collecting space 99b which will be described later.

That is, by the extension portion 20b and the outer rib 96, upper housing 20 and the drain tray 90 are coupled to each other in a state in which a bottom surface of the extension portion 20b and the top surface 90a of the drain tray 90 abut each other and an outer circumferential surface of the extension portion 20b and the inner circumferential surface of the outer rib 96 abut each other, so that a double-sealing effect may be generated.

An inner rib 97 that is disposed radially inside of the outer circumferential surface 20a of the upper housing 20 and protrudes upward may be provided in the top surface 90a of the drain tray 90.

A heat insulating material 19 may be disposed on the inner circumferential surface of the upper housing 20 in order to prevent heat exchange efficiency from being reduced due to a difference between cold air in the discharge flow passage 36 and the indoor temperature outside the upper housing 20 and to prevent condensate water from being generated on the outer surface of the housing 10 due to a temperature difference between the inside and outside of the housing 10. In addition, the heat insulating material 19 may be additionally disposed at a lower side of the drain tray 90.

Here, the inner rib 97 may be provided to abut a lower side of the heat insulating material 19 in order to maintain an airtightness between the heat insulating material 19 and the upper housing 20 and between the heat insulating material 19 and the drain tray 90. Accordingly, when the heat insulating material 19 and the drain tray 90 are coupled to each other, an outer circumferential surface of the inner rib 97 and an inner peripheral surface of the heat insulating material 19 as well as a lower surface of the heat insulating material 19 and the top surface 90a of the drain tray 90 may be additionally sealed, and therefore the airtightness may be maintained when coupling between the upper housings 20, thereby minimizing the leakage of the discharged airflow.

That is, the drain tray 90 includes the inner rib 97 and the outer rib 96 which are respectively formed radially inside and outside of the heat insulating material 19 and the upper housing 20, so that the drain tray 90 may doubly abut to couple to the heat insulating material 19 and the upper housing 20, and a double-sealing effect in which the airtightness is maintained may be generated.

Figure 15:
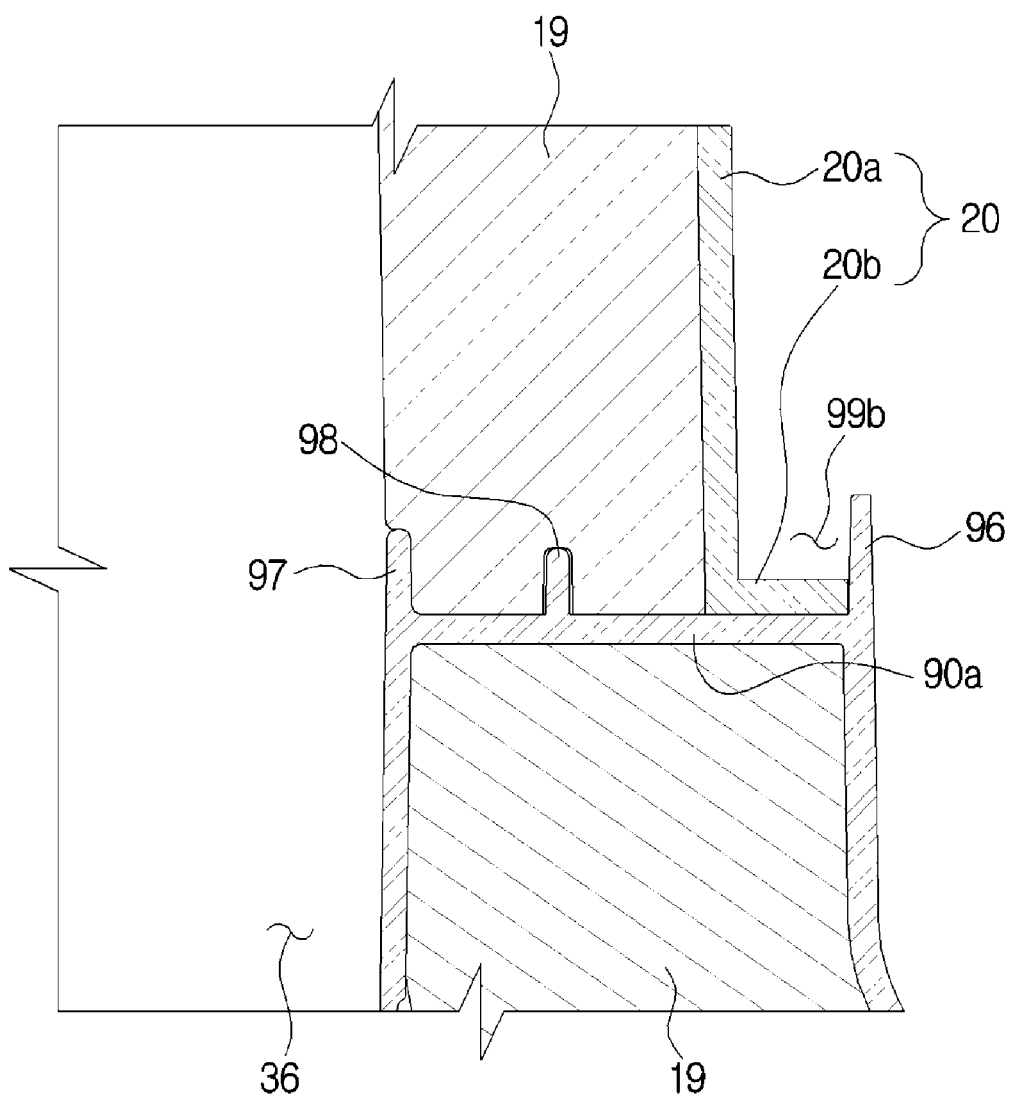
FIG. 15 is a side cross-sectional view showing a part of a drain tray and an upper housing of an air conditioner according to another embodiment of the present invention.

FIG. 15 shows a coupling structure of the drain tray 90 and the upper housing 20 according to still another embodiment of the present invention, and a coupling rib 98 that protrudes upward may be further formed between the inner rib 97 and the outer rib 96.

The coupling rib 98 may be inserted into the lower surface of the heat insulating material 19 so that an additional sealing effect between the heat insulating material 19 and the drain tray 90 may be generated.

The coupling rib 98 is not limited to an example of FIG. 15 and may be disposed at a side to which the upper housing 20 is coupled and inserted into a lower surface of the upper housing 20. Accordingly, the coupling rib 98 may generate an additional sealing effect between the upper housing 20 and the drain tray 90.

Condensate water is collected in the drain tray 90 as described above, and the drain extraction unit 94 may be disposed in the drain tray 90 in order to discharge the collected condensate water to the outside of the indoor unit 1 of the air conditioner.

A water collecting unit 99 in which the condensate water is collected may be disposed at a side in which the drain extraction unit 94 is disposed. The condensate water generated from the heat exchanger 80 is dropped downward and collected on the drain tray 90, and in this instance, the condensate water may be collected in the water collecting unit 99 by a gradient formed on the top surface 90a of the drain tray 90.

The condensate water collected in the water collecting unit 99 may be discharged to the outside of the indoor unit 1 of the air conditioner by the drain extraction unit 94.

The condensate water may be generated from the outer circumferential surface 20a of the upper housing 20 as well as the heat exchanger 80. This is because a part of the discharge flow passage 36 that is a section in which cold air is discharged is formed on the inner circumferential surface of the upper housing 20 and the outer circumferential surface 20a of the upper housing 20 is exposed to the indoor temperature, so that a temperature difference between the inside and outside of the upper housing 20 is generated.

As described above, the heat insulating material 19 is disposed on the inner circumferential surface of the upper housing 20 in order to prevent this, but when the indoor temperature is high, the condensate water may be generated on the outer circumferential surface 20a of the upper housing 20 due to a large temperature difference between the inside and outside of the upper housing 20.

The condensate water generated on the outer circumferential surface 20a may drop into the interior space and thereby may degrade the reliability of the air conditioner. However, since the air conditioner according to an embodiment of the present invention includes the external water collecting space 99b formed by the above-described outer rib 96 and extension portion 20b, this may be prevented.

Specifically, a space formed by one side of the outer circumferential surface 20*a*, the extension portion 20*b*, and the inner circumferential surface of the outer rib 96 may be provided as the external water collecting space 99*b* that can collect the condensate water dropped along the outer circumferential surface 20*a*, thereby preventing the condensate water generated from the outside from dripping into the interior space (see FIG. 14).

That is, the concave shape external water collecting space 99*b* is disposed at the bottom side of the upper housing 20, so that the condensate water dropped downward along the outer circumferential surface 20*a* of the upper housing 20 is collected in the external water collecting space 99*b* rather than the interior space.

Figure 16:
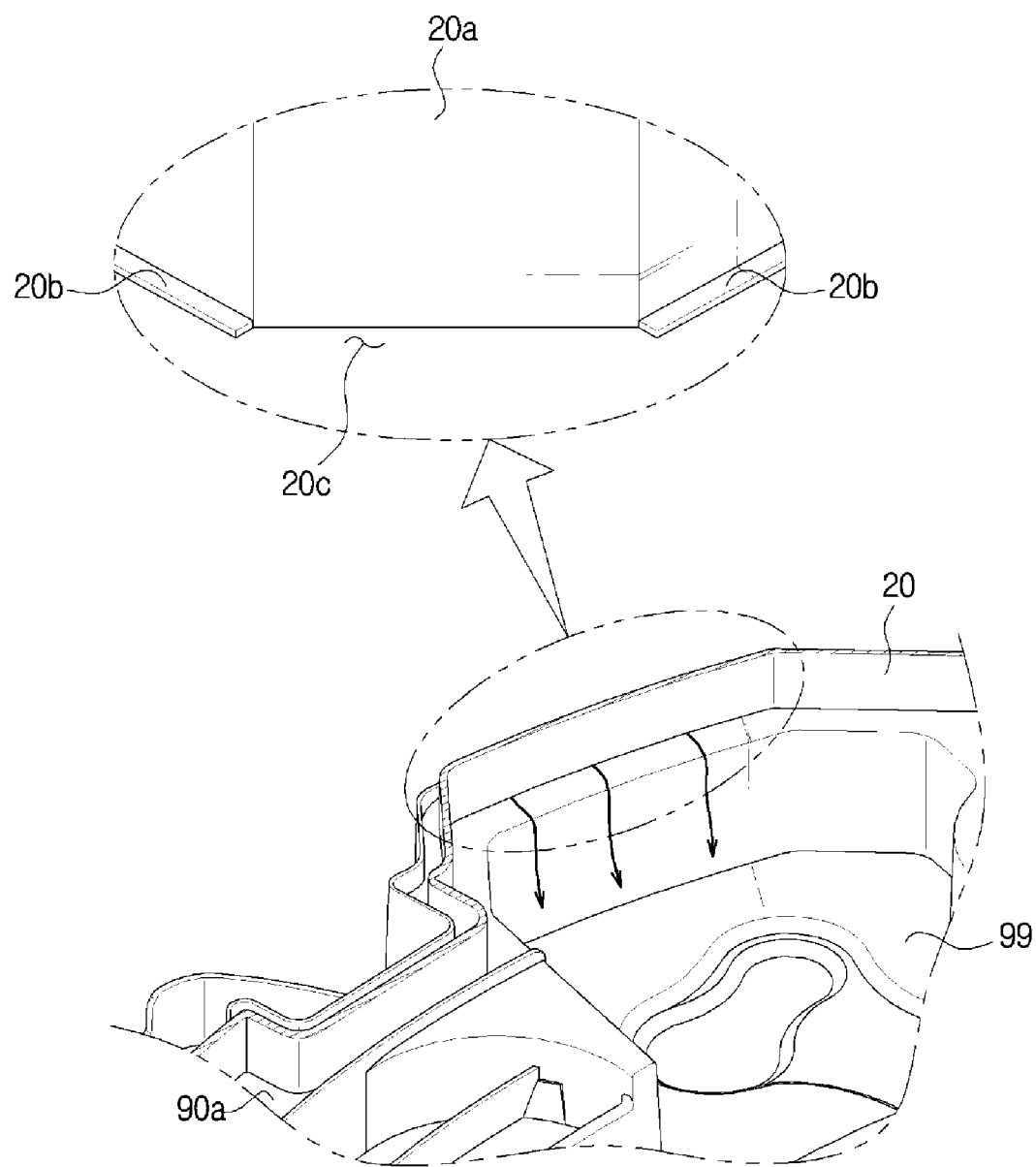
FIG. 16 is a partial perspective view showing a drain tray and an upper housing of an air conditioner according to an embodiment of the present invention.

As shown in FIG. 16, an incised portion 20*c* may be provided at one side of the upper housing 20 in order to prevent the condensate water collected in the external water collecting space 99*b* from overflowing to the outside. In FIG. 16, for convenience of description, components except for the heat insulating material 19 are shown.

Specifically, by moving the condensate water collected in the external water collecting space 99*b* to the water collecting unit 99, the condensate water on the external water collecting space 99*b* may be prevented from dripping outside.

The incised portion 20*c* is a space obtained by cutting one side of the extension portion 20*b*. Here, a slightly separated space may be generated between the upper housing 20 and the drain tray 90 at a side in which the extension portion 20*b* is not disposed, and the condensate water generated from the outside may flow into the upper housing 20 by passing through the outer circumferential surface 20*a* of the upper housing 20 and the heat insulating material 19 through the separated space and then flow into the water collecting unit 99.

Preferably, the incised portion 20*c* may be disposed at a position corresponding to a position in which the external water collecting space 99*b* is disposed. This is to prevent the condensate water flowed into the drain tray 90 through the incised portion 20*c* from flowing to spaces other than the external water collecting space 99*b*.

Accordingly, the condensate water collected in the external water collecting space 99*b* may flow into the drain tray 90 without dropping outside.

In addition, although not shown, a sealing member may be disposed between the upper housing 20 and the drain tray 90, so that the airtightness of the upper housing 20 and the drain tray 90 may be improved.

In this case, the sealing member may block the flow of air flowing between the upper housing 20 and the drain tray 90 and at the same time, make the water collected in the external water collecting space 99*b* move to the water collecting unit 99 through the sealing member.

Specifically, the sealing member may be formed of a member capable of absorbing moisture and make the condensate water flow to a side of the inner circumferential surface of the upper housing 20 by absorbing the condensate water collected in the external water collecting space 99*b*, so that the condensate water flowing into the upper housing 20 may flow to the water collecting unit 99 by the gradient.

Accordingly, when the sealing member is disposed, the water collected in the external water collecting space 99*b* may flow to the water collecting unit 99 even without a separate incised portion 20*c*, such that the upper housing 20 may not include the incised portion 20*c*.

Hereinafter, a wire insertion unit disposed in the upper housing will be described in detail.

Figure 17:
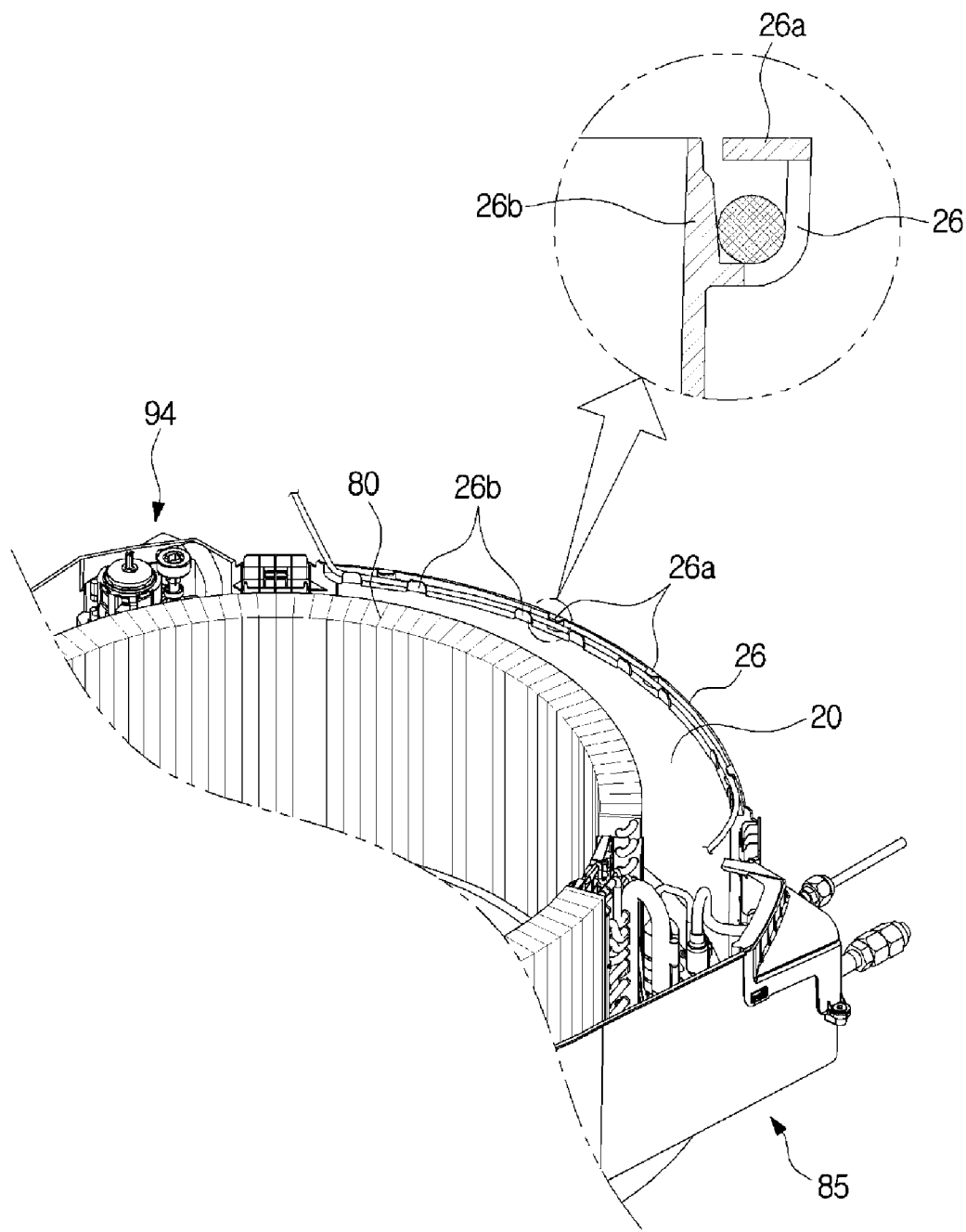
FIG. 17 is a view showing the inside of an upper housing of an air conditioner according to an embodiment of the present invention.

As shown in FIG. 17, a wire insertion unit 26 in which a wire for electrically connecting components (the drain pump 92, etc.) disposed inside the housing 10 is inserted may be provided at one side of the upper housing 20.

When the wire is disposed inside the housing in the case of the conventional air conditioner, the air conditioner has been assembled in the sequence in which the wire is disposed outside the housing in order to assemble the drain tray, the drain tray and the heat insulating material are assembled, and then the wire is disposed inside the housing.

When the wire is disposed after the heat insulating material is assembled, the inside of the housing is surrounded by the heating insulating material, the wire is temporarily fixed and disposed using a component such as a separate tape due to the absence of a component such as a hook capable of supporting the wire, and then an operation of electrically connecting the internal components is performed. At this point, a problem of an increased failure rate may occur caused by an unnecessary component added in the process of fixing the wire and the complicated operation.

In order to solve this, in the air conditioner according to an embodiment of the present invention, the wire insertion unit 26 is formed at one side of the upper housing 20, so that the wire may be inserted into the wire insertion unit 26 before assembling the drain tray 90 and the heat insulating material 19.

Accordingly, the heat insulating material 19 may be assembled in a state in which the wire is disposed inside the housing 10, so that an additional operation in which the wire is disposed outside, the heat insulating material 19 is assembled, and then the wire is disposed inside may be omitted.

That is, the wire insertion unit 26 may secure a space that protrudes in the radial direction of the upper housing 20 from one side of the upper housing 20 and thereby may fix the wire on the inner circumferential surface of the upper housing.

In addition, the wire is fixed on the inner circumferential surface of the upper housing 20, so that the corresponding operation may be easily performed without the interference of the wire when the drain tray 90 and the heat insulating material 19 are assembled, and the wire insertion unit 26 may include a removal prevention hook 26*a* for preventing the removal of the wire from the wire insertion unit 26 and a fixing rib 26*b* for preventing the wire from being laterally pushed to the side.

Accordingly, when the internal components are assembled, the wire may be fixed in the wire insertion unit 26, so that an additional operation of temporarily fixing the wire using a tape may be omitted.

Hereinafter, a hook coupling between the lower housing 30 and the drain tray 90 will be described in detail.

In the indoor unit 1 of the air conditioner, the lower housing 30, the intermediate housing 21, the drain tray 90, and the upper housing 20 may be coupled to one another by a coupling member 200 which will be described later. In this case, when the coupling member 200 is disassembled, a problem occurs where each of the components is easily separated.

In particular, in the case of a ceiling-embedded type air conditioner according to an embodiment of the present invention, when the indoor unit 1 of the air conditioner is disassembled due to a malfunction of the air conditioner or the like, a user who disassembles the components may be injured by the dropping of the components caused by each of the components that are easily separated.

Figure 18:
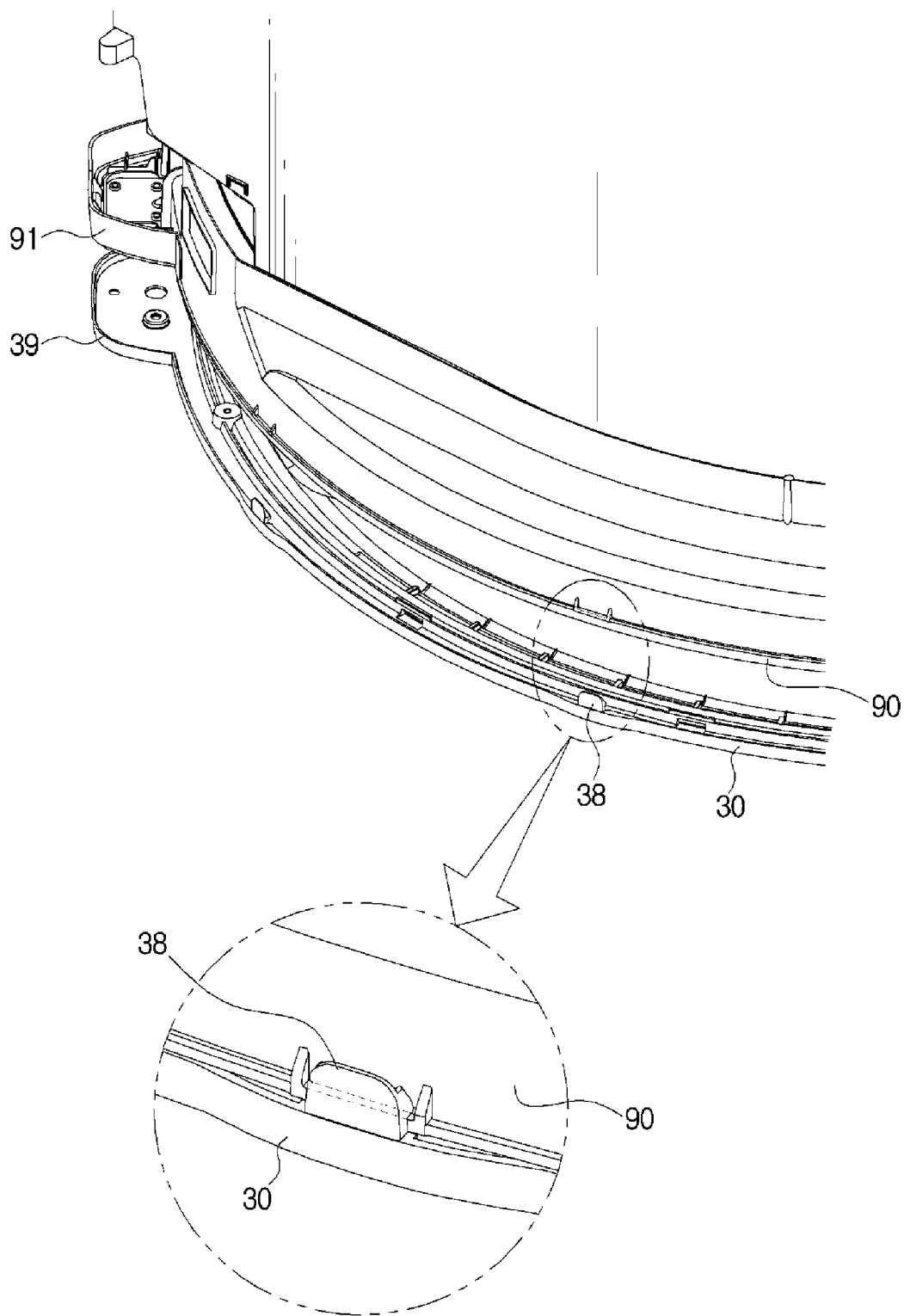
FIG. 18 is a view showing a state in which a drain tray and a lower housing of an air conditioner according to an embodiment of the present invention are coupled.

In order to solve this, the indoor unit 1 of the air conditioner according to an embodiment of the present invention may include a coupling hook to which each of the components can be temporarily coupled even when the coupling member 200 is disassembled, as shown in FIG. 18.

Specifically, a coupling hook 38 and a latched jaw may be provided between the lower housing 30 and the drain tray 90. A plurality of coupling hooks 38 that protrude to a side of the drain tray 90 may be disposed on the outer circumferential surface of the lower housing 30, and the latched jaw may be disposed in a position corresponding to the coupling hook 38 of the drain tray 90. The coupling hook 38 and the latched jaw may be disposed vice versa.

According to an embodiment of the present invention, the coupling hook 38 may protrude from and be provided on the outer circumferential surface of the outer first lower housing 31*a* but, without being limited thereto, may be provided in any location of the lower housing 30 disposed at a side adjacent to the drain tray 90 so that the lower housing 30 and the drain tray 90 are easily hook-coupled to each other.

In the air conditioner 1 according to an embodiment of the present invention, the intermediate housing 21 is disposed between the lower housing 30 and the drain tray 90, so that in a case in which a hook coupling is achieved only between the lower housing 30 and the drain tray 90, the intermediate housing 21 may be supported by the lower housing 30 and may not drop even when the coupling member 200 is removed.

However, unlike an embodiment of the present invention, an additional coupling hook may be provided even in the intermediate housing 21 so that the intermediate housing 21 may be hook-coupled to the lower housing 30 or the drain tray 90, and the intermediate housing 21 can be seen as a single component of the lower housing 30 as described above, and therefore it is obvious that the coupling hook coupled to the drain tray 90 may be provided even in the intermediate housing 21.

Hereinafter, characteristics in which the components of the indoor unit of the air conditioner are assembled by the coupling member 200 will be described.

Referring to FIG. 1, a cover member 18 that covers an exterior portion of the lower housing 30 may be disposed at a bottom side of the indoor unit 1 of the air conditioner. An auxiliary cover member 18*a* that is detachably disposed on the cover member 18 may be provided at four corners of the cover member 18.

In the indoor unit 1 of the air conditioner, the cover member 18, the lower housing 30, the intermediate housing 21, the drain tray 90, and the upper housing 20 are disposed sequentially layered on one another and coupled.

In the case of a conventional air conditioner, particularly, in the case of an air conditioner that generally controls the discharged airflow with a blade, the cover member, the drain tray, and the housing may be sequentially layered on one another and coupled, but the air conditioner according to an embodiment of the present invention may include the airflow controller provided at the lower side of the drain tray instead of including a blade, so that the number of components that are additionally layered and disposed such as the lower housing 30 and the intermediate housing 21 or the lower housing 30 including a plurality of components may be increased compared to the conventional air conditioner and result in a problem with the coupling between each of the components.

In particular, when the layered components are assembled, the assembling may be difficult due to the increased number of the layered components, and each of the components may be mainly formed as injection-molded products having plastic properties, and therefore the respective components may be damaged by contact caused by even a small impact when the components are assembled, resulting in a reduction in the durability of the indoor unit 1 of the air conditioner.

Figure 19:
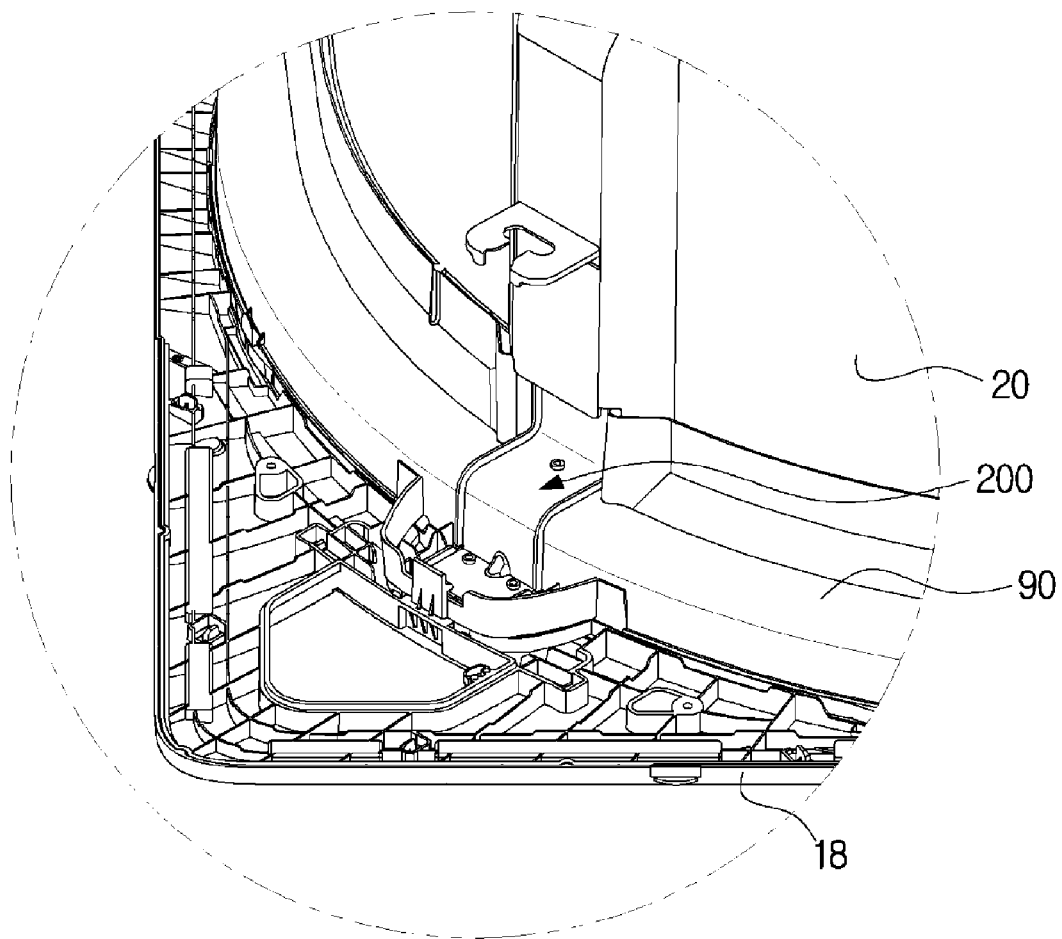
FIG. 19 is a view showing a state in which a cover member, a lower housing, a drain tray, and an upper housing of an air conditioner according to an embodiment of the present invention are coupled.
Figure 20:
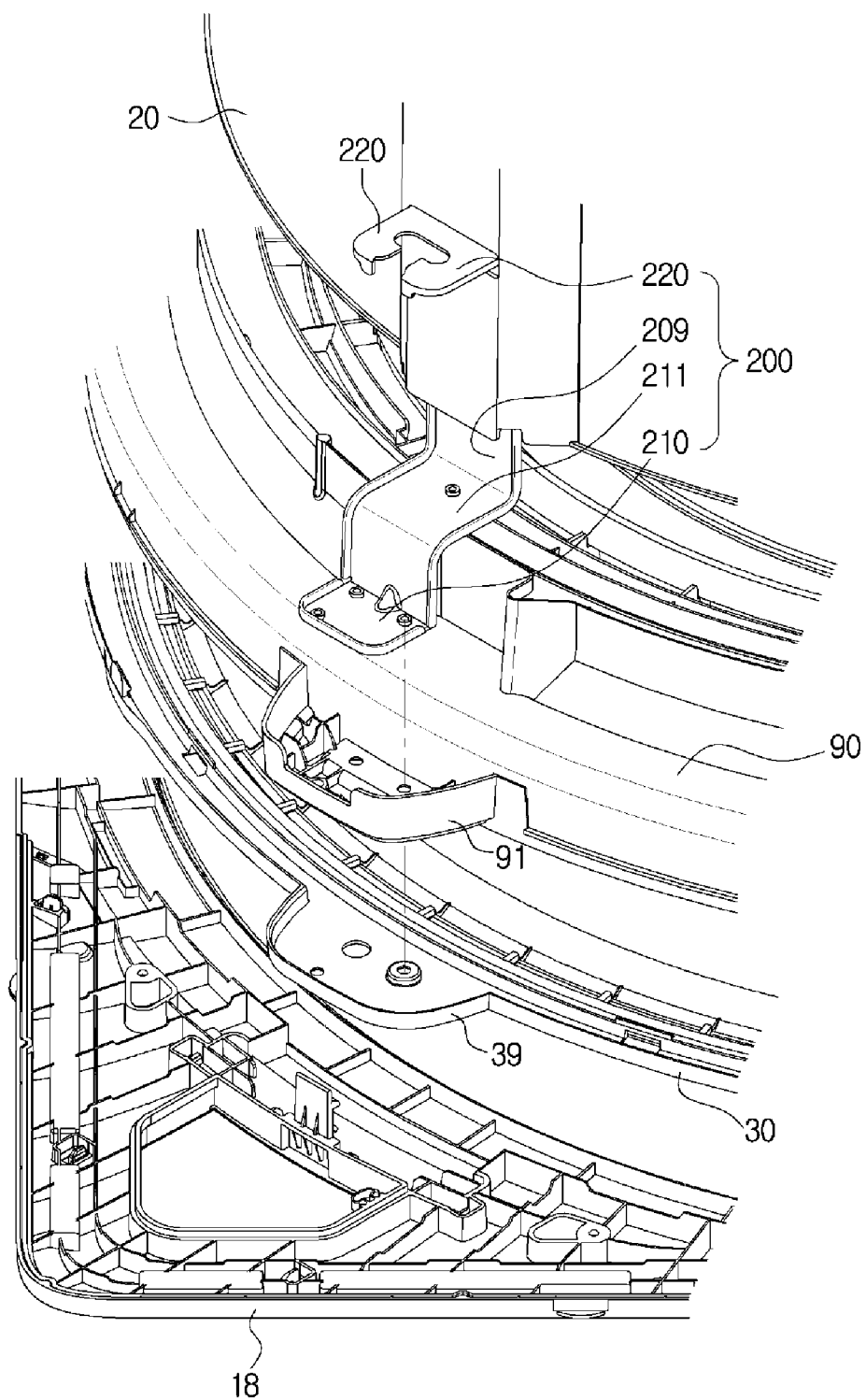
FIG. 20 is a view showing a state in which a cover member, a lower housing, a drain tray, and an upper housing of an air conditioner according to an embodiment of the present invention are disassembled.
Figure 21:
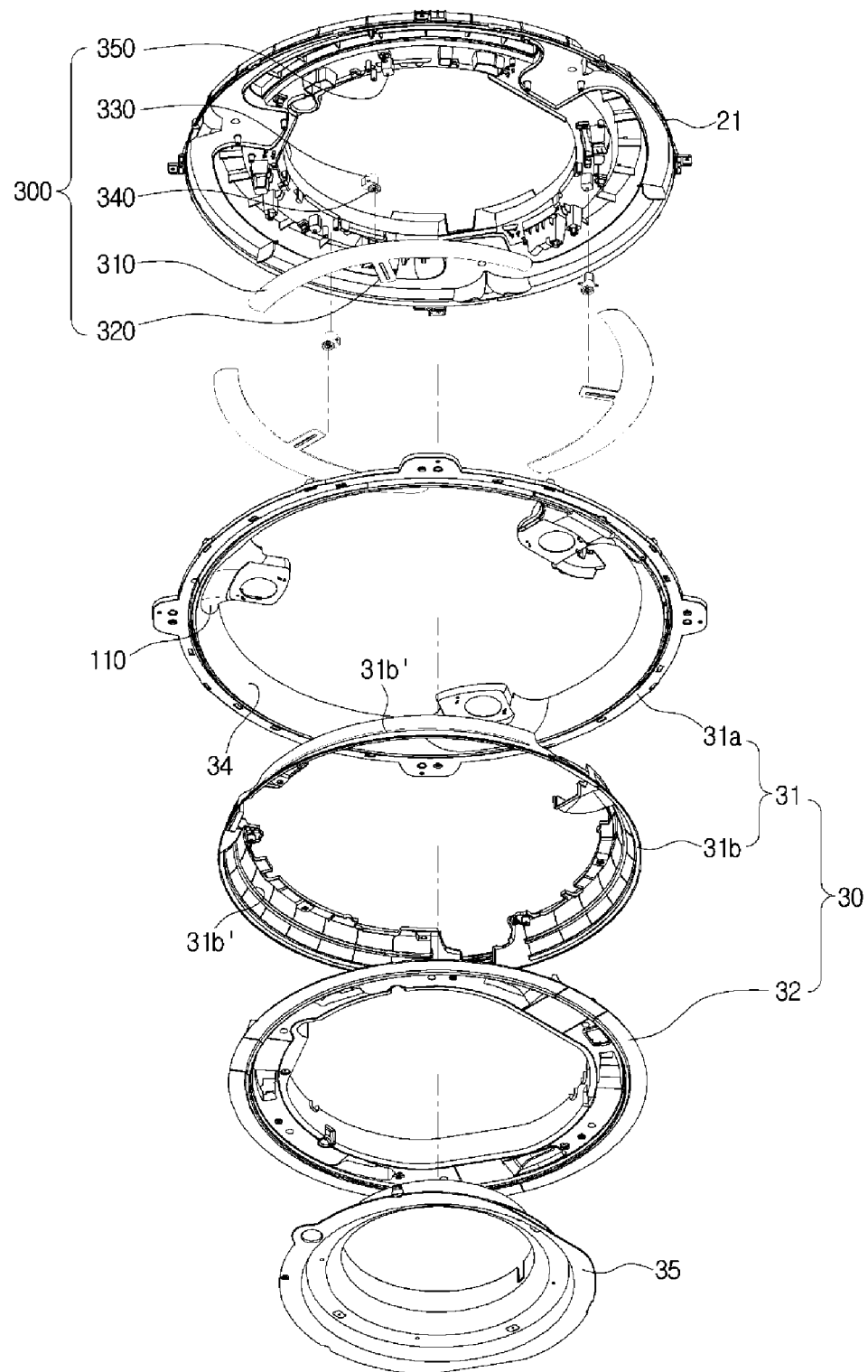
FIG. 21 is an exploded perspective view showing some of components of an air conditioner according to another embodiment of the present invention.

Accordingly, as shown in FIGS. 19 and 20, in order to solve this, each of the components may be coupled to the coupling member 200 which is coupled to the outer circumferential surface of the indoor unit 1 of the air conditioner rather than being coupled to one another, thereby improving the durability.

The coupling member 200 may be screw-coupled to each of the layered components while extending in the vertical direction of the outer circumferential surface of the indoor unit 1 of the air conditioner and include a material having a high strength such as steel.

At least a part of the coupling member 200 may include an insertion portion 209 that is inserted into the upper housing 20 and extend in the vertical direction. The insertion portion 209 may extend in the vertical direction inside the upper housing 20 and be fixed inside the upper housing 20.

The coupling member 200 may be exposed to the outside by extending outside of the upper housing 20 from the lower side of the upper housing 20. At the position where the coupling member 200 is exposed to the outside, a coupling portion 210 in which the drain tray 90, the lower housing 30, and the cover member 18 are coupled to one another may be provided. In addition, a connection portion 211 that extends to connect the insertion portion 209 and the coupling portion 210 may be provided between the insertion portion 209 and the coupling portion 210.

The coupling portion 210 may be screw-coupled to a first assembling unit 91 that protrudes outside of the outer circumferential surface from the outer perimeter side of the drain tray 90, a second assembling unit 39 that protrudes outside of the outer circumferential surface of the lower housing 30, and a screw hole (not shown) that is disposed in the cover member in a state in which they are layered.

In addition, although not shown, an additional assembling unit that protrudes outside of the outer circumferential surface of the intermediate housing 21 may be disposed between the first assembling unit 91 and the second assembling unit 39, so that the additional assembling unit may be screw-coupled to the first assembling unit 91 and the second assembling unit 39 in a state in which they are layered.

As shown in FIG. 19, three screw fastening holes may be provided in the coupling portion 210, and three screws may be screwed into the three screw fastening holes, so that the first assembling unit 91, the second assembling unit 39, and the cover member 18 may each be coupled.

In addition, a bolt coupling portion 220 that extends from the inserted coupling member 200 may penetrate one side of the upper housing 20. A fully threaded bolt coupled to one side of the ceiling may be coupled to the bolt coupling portion 220 so that the indoor unit 1 of the air conditioner may be embedded in the ceiling and supported at one side of the ceiling. Specifically, the bolt coupling portion 220 may extend radially outside of the upper housing 20 from the insertion portion 209, and thereby may protrude outside of the upper housing 20. The insertion portion 209 may extend in the axial direction of the upper housing 20 as described above, whereas the bolt coupling portion 220 may extend in the radial direction of the upper housing 20.

The bolt coupling portion 220 may include a steel member, and preferably, the bolt coupling portion 220 may be integrally formed with the coupling member 200 having a high strength as shown in an embodiment of the present invention and inserted into the upper housing 20.

The insertion portion 209 and the coupling portion 210 may be connected to each other through the connection portion 211. The connection portion 211 may be bent from the axial direction of the upper housing 20 in which the insertion portion 209 extends to the radial direction and extend outside of the upper housing 20.

The connection portion 211 may pass through the upper housing 20 and extend to the outside while passing through the bottom of the upper housing 20.

The connection portion 211 may extend to an outer side in the radial direction of the drain tray 90. This is because the radius of the outer circumferential surface of the drain tray 90 is provided larger than the radius of the outer circumferential surface of the upper housing 20 as described above.

The connection portion 211 that extends to the outer side in the radial direction of the drain tray 90 may be bent toward the axial direction of the upper hosing 20 again and extend along the axial direction of the upper housing 20. In other words, the connection portion 211 may be primarily bent toward radially outside of the upper housing 20 from the insertion portion 209 that extends in the vertical direction, extend to the outer side in the radial direction of the drain tray 90, and then bent in the vertical direction again.

The connection portion 211 that is bent in the vertical direction may extend downward up to a side at which the first assembling unit 91 is disposed and be bent to be connected to the coupling portion 210.

In summary, the coupling member 200 may include a first portion (the insertion portion 209) where at least a part of the coupling member 200 is inserted into the upper housing 20 and fixedly coupled inside the upper housing 20, a second portion (the coupling portion 210) where the drain tray 90, the lower housing 30, and the cover member 18 are layered and coupled, and a third portion (the connection portion 211) that connects the first portion 209 and the second portion 210.

The first portion 209 is a section which extends in the axial direction of the upper housing 20 and is inserted into the upper housing 20, the second portion 210 is a section which extends radially outside of the upper housing 20 to couple the drain tray 90, the lower housing 30, and the cover member 18, and the third portion 211 is a section that connects the first portion 209 and the second portion 210. Here, the third portion 211 may first be bent in the radial direction of the upper housing 20 from the first portion 209, extend up to the radius of the drain tray 90, bent again in the axial direction of the upper housing 20, and then extend to the second portion 210.

However, without being limited to an embodiment of the present invention, the coupling member 200 may be screw-coupled to the upper housing 20 outside the upper housing 20 while extending in the vertical direction of the outer circumferential surface of the upper housing 20 without being inserted into the upper housing 20.

Hereinafter, an opening and closing unit 300 of an air conditioner according to yet another embodiment of the present invention shown in FIGS. 21 to 26 will be described. Components other than the opening and closing unit 300 to be descried below may be the same as those of the above-described air conditioner 1 according to an embodiment of the present invention, and thus repeated description thereof will be omitted.

In the above-described air conditioner 1 according to an embodiment of the present invention, a blade is not disposed at a side of the discharge port 33. Thus, the discharge port 33 is disposed in a state of being always opened to the outside, so that external substances such as dust may be introduced into the housing 10 through the discharge port 33 when the air conditioner is not operated, and therefore component such as the heat exchanger 80 that is disposed inside the housing 10 may be contaminated.

That is, in the case of the conventional air conditioner, when the air conditioner is not operated, the blade closes the discharge port and restricts the external substances from entering the discharge port, but according to an embodiment of the present invention, a component similar to the blade is not disposed at the side of the discharge port 33, so that there is no component capable of restricting ingress of the external substances.

In order to solve this, the air conditioner 1 according to yet another embodiment of the present invention shown in FIGS. 21 to 26 may include an opening and closing unit 300 at the side of the discharge port 33 that closes the discharge port 33 when the air conditioner 1 is not operated and opens the discharge port 33 only when the air conditioner 1 is operated.

The opening and closing unit 300 may slidably move in inward and outward directions corresponding to the radial direction of the first lower housing 31 in a space between the inner circumferential surface of the outer first lower housing 31a that forms the discharge port 33 and the outer circumferential surface of the inner first lower housing 31b, thereby opening and closing the discharge port 33.

The opening and closing unit 300 may include an opening and closing plate 310 with a first length corresponding to a separation distance between the inner circumferential surface of the outer first lower housing 31a and the outer circumferential surface of the inner first lower housing 31b and a second length corresponding to a circumferential direction of the discharge port 33 and include a sliding extension portion 320 that extends from one side of the opening and closing plate 310 so that the opening and closing plate 310 may be slidably moved.

The opening and closing plate 310 may be provided to have a size corresponding to the discharge port 33 as described above and slidably moved in the radial direction of the first lower housing 31 to open and close the discharge port 33.

Figure 22:
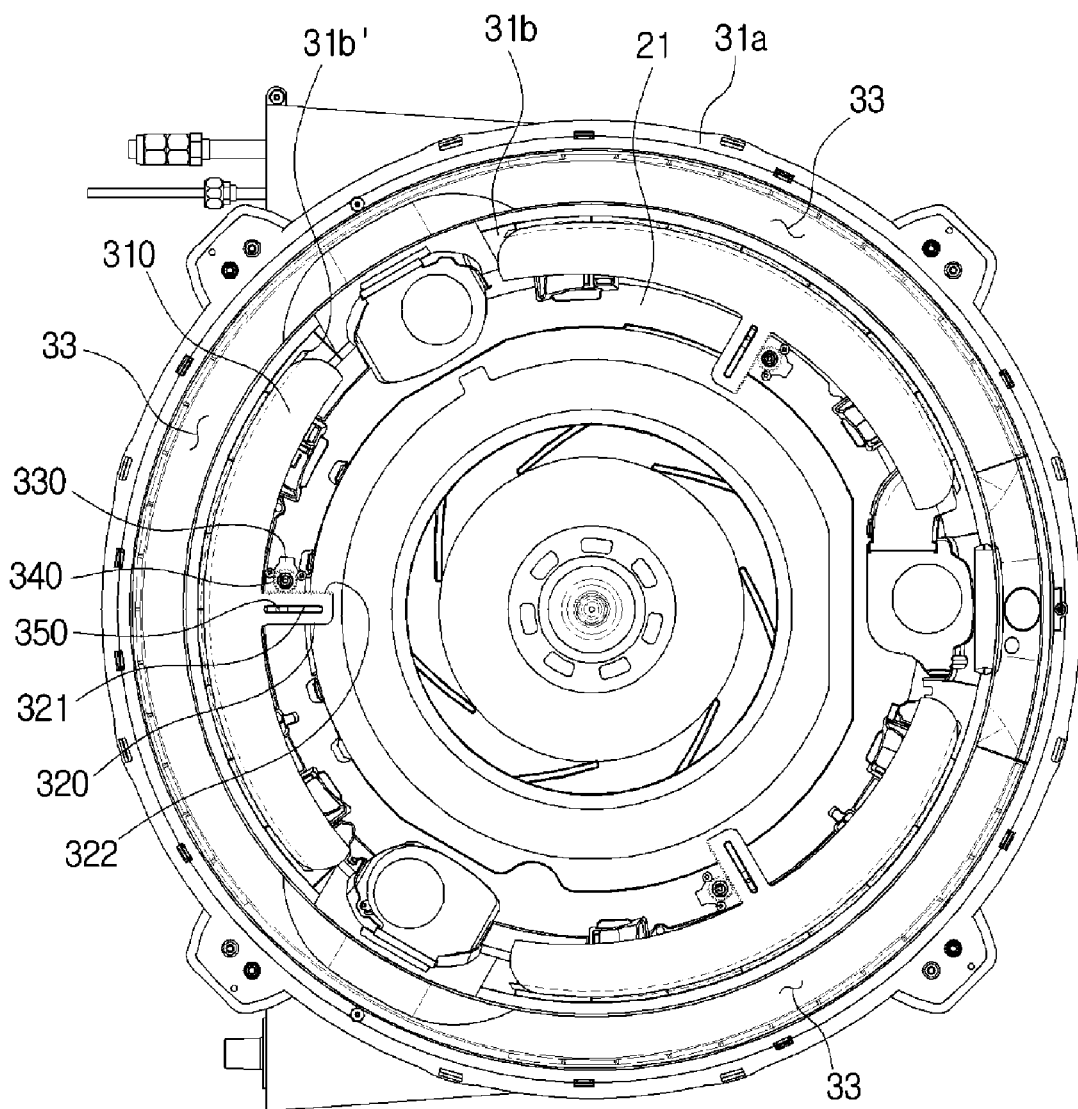
FIG. 22 is a schematic rear view showing a state in which an opening and closing unit is opened while a second lower housing of an air conditioner according to another embodiment of the present invention is removed.

Specifically, the opening and closing plate 310 may be provided to be positioned radially inside of the inner first lower housing 31b in order to maintain an open state of the discharge port 33 when the air conditioner 1 is operated as shown in FIG. 22.

Figure 23:
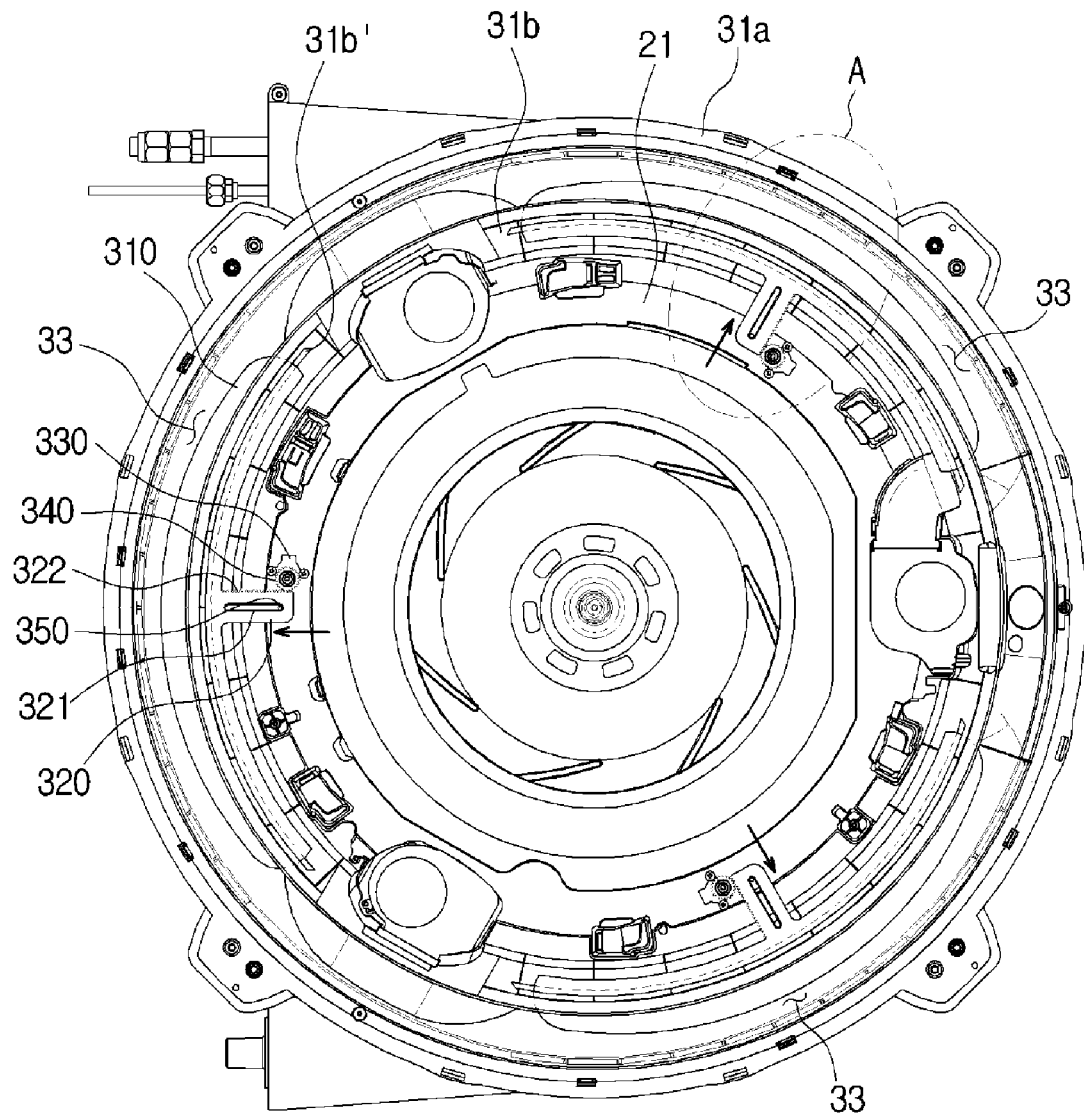
FIG. 23 is a schematic rear view showing a state in which an opening and closing unit is closed while a second lower housing of an air conditioner according to another embodiment of the present invention is removed.

When the air conditioner is not operated, the opening and closing plate 310 may pass through the outer circumferential surface of the inner first lower housing 31b through a through-hole 31b' provided in the inner first lower housing 31b, be slidably moved in the radial direction of the inner first lower housing 31b, and then reach a side of the inner circumferential surface of the outer first lower housing 31a, as shown in FIG. 23.

Figure 24:
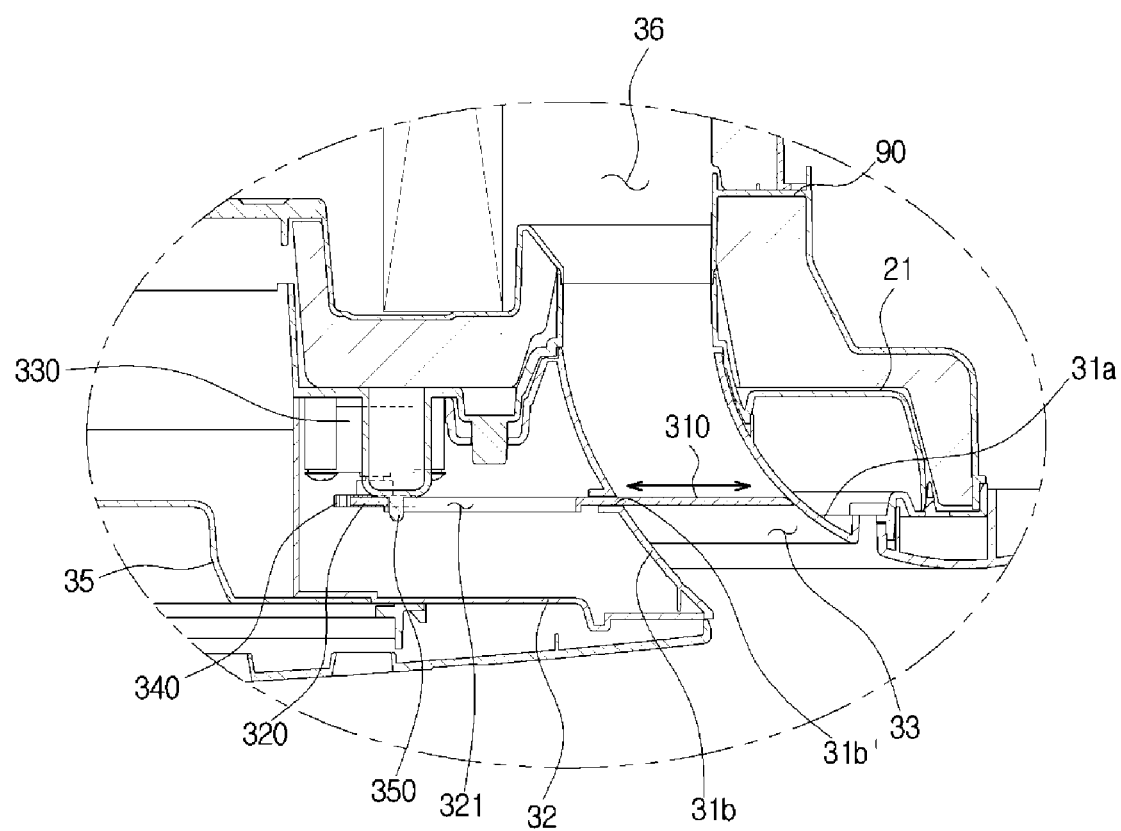
FIG. 24 is a side cross-sectional view showing a portion A of FIG. 23.

By slidably moving the opening and closing plate 310 between the inner circumferential surface of the outer first lower housing 31a and the outer circumferential surface of the inner first lower housing 31b as shown in FIG. 24, the discharge port 33 may be opened and closed.

As shown in the drawing, the air conditioner includes three discharge ports 33, so that three opening and closing plates 310 may be provided to correspond to the number of the discharge ports 33. However, without being limited thereto, the opening and closing plate 310 may be provided by the number corresponding to the number of the discharge ports 33 when the number of the discharge ports 3 of the air conditioner is less or greater than 3.

The opening and closing unit 300 may include a sliding driving motor 330 that slidably moves the opening and closing plate 310 and a pinion gear 340 that transfers a rotational force of the sliding driving motor 330.

The sliding extension portion 320 may be provided to extend toward the center of the first lower housing 31 from the opening and closing plate 310. A rack portion 342 that is disposed to be engaged with the pinion gear 340 may be provided at one side of the sliding extension portion 320.

Accordingly, as the sliding driving motor 330 is driven, the pinion gear 340 and the rack portion 342 may be engaged with each other, and the sliding extension portion 320 may slidably reciprocate in the radial direction of the first lower housing 31 due to the linear motion of the rack portion 342. The opening and closing plate 310 may be slidably moved between the discharge ports 33 in conjunction with the sliding extension portion 320.

A sliding slit 341 into which a guide protrusion 350 protruding downward from the intermediate housing 21 is inserted may be provided at a center portion of the sliding extension portion 320 to guide the reciprocating motion of the sliding extension portion 320.

When slidably moving, due to the guide protrusion 350 inserted into the sliding slit 341, the sliding extension portion 320 may linearly reciprocate without being detached.

Figure 25:
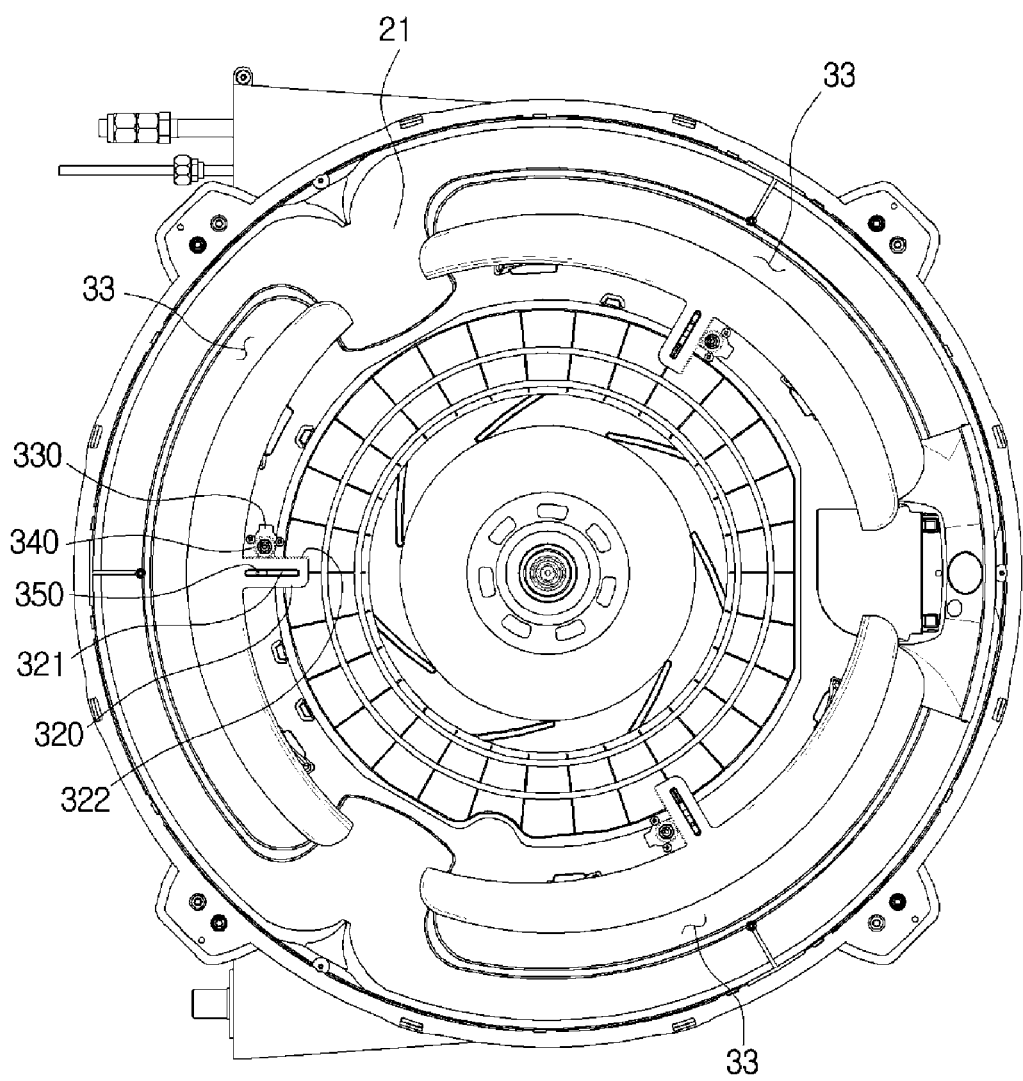
FIG. 25 is a schematic rear view showing a state in which an opening and closing unit is opened while a first lower housing of an air conditioner according to another embodiment of the present invention is removed.
Figure 26:
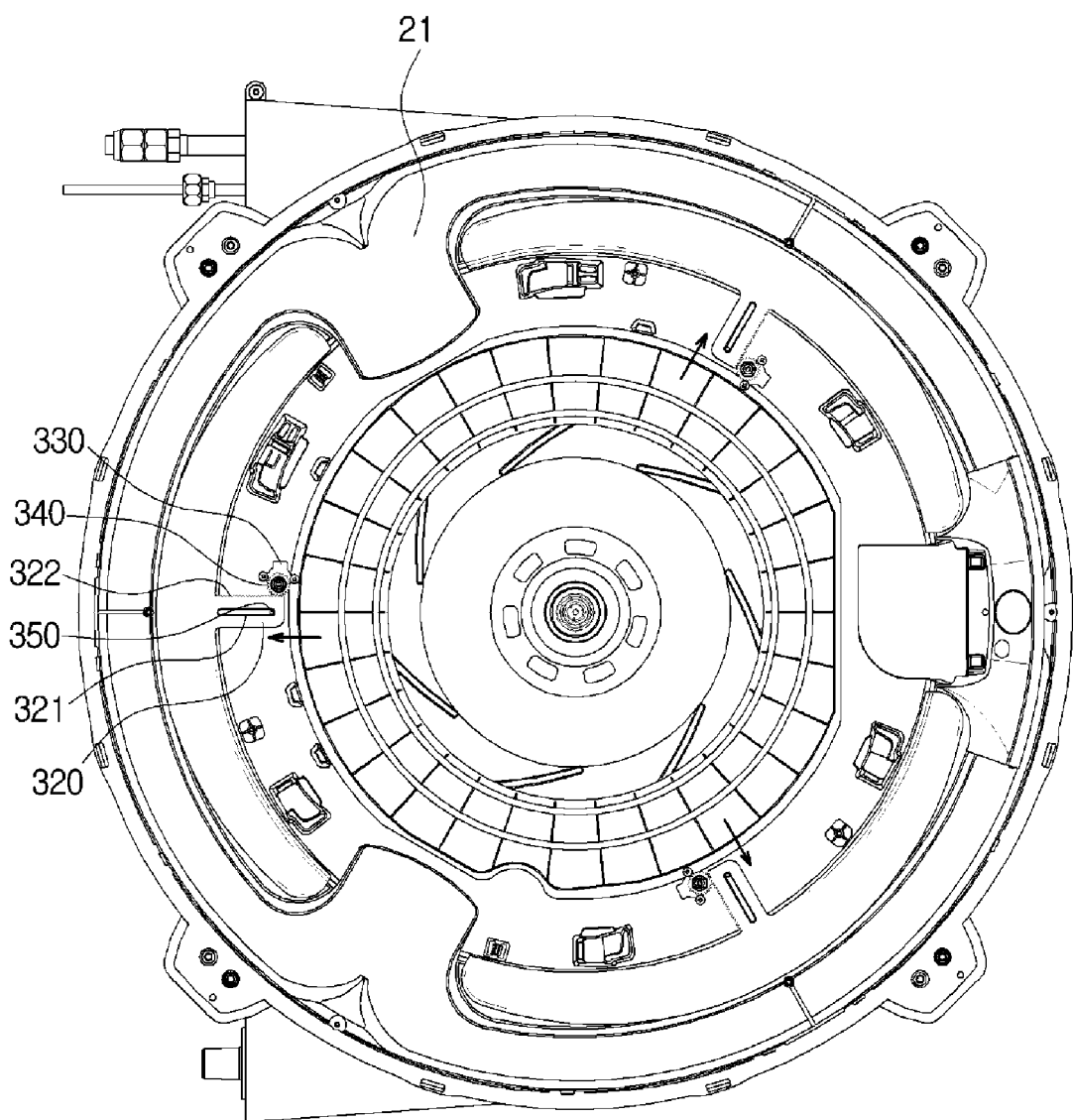
FIG. 26 is a schematic rear view showing a state in which an opening and closing unit is closed while a first lower housing of an air conditioner according to another embodiment of the present invention is removed.
Figure 27:
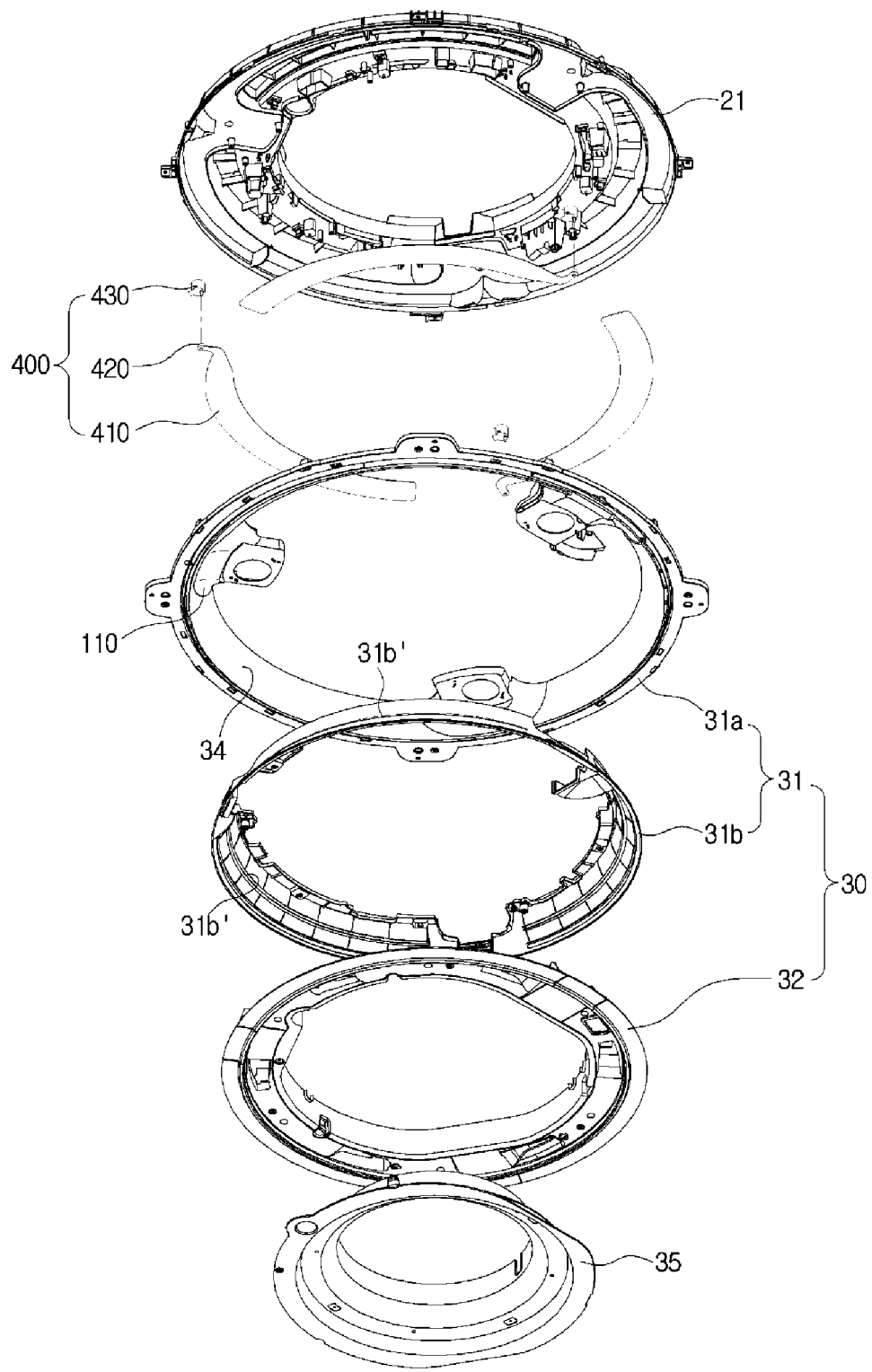
FIG. 27 is an exploded perspective view showing some of components of an air conditioner according to another embodiment of the present invention.

As shown in FIGS. 25 and 26, the opening and closing unit 300 may be coupled to the intermediate housing 21. That is, the sliding driving motor 330, the pinion gear 340, and the guide protrusion 350 are supported by the lower surface of the intermediate housing 21, and the opening and closing plate 310 may be disposed at a side corresponding to each of the components and slidably moved. However, without being limited thereto, the opening and closing unit 300 may be disposed in the first lower housing 31 and supported.

As shown in FIG. 25, when the opening and closing unit 300 is opened, due to opening all of the openings of the intermediate housing 21, air moving to the discharge port 33 and discharging to the outside of the housing 10 is not limited.

In addition, as shown in FIG. 26, when the opening and closing unit 300 is closed, foreign substances may be prevented from entering the discharge port 33 that communicates with the inside of the housing 10 by closing all of the openings of the intermediate housing 21.

Hereinafter, an opening and closing unit 400 of an air conditioner according to yet another embodiment of the present invention which is shown in FIGS. 27 to 31 will be described. Components other than the opening and closing unit 400 to be descried below may be the same as those of the above-described air conditioner 1 according to an embodiment of the present invention, and thus repeated description thereof will be omitted.

As shown in yet another embodiment of the present invention shown in FIGS. 21 to 26 described above, the opening and closing unit 400 may be moved between the inner circumferential surface of the outer first lower housing 31a and the outer circumferential surface of the inner first lower housing 31b, and thereby may open and close the discharge port 33.

The opening and closing unit 400 may include an opening and closing plate 410 whose one side is rotatably fixed, a rotation driving motor 430 that transfers rotational force to rotate the opening and closing plate 410, and a rotating shaft 420 that transfers the rotational force of the rotation driving motor 430 to the opening and closing plate 410.

The rotating shaft 420 may be disposed at one side of the opening and closing plate 410 so that the opening and closing plate 410 may be rotated in the direction from the outer circumferential surface of the inner first lower housing 31b to the inner circumferential surface direction of the outer first lower housing 31a or in the opposite direction with respect to the rotating shaft.

Figure 28:
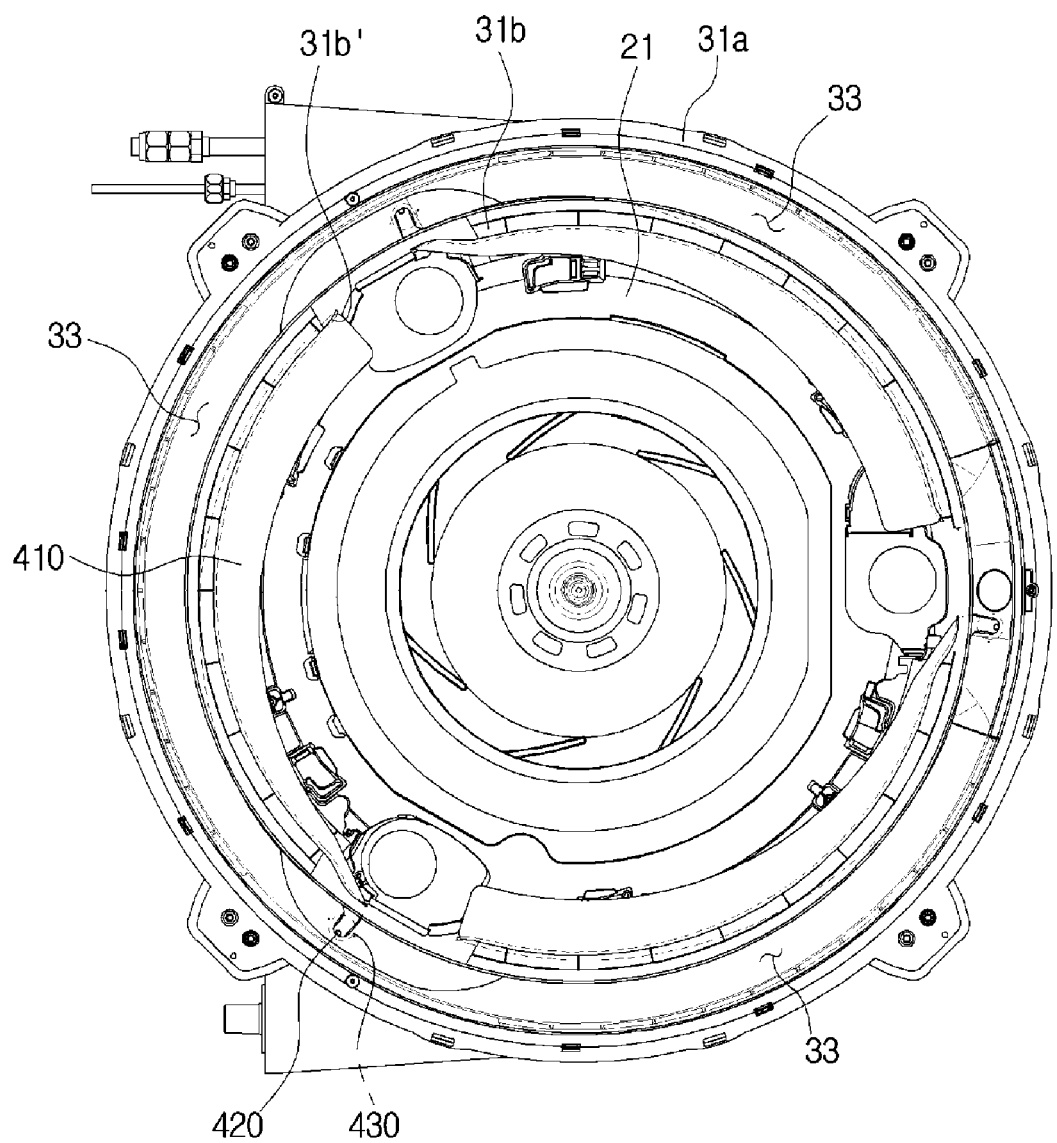
FIG. 28 is a schematic rear view showing a state in which an opening and closing unit is closed while a second lower housing of an air conditioner according to another embodiment of the present invention is removed.

As shown in FIG. 28, when the air conditioner 1 is not operated, the opening and closing plate 410 may pass through a through-hole 31b' of the inner first lower housing 31b and be rotated toward the inner circumferential surface of the outer first lower housing 31a from the outer circumferential surface of the inner first lower housing 31b, thereby closing the discharge port 33.

Figure 29:
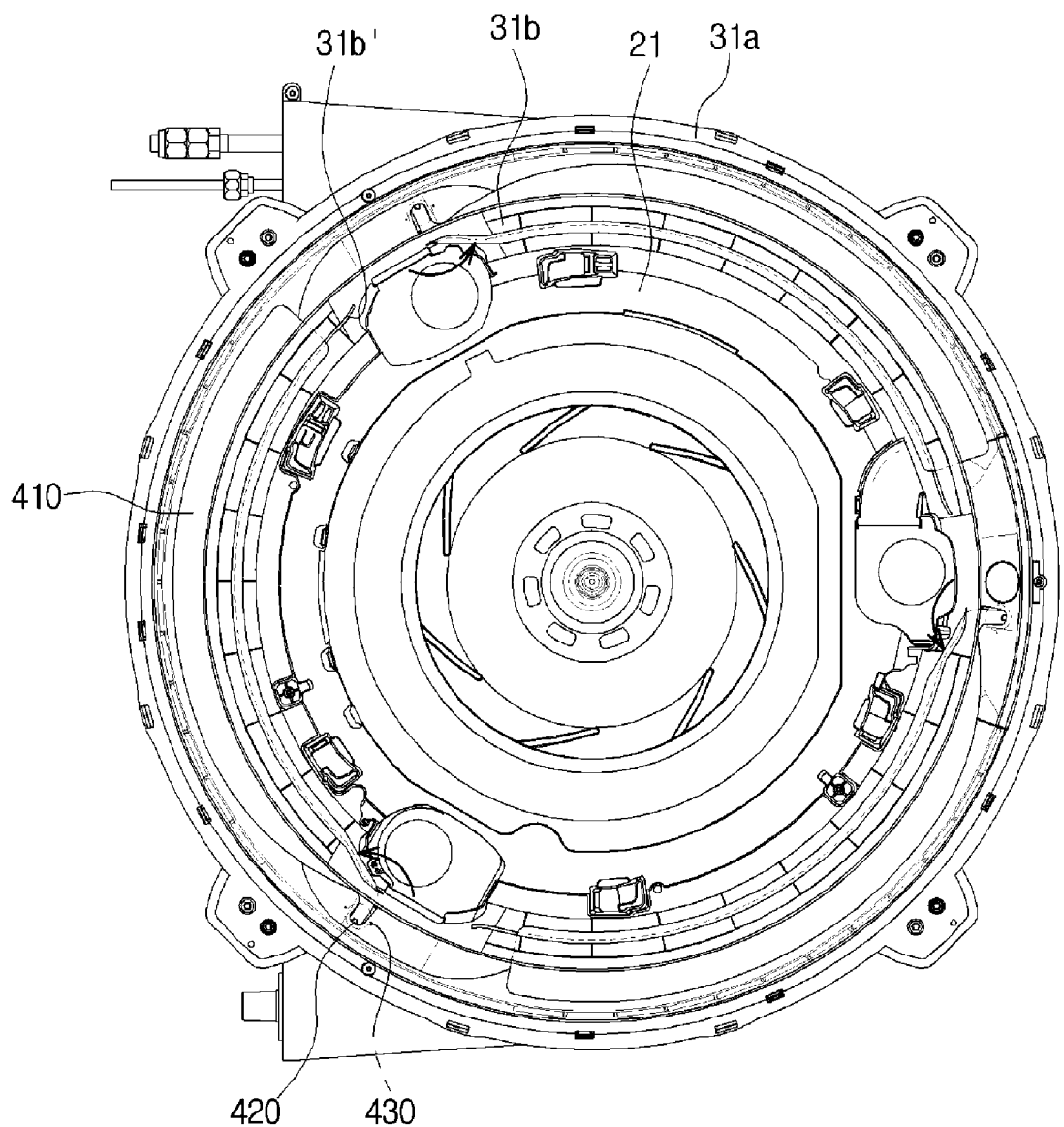
FIG. 29 is a schematic rear view showing a state in which an opening and closing unit is opened while a second lower housing of an air conditioner according to another embodiment of the present invention is removed.

In addition, as shown in FIG. 29, when the air conditioner 1 is operated, the opening and closing plate 410 may be rotated toward the inner first lower housing 31b from the inner circumferential surface of the outer first lower housing 31a with respect to the rotating shaft 420, pass through the inner first lower housing 31b through the through-hole 31b', and be rotated to an inner side in the radial direction of the inner first lower housing 31b.

Accordingly, the opening and closing plate 410 may be located radially inside of the discharge port 33 and disposed not to restrict the flow of air discharged through the discharge port 33.

Figure 30:
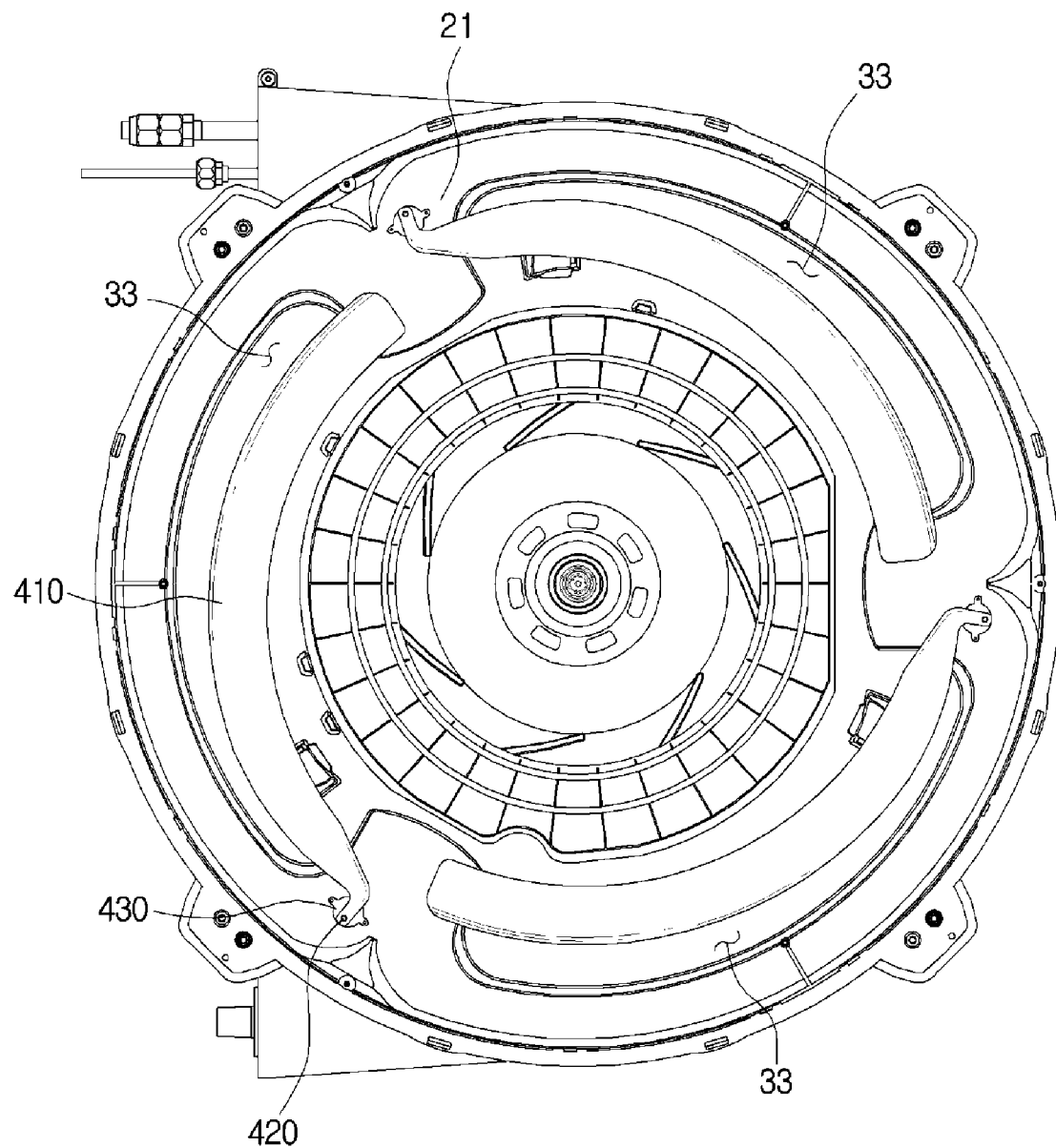
FIG. 30 is a schematic rear view showing a state in which an opening and closing unit is opened while a first lower housing of an air conditioner according to another embodiment of the present invention is removed.

As shown in FIG. 30, the opening and closing unit 400 may be disposed to be supported by the intermediate housing 21. Specifically, the rotation driving motor 430 may be coupled to the lower surface of the intermediate housing 21, and the rotating shaft 420 of the opening and closing plate 410 may be coupled to the rotation driving motor 430. However, without being limited to yet another embodiment of the present invention, the opening and closing unit 400 may be disposed in the first lower housing 31 and supported.

As shown in FIG. 30, when the opening and closing unit 400 is opened, due to opening all of the openings of the intermediate housing 21, air moving to the discharge port 33 and discharging to the outside of the housing 10 is not limited.

Figure 31:
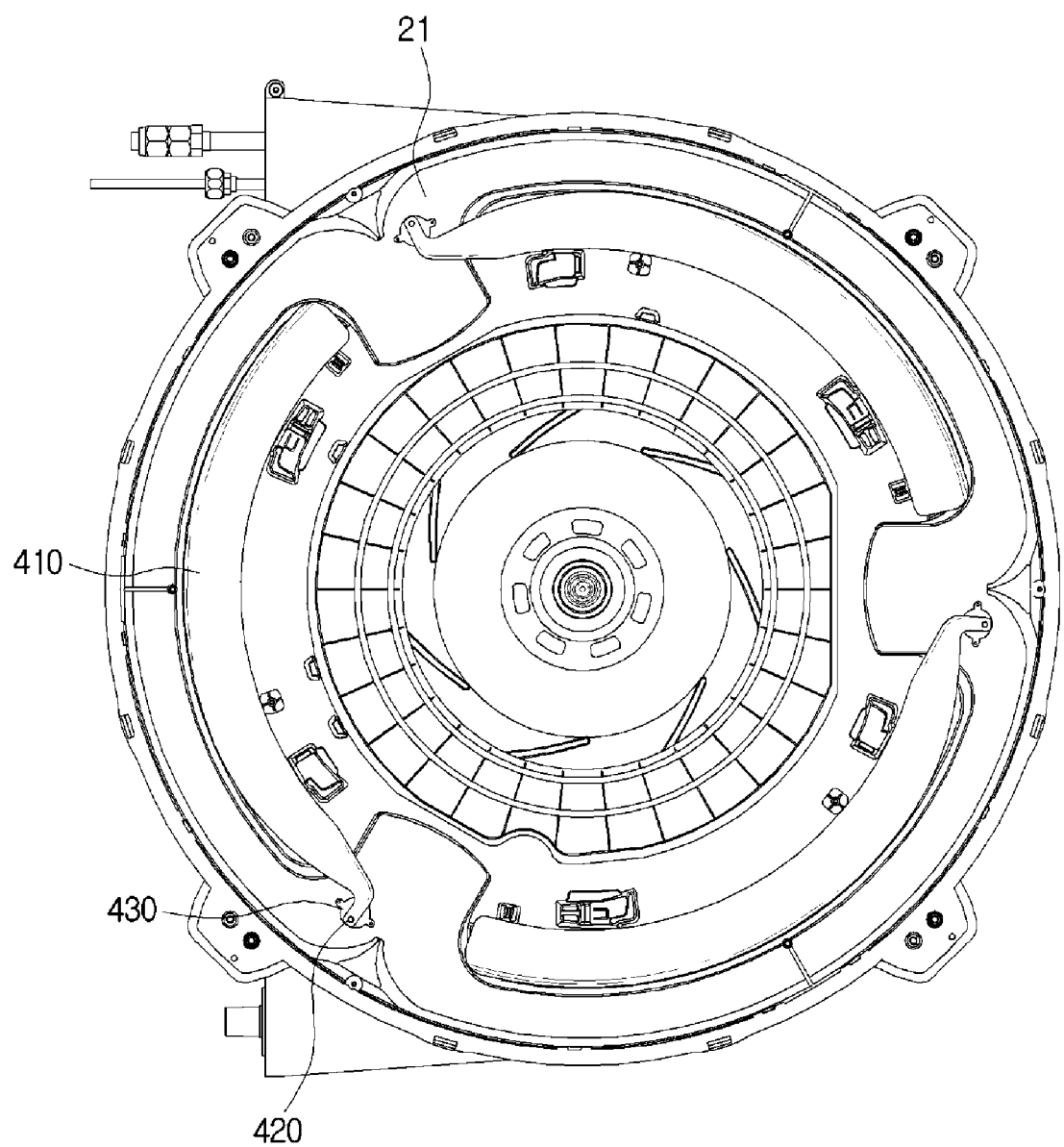
FIG. 31 is a schematic rear view showing a state in which an opening and closing unit is closed while a first lower housing of an air conditioner according to another embodiment of the present invention is removed.
Figure 32:
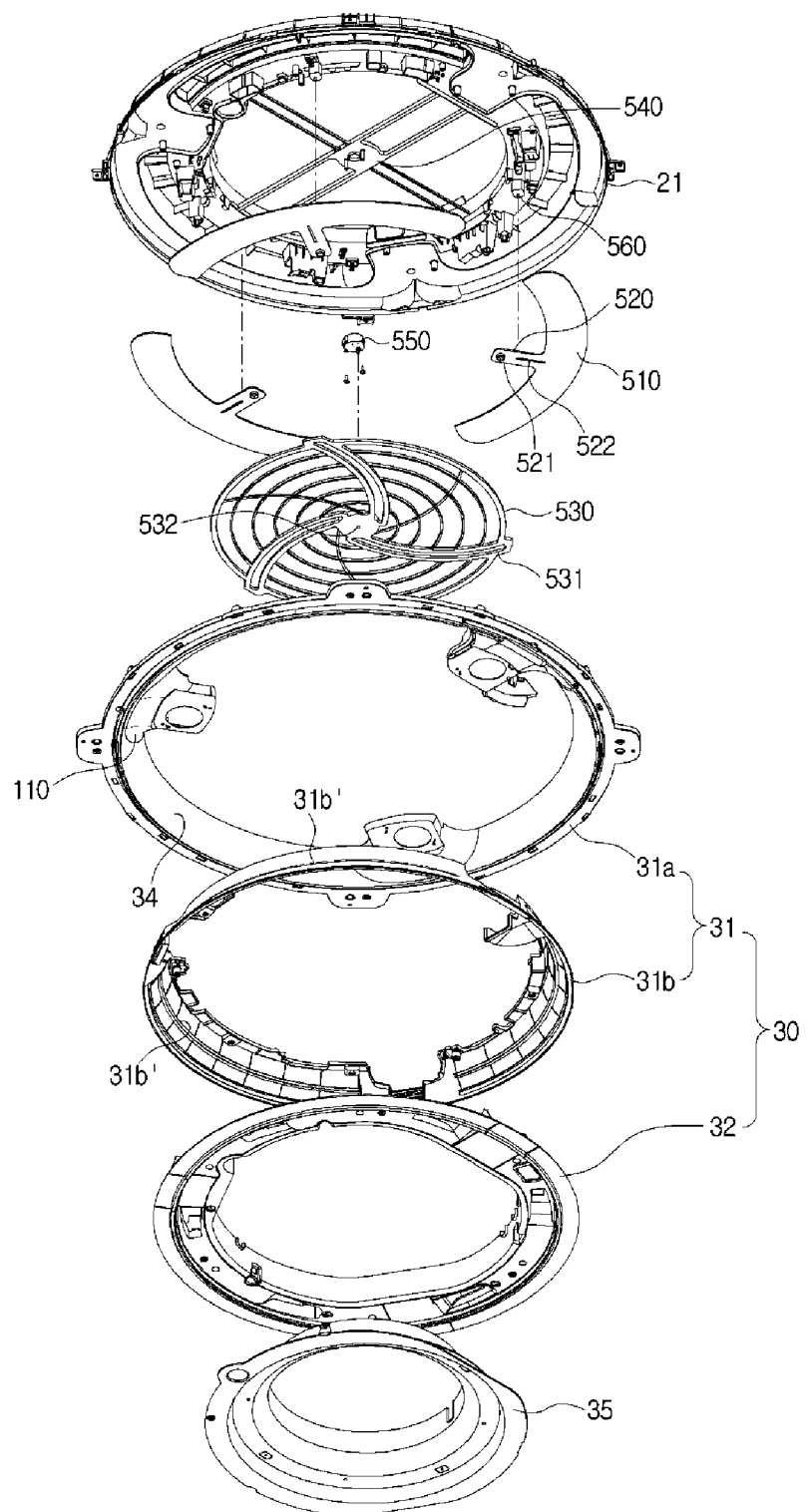
FIG. 32 is an exploded perspective view showing some of components of an air conditioner according to another embodiment of the present invention.

In addition, as shown in FIG. 31, when the opening and closing unit 400 is closed, foreign substances may be prevented from entering the housing 10 by closing the discharge port 33 that communicates with the inside of the housing 10.

Hereinafter, an opening and closing unit 500 of an air conditioner according to yet another embodiment of the present invention which is shown in FIGS. 32 to 35 will be described. Components other than the opening and closing unit 500 to be descried below may be the same as those of the above-described air conditioner 1 according to an embodiment of the present invention, and thus repeated description thereof will be omitted.

As shown in yet another embodiment of the present invention shown in FIGS. 21 to 26 described above, the opening and closing unit 500 may be moved between the inner circumferential surface of the outer first lower housing 31a and the outer circumferential surface of the inner first lower housing 31b, and thereby may open and close the discharge port 33.

For this, the opening and closing unit 500 may include an opening and closing plate 510 that opens and closes the discharge port 33 by a sliding movement, a rotation frame 530 that slidably moves the opening and closing plate 510 by rotation, a rotation driving motor 550 that transfers a rotational force to the rotation frame 530, and a fixed frame 540 in which the rotation driving motor 550 is fixed.

A sliding extension portion 520 which is provided to allow the opening and closing plate 510 to be slidably moved may extend from one side of the opening and closing plate 510. In the sliding extension portion 520, a sliding protrusion 521 that is inserted into a rail 531 of the rotation frame 530 and moved in conjunction with the movement of the rail 531 when the rotation frame 530 is rotated, and a sliding slit 522 that makes the sliding extension portion 520 linearly reciprocate may be provided.

The sliding slit 522 may extend to have a length portion in a direction corresponding to the radial direction of the first lower housing 31. A guide protrusion 560 that extends downward from the intermediate housing 21 may be inserted into the sliding slit 522 and thereby guide the sliding extension portion 520 so that the sliding extension portion 520 may be moved linearly.

The rotation frame 530 may be coupled to the rotation driving motor 550 to receive the rotational force by the rotation driving motor 550 and be rotated in one direction or in the opposite direction.

The rotation frame 530 may be coupled to a center portion of the intermediate housing 21 and disposed in a flow passage through which air is introduced to the blower fan 40 by the suction port 11, and therefore the rotation frame 530 may be provided in the form of a grille with a minimized surface area to prevent the air introduced by the rotation frame 530 from being restricted.

The rotation frame 530 may include the rail 531 having a curved line that extends in the radial direction and is bent to one side. The rail 531 may be provided in a number corresponding to the number of the opening and closing plates 510.

According to yet another embodiment of the present invention shown in FIGS. 32 to 35, three discharge ports 33 may be provided, three opening and closing plates 510 may be provided to correspond to the number of the discharge ports 33, and three rails 531 may be formed corresponding to the opening and closing plates 510.

A rotating shaft 532 that is connected to the rotation driving motor 550 to transfer a rotational force to the rotation frame 530 may be provided at the center portion of the rotation frame 530. The rotation frame 530 may be rotated in one side or in the opposite direction with respect to the rotating shaft 532.

A support frame 540 that supports the rotation driving motor 550 and the rotation frame 530 coupled to the rotation driving motor 550 may be provided at the center portion of the intermediate housing 21. The support frame 540 may be provided at the center portion of the intermediate housing 21 and disposed in the flow passage through which air is introduced in the same manner as in the rotation frame 530, and therefore the support frame 540 may be formed with a minimized surface area so that interference with the air is minimized.

Figure 33:
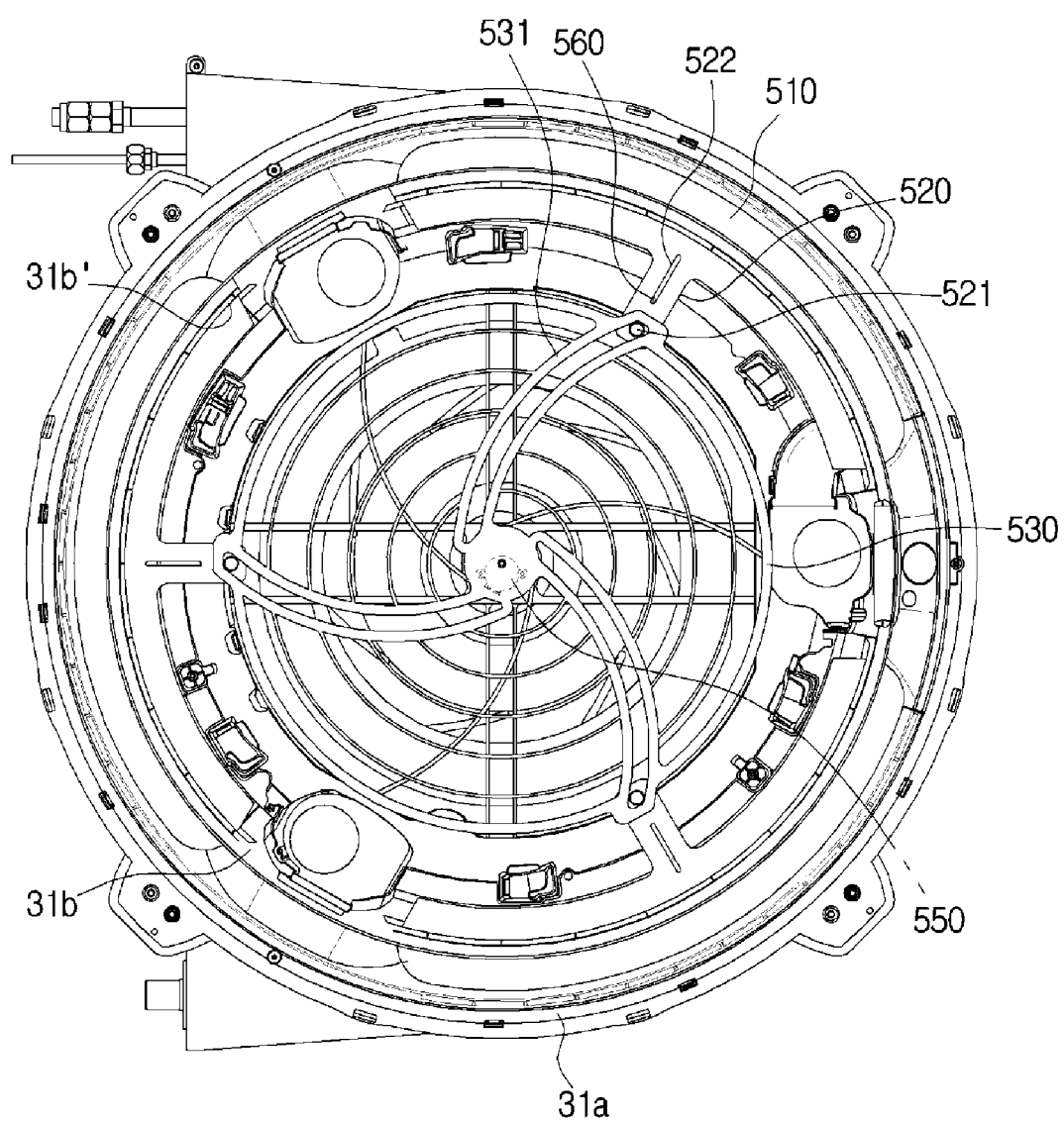
FIG. 33 is a schematic rear view showing a state in which a second lower housing of an air conditioner according to another embodiment of the present invention is removed.

As shown in FIG. 33, the opening and closing plate 510 may be provided to pass through the inner first lower housing 31b through the through-hole 31b' of the inner first lower housing 31b. In addition, the sliding protrusion 521 may be provided inserted in the rail 531.

Figure 34:
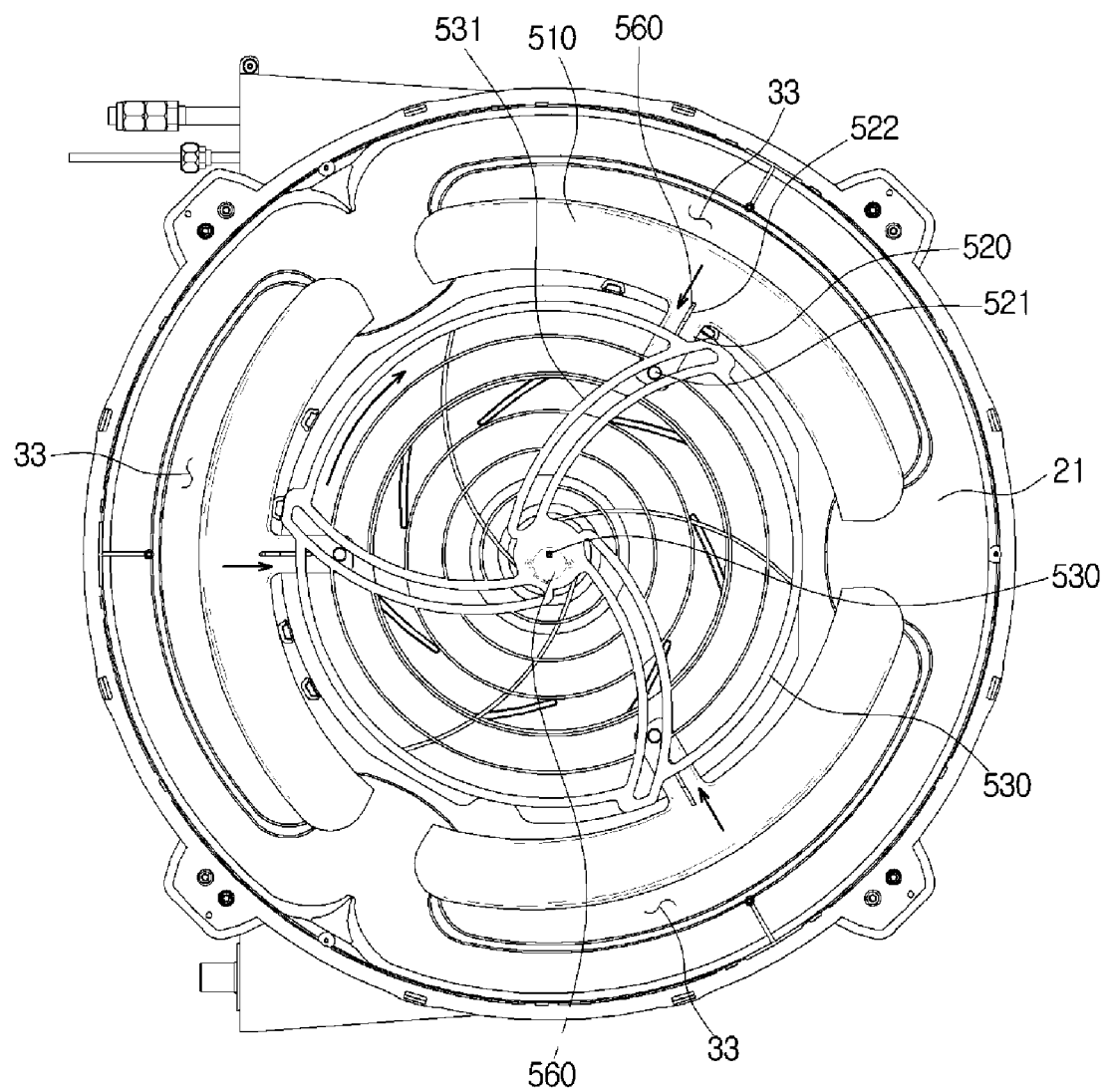
FIG. 34 is a schematic rear view showing a state in which an opening and closing unit is closed while a first lower housing of an air conditioner according to another embodiment of the present invention is removed.

As shown in FIG. 34, when the rotation frame 530 is rotated to one side, the rail 531 may be rotated to one side, and in conjunction with the rotation of the rail 531, the sliding protrusion 521 may be moved in a direction in which the rail 531 is rotated along the rail 531.

The sliding extension portion 520 may be moved in conjunction with the movement of the sliding protrusion 521 and make linearly reciprocating movements in the radial direction of the first lower housing 31 guided by the guide protrusion 560 inserted in the sliding slit 522.

The sliding slit 522 may extend in the direction corresponding to the radial direction of the first lower housing 31 as described above, and therefore the sliding protrusion 521 may be guided by the guide protrusion 560 inserted in the sliding slit 522 even when the sliding protrusion 521 is rotated along the rail 531 and thereby may make reciprocating movements only in the inward and outward directions along the radial direction of the first lower housing 31.

Accordingly, when the rotation frame 530 is rotated to one side, the sliding extension portion 520 may be moved toward the inner circumferential surface of the outer first lower housing 31a from the outer circumferential surface side of the inner first lower housing 31b, while the sliding protrusion 521 is moved along the rail 531 in conjunction with the rotation of the rail 531 and moved toward radially outside of the rotation frame 530 in the radial direction of the rotation frame 530.

Thus, the opening and closing plate 510 may pass through the through-hole 31b' of the inner first lower housing 31b in conjunction with the movement of the sliding extension portion 520 and be slidably moved to the inner circumferential surface side of the outer first lower housing 31a.

Accordingly, the opening and closing plate 510 may be disposed at the discharge port 33 to close the discharge port 33 and prevent foreign substances from being introduced into the discharge port 33.

Figure 35:
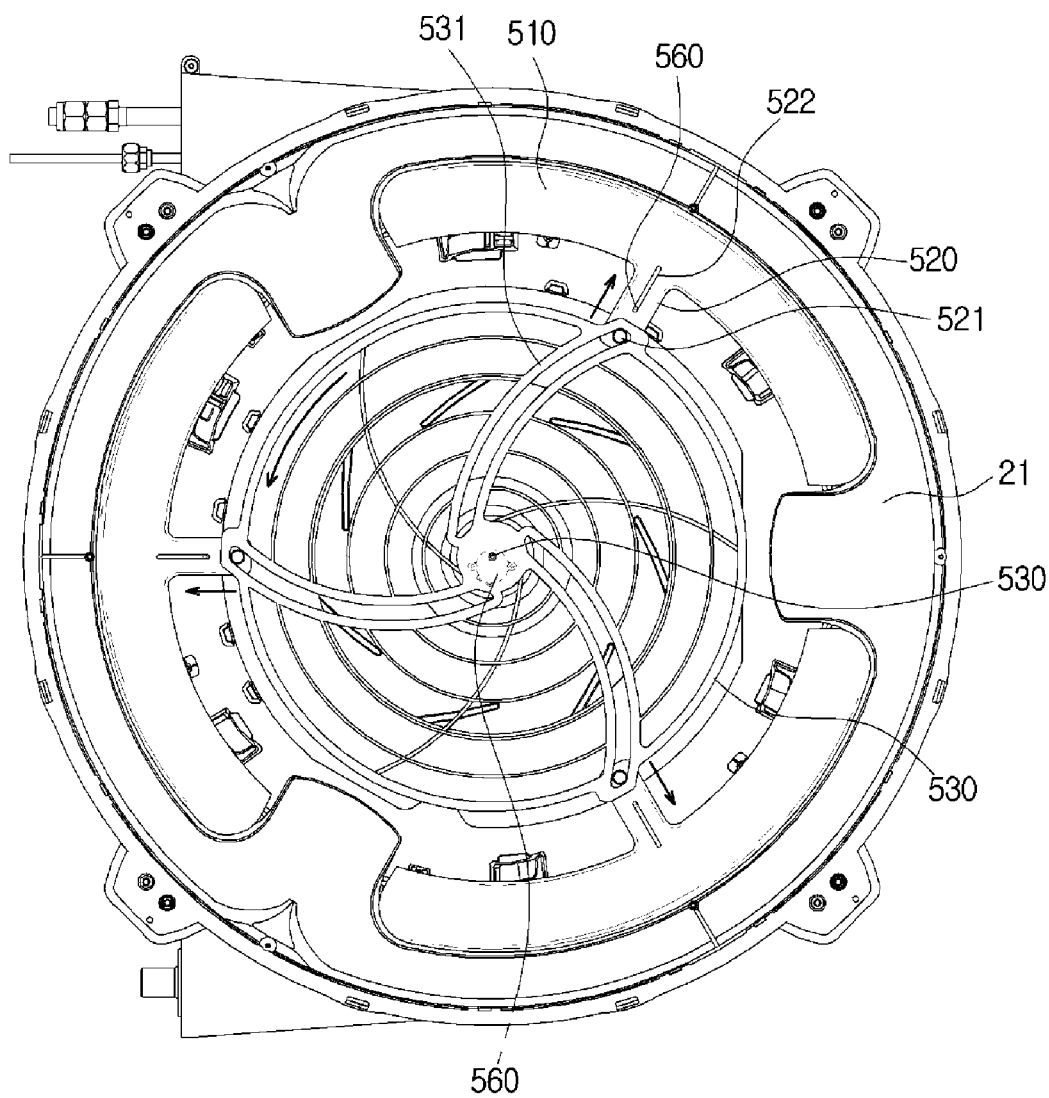
FIG. 35 is a schematic rear view showing a state in which an opening and closing unit is opened while a first lower housing of an air conditioner according to another embodiment of the present invention is removed.

On the other hand, when the rotation frame 530 is rotated in the opposite direction, the sliding protrusion 521 may be moved along the rail 531 in conjunction with the rotation of the rail 531 in the opposite direction as shown in FIG. 35.

The sliding protrusion 521 may be moved toward the center of the rotation frame 530 by the rotation direction of the rail 531 and the guide protrusion 560, and the sliding extension portion 520 may be moved from the inner circumferential surface side of the outer first lower housing 31a toward the inner first lower housing 31b.

Accordingly, the opening and closing plate 510 may pass through the through-hole 31b' of the inner first lower housing 31b in conjunction with the movement of the sliding extension portion 520 and be slidably moved to an inner side in the radial direction of the inner first lower housing 31b.

Thus, the opening and closing plate 510 may be positioned inside the inner first lower housing 31b and open the discharge port 33, so that air may flow to the discharge port 33.

Hereinafter, an opening and closing unit 600 of an air conditioner according to yet another embodiment of the present invention shown in FIGS. 36 and 37 will be described. Components other than the opening and closing unit 600 to be descried below may be the same as those of the above-described air conditioner 1 according to an embodiment of the present invention, and thus repeated description thereof will be omitted.

As shown in yet another embodiment of the present invention shown in FIGS. 21 to 26 described above, the opening and closing unit 600 may be moved between the inner circumferential surface of the outer first lower housing 31a and the outer circumferential surface of the inner first lower housing 31b and thereby may open and close the discharge port 33.

The opening and closing unit 600 may include an opening and closing plate 610 that opens and closes the discharge port 33, a sliding protrusion 620 that protrudes from one side of the opening and closing plate 610 so that the opening and closing plate 610 may be slidably moved, a rotating disk 630 that makes the sliding protrusion 620 move through its rotation, and a rotation driving motor 640 that transfers a rotational force to the rotating disk 630.

The rotating disk 630 may include a sliding slit 632 into which the sliding protrusion 620 is inserted and extends in one direction so that the sliding protrusion 620 may perform a translation motion and a rotating shaft 631 that is connected to the rotation driving motor 640 to rotate the rotating disk 630.

As shown in yet another embodiment of the present invention shown in FIGS. 32 to 36 described above, as the rotating disk 630 is rotated with respect to the rotating shaft 631, the sliding slit 632 may be rotated in conjunction with the rotation of the rotating disk 630, so that the sliding protrusion 620 inserted in the sliding slit 632 may be slidably moved along a direction in which the sliding slit 632 extends.

Thus, in conjunction with the slidable movement of the sliding protrusion 620, the opening and closing plate 610 may open and close the discharge port 33 while being slidably moved between the outer first lower housing 31a and the inner first lower housing 31b.

Figure 36:
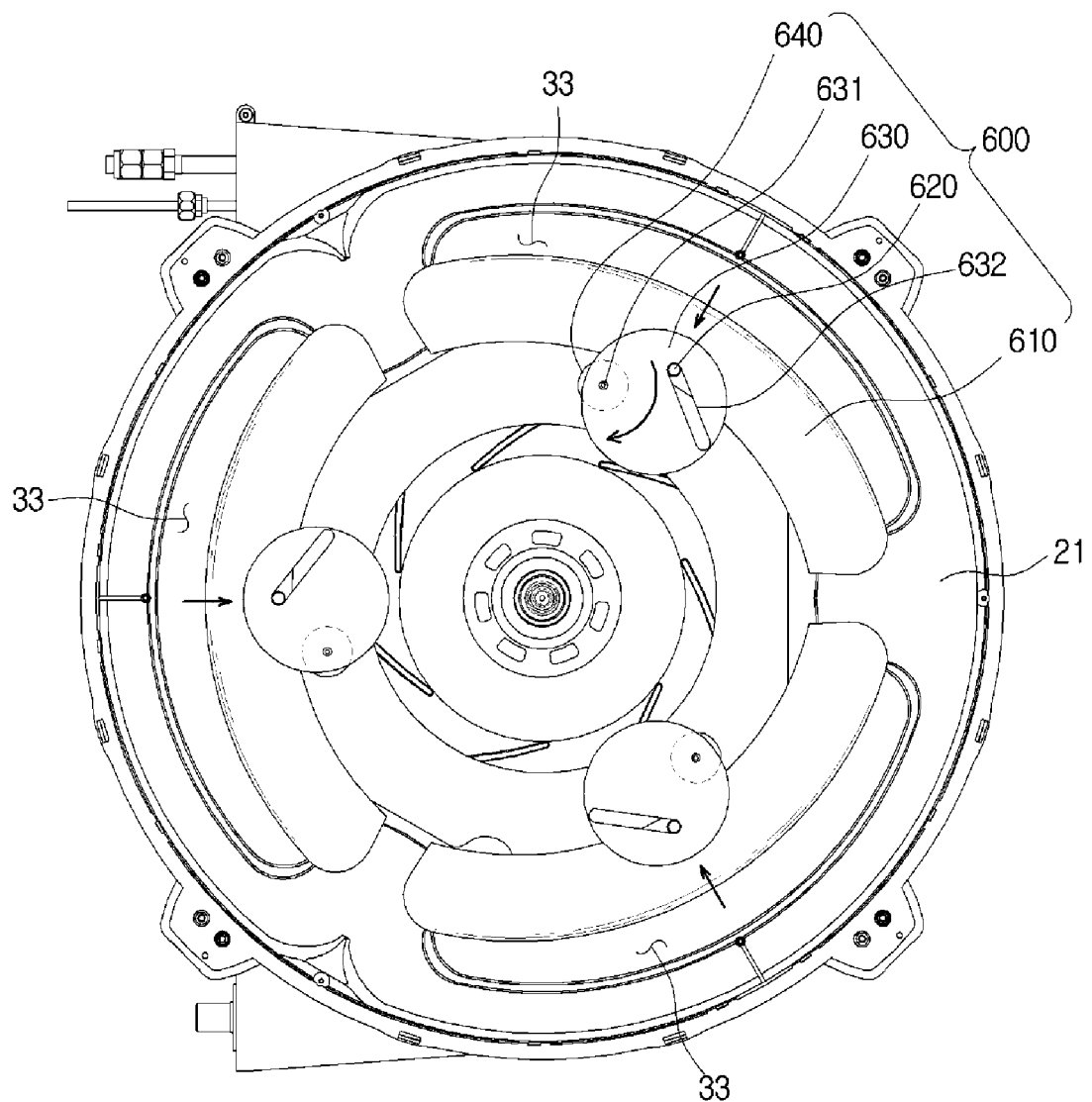
FIG. 36 is a schematic rear view showing a state in which an opening and closing unit is closed while a first lower housing of an air conditioner according to still another embodiment of the present invention is removed.

When the rotating disk 630 is rotated to one side as shown in FIG. 36, the sliding slit 632 may be rotated in conjunction with the rotating disk 630, and the sliding protrusion 620 inserted in the sliding slit 632 may be moved in conjunction with the rotation of the sliding slit 632.

In this case, the sliding protrusion 620 may be moved along the extension direction of the sliding slit 632, and when the sliding protrusion 620 is slidably moved in the sliding slit 632 toward one side adjacent to the circumference side of the rotating disk 630, the opening and closing plate 610 may be slidably moved in the radially outside direction of the intermediate housing 30a in conjunction with the sliding protrusion 620 and thereby may be disposed at the discharge port 33 to close the discharge port 33.

Figure 37:
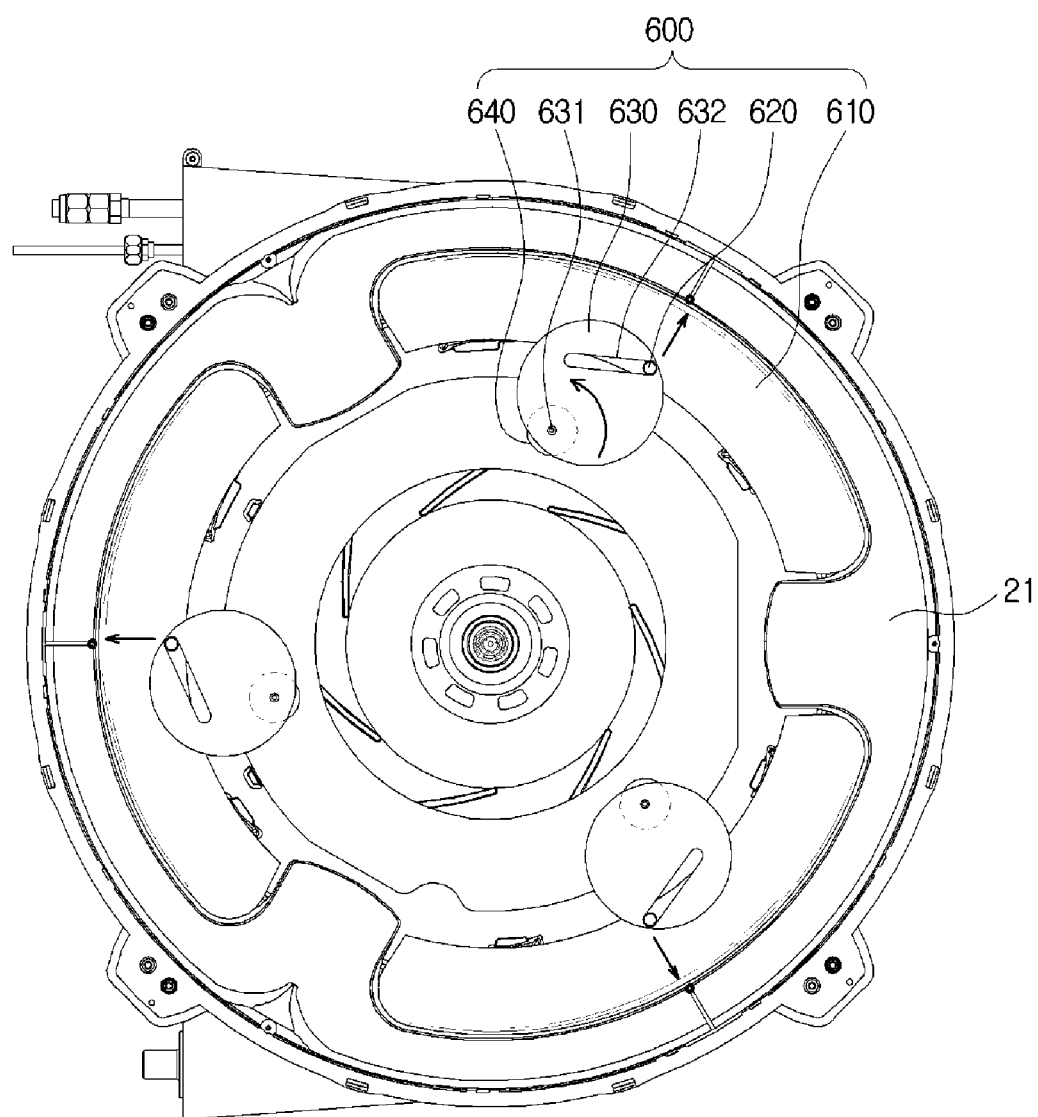
FIG. 37 is a schematic rear view showing a state in which an opening and closing unit is opened while a first lower housing of an air conditioner according to still another embodiment of the present invention is removed.

On the other hand, when the rotating disk 630 is rotated in the opposite direction as shown in FIG. 37, the sliding protrusion 620 may be slidably moved toward the other side of the sliding slit 632 along the sliding slit 632.

In this case, the opening and closing plate 610 may be slidably moved in the radially inside direction of the intermediate housing 21 in conjunction with the sliding protrusion 620 and thereby may be disposed radially inside of the discharge port 33 to open the discharge port 33.

As described above, according to the embodiments of the present invention, some of internal components in the indoor unit of the air conditioner formed in the circular shape may be disposed in the protrusion portion protruding from the circular housing and thereby maximize the discharge port, and the protrusion directions of the protrusion portion may coincide with each other and thereby facilitate the installation of the air conditioner.

In addition, components of the indoor unit of the air conditioner may be coupled to one another by the coupling member, thereby improving the durability of the indoor unit of the air conditioner.

In addition, a discharge port that is regularly disposed by an appropriate arrangement of the components in the housing may be realized, thereby generating uniform airflow in a room.

In addition, a condensate water collecting space that is disposed outside the housing may be provided in the drain tray, thereby preventing a leakage due to condensate water generated outside the housing.

In addition, by the opening and closing unit provided at a position corresponding to the discharge port, the discharge port of the air conditioner may be easily opened and closed even without a blade formed inside the housing of the air conditioner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
a housing having a cylindrical shape;
a heat exchanger, arrangeable in the housing, the heat exchanger having a cylindrical shape corresponding to the cylindrical shape of the housing;
a heat insulating material arrangeable between the heat exchanger and the housing in a radial direction of the housing, the heat insulating material having a cylindrical shape corresponding to the cylindrical shape of the housing;
a drain tray arrangeable below the housing, the drain tray being injection-molded; and
wherein the drain tray includes coupling ribs configured to protrude upward and to couple to the heat insulating material while the drain tray is arranged below the housing and the heat insulating material to thereby couple the heat insulating material, the housing, the drain tray to each other, and
wherein the coupling ribs are injection-molded with the drain tray and extend along a circumferential direction of the heat insulating material to couple to the heat insulating material along the circumferential direction of the drain tray.

2. The air conditioner of claim 1, wherein the heat insulating material includes a cylindrical shape, and one of the coupling ribs is an inner rib configured to protrude upward to correspond to an inner circumferential surface of the heat insulating material.

3. The air conditioner of claim 2, wherein the inner rib is disposed inside another one of the coupling ribs along the radial direction of the drain tray.

4. The air conditioner of claim 2, wherein the inner rib extends along a circumferential direction of the drain tray.

5. The air conditioner of claim 2, wherein the heat insulating material is disposed between the inner rib and another one of the coupling ribs along the radial direction of the housing.

6. The air conditioner of claim 1, wherein the drain tray includes a drain portion configured to collect water condensed on the heat exchanger, the heat insulating material includes a cylindrical shape with an area along a circumferential direction of the heat insulating material, and the drain portion along the area.

7. The air conditioner of claim 6, wherein the drain tray includes a drain pump operable to drain water at the drain portion, and the drain pump is disposed in the area.

8. The air conditioner of claim 7, wherein the drain pump is disposed outside at least one of the coupling ribs along a radial direction of the drain tray.

9. The air conditioner of claim 1, further comprising a wire for electrically connecting with an electronic component for driving the air conditioner, and a wire insertion part configured to fix at least a portion of the wire to the housing along a circumferential direction of the housing, and
wherein the wire insertion part is disposed outside at least one of the coupling ribs along the radial direction of the housing.

10. The air conditioner of claim 9, wherein the wire insertion part is disposed outside the heat insulating material in the radial direction of the housing.

\* \* \* \* \*